(12) United States Patent
Estevez et al.

(10) Patent No.: US 12,363,796 B2
(45) Date of Patent: Jul. 15, 2025

(54) METHOD AND APPARATUS FOR TRANSMISSION MODE SWITCHING IN WIRELESS COMMUNICATION SYSTEM

(71) Applicant: Samsung Electronics Co., Ltd., Suwon-si (KR)

(72) Inventors: David Gutierrez Estevez, Staines (GB); Galini Tsoukaneri, Staines (GB); Belkacem Mouhouche, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 17/788,207

(22) PCT Filed: Dec. 21, 2020

(86) PCT No.: PCT/KR2020/018809
§ 371 (c)(1),
(2) Date: Jun. 22, 2022

(87) PCT Pub. No.: WO2021/133011
PCT Pub. Date: Jul. 1, 2021

(65) Prior Publication Data
US 2023/0337326 A1    Oct. 19, 2023

(30) Foreign Application Priority Data

Dec. 23, 2019 (GR) .............................. 20190100574
May 8, 2020 (GR) .............................. 20200100235
(Continued)

(51) Int. Cl.
*H04W 76/40* (2018.01)
*H04W 40/24* (2009.01)
(Continued)

(52) U.S. Cl.
CPC ......... *H04W 76/40* (2018.02); *H04W 40/248* (2013.01); *H04W 72/30* (2023.01); *H04W 80/10* (2013.01)

(58) Field of Classification Search
CPC ... H04W 76/40; H04W 40/248; H04W 72/30; H04W 80/10; H04W 76/22; H04W 4/06
See application file for complete search history.

(56) References Cited

U.S. PATENT DOCUMENTS

2011/0085489 A1   4/2011   Rydnell et al.
2012/0263089 A1   10/2012  Gupta et al.
(Continued)

FOREIGN PATENT DOCUMENTS

CN   101340355 A   1/2009
CN   102057699 A   5/2011
(Continued)

OTHER PUBLICATIONS

Huawei et al., Key Issue: unicast multicast delivery mode switch, S2-1912444, SA WG2 Meeting #136, Nov. 21, 2019, Reno, NV, USA.
(Continued)

*Primary Examiner* — Afshawn M Towfighi
(74) *Attorney, Agent, or Firm* — Jefferson IP Law, LLP

(57) ABSTRACT

The present disclosure relates to a pre-5G or 5G communication system to be provided for supporting higher data rates beyond 4G communication system such as LTE. A method for switching from a first data transmission mode to a second data transmission mode comprising a NG-RAN node, a core node and a content provider, wherein method comprises transmitting, by NG-RAN node, first data from content provider to a UE according to first data transmission mode in a first session; deciding, by UE or NG-RAN node or core node or content provider, to switch from first data transmis-
(Continued)

sion mode to second data transmission mode; initializing, by core node, a second session for second data transmission mode; switching, by core node, from first data transmission mode to second data transmission mode; and transmitting, by NG-RAN node, second data from content provider to UE according to second data transmission mode in second session.

15 Claims, 29 Drawing Sheets

(30) Foreign Application Priority Data

| | | |
|---|---|---|
| Aug. 12, 2020 | (GR) | 20200100474 |
| Dec. 9, 2020 | (GB) | 2019420 |
| Dec. 9, 2020 | (GB) | 2019422 |

(51) Int. Cl.
*H04W 72/30* (2023.01)
*H04W 80/10* (2009.01)

(56) References Cited

U.S. PATENT DOCUMENTS

| | | | |
|---|---|---|---|
| 2013/0294326 A1 | 11/2013 | Jiao et al. | |
| 2014/0177504 A1 | 6/2014 | Sayeed et al. | |
| 2017/0164372 A1 | 6/2017 | Gupta et al. | |
| 2018/0170739 A1 | 6/2018 | Zacche et al. | |
| 2018/0192289 A1 | 7/2018 | Dao | |
| 2018/0332444 A1 | 11/2018 | Natarajan et al. | |
| 2019/0342799 A1 | 11/2019 | Mackenzie et al. | |
| 2020/0374352 A1* | 11/2020 | Ge | H04L 67/146 |
| 2021/0022063 A1* | 1/2021 | Yang | H04W 40/02 |
| 2021/0378053 A1* | 12/2021 | Saily | H04W 76/40 |

FOREIGN PATENT DOCUMENTS

| | | |
|---|---|---|
| KR | 10-2019-0100217 A | 8/2019 |
| WO | 2012-097699 A1 | 7/2012 |
| WO | 2016/142810 A1 | 9/2016 |
| WO | 2017-220023 A1 | 12/2017 |
| WO | 2018/076280 A1 | 5/2018 |
| WO | 2019/161927 A1 | 8/2019 |
| WO | 2019/204166 A1 | 10/2019 |
| WO | 2019/223780 A1 | 11/2019 |

OTHER PUBLICATIONS

Nokia et al., PDU session enhanced for multicast to provide the basic multicast connectivity service, S2-1911366, SA WG2 Meeting #S2-136, Nov. 8, 2019, Reno, Nevada, USA.
Ericsson, KI #1, Sol #2: Solution 2 update, S2-2004700, SA WG2 Meeting #139E, Jun. 12, 2020.
Ericsson et al., 5MBS Architecture_r5, S2-2001540, Jan. 18, 2020.
David Navratil et al., Broadcast and Multicast Communication Enablers for the Fifth-Generation of Wireless Systems, 5GXcast, XP055798155, Nov. 30, 2018.
Qualcomm Incorporated, Solution: Integrated MBS and Unicast Transport with Full Separation of MBS Service, 82-1911371, SA WG2 Meeting #136, XP 051821463, Nov. 8, 2018, Reno, Nevada, USA.
Great Britain Office Action dated Jun. 8, 2021, issued in Great Britain Application No. GB2019422.1.
European Search Report dated Aug. 11, 2022, issued in European Application No. 20905484.0.
Great Britain Examination Report dated Nov. 22, 2022, issued in Great Britain Application No. GB2019420.5.
3GPP TS 26.346, Multimedia Broadcast/Multicast Service (MBMS); Protocols and codecs; Release 12, Mar. 17, 2017.
3GPP TS 23.501, 5G; System Architecture for the 5G System; Release 16, Oct. 1, 2020.
3GPP TS 23.502, 5G; Procedures for the 5G System; Release 16, Jul. 1, 2020.
Samsung; 5GS architecture to support MBS features, SA WG2 Meeting #136, S2-1911500, Nov. 8, 2019.
Chinese Notice of Allowance dated Nov. 9, 2024, issued in a Chinese Patent Application No. 202080083455.8.
Korean Office Action dated Mar. 20, 2025, issued in a Korean Patent Application No. 10-2022-7018467.

* cited by examiner

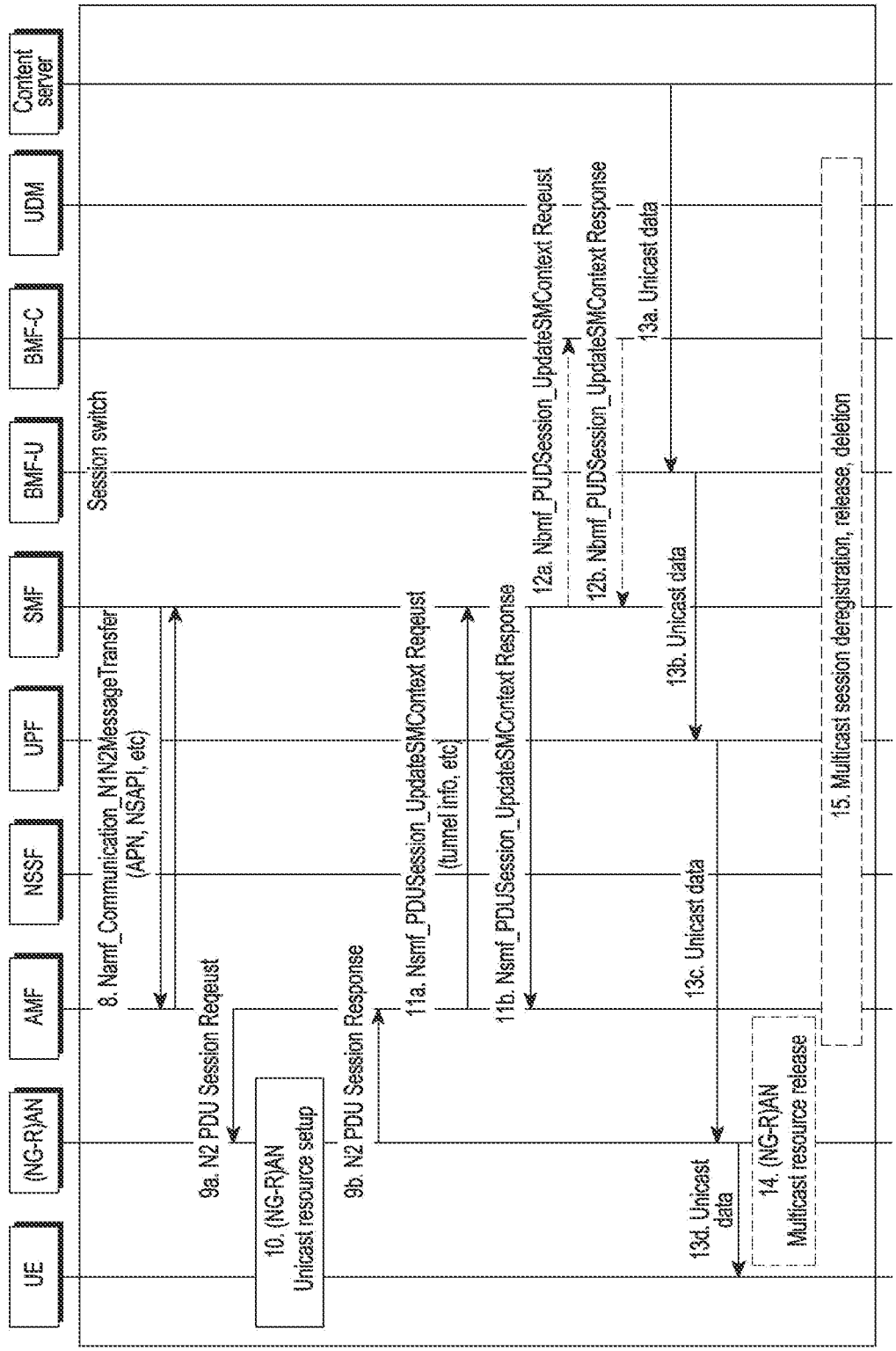

METHOD AND APPARATUS FOR TRANSMISSION MODE SWITCHING IN WIRELESS COMMUNICATION SYSTEM

CROSS-REFERENCE TO RELATED APPLICATION(S)

This application is a National Stage application under 35 U.S.C. § 371 of an International application number PCT/KR2020/018809, filed on Dec. 21, 2020, which is based on and claims priority of a United Kingdom patent application number 20190100574, filed on Dec. 23, 2019, in the United Kingdom Intellectual Property Office, of a United Kingdom patent application number 20200100235, filed on May 8, 2020, in the United Kingdom Intellectual Property Office, of a United Kingdom patent application number 20200100474, filed on Aug. 12, 2020, in the United Kingdom Intellectual Property Office, of a United Kingdom patent application number 2019420.5, filed on Dec. 9, 2020, in the United Kingdom Intellectual Property Office, and of a United Kingdom patent application number 2019422.1, filed on Dec. 9, 2020, in the United Kingdom Intellectual Property Office, the disclosure of each of which is incorporated by reference herein in its entirety.

TECHNICAL FIELD

The present invention relates to a networking switching. Particularly, the present invention relates to switching in 5G networks or wireless communication network, for example from unicast transmission to multicast transmission or broadcast transmission and/or vice versa.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Solution to Problem

There is a need to provide switching in 5G networks or wireless communication system, for example from unicast transmission to multicast transmission or broadcast transmission and/or vice versa.

It is one aim of the present invention, amongst others, to provide a process of switching in a 5G network or wireless communication system and a 5G network for which at least partially obviates or mitigates at least some of the disadvantages of the prior art, whether identified herein or elsewhere. For instance, it is an aim of embodiments of the invention to provide a process of switching from a first data transmission method (mode) to a second data transmission method (mode) in a 5G network that improves switching from unicast transmission to multicast transmission or broadcast transmission and/or vice versa. For instance, it is an aim of embodiments of the invention to provide a 5G network that improves switching from unicast transmission to multicast transmission or broadcast transmission and/or vice versa.

Particularly, this current invention focuses on the transmission of multicast/broadcast content and the switching of the delivery method from unicast to multicast/broadcast and vice versa over the 5GC of a 5GS. The invention applies to 5G networks, for which there is no delivery method switching solution developed at the time of filing.

A first aspect provides a process of switching from a first data transmission method to a second data transmission method in a 5G network comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network, wherein the process comprises transmitting, by the first NG-RAN node, first data from the set of content providers to the first UE according to the first data transmission method in a first session; deciding, by the first UE or the first NG-RAN node or the 5G Core or the Content Server, to switch from the first data transmission method to the second transmission method; initializing, by the 5G Core, a second session for the second transmission method; switching, by the 5G Core, from the first data transmission method to the second transmission method; and transmitting, by the first NG-RAN node, second data from the set of content providers to the first UE according to the second data transmission method in the second session.

A second aspect provides a 5G network for switching from a first data transmission method to a second data transmission, comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network; wherein the first NG-RAN node is configured to transmit first data from the set of content providers to the first UE according to the first data transmission method in a first session; wherein the first UE or the first NG-RAN node or the 5G Core or the Content Server is configured to decide to switch from the first data transmission method to the second transmission method; wherein the 5G Core is configured to initialize a second session for the second transmission method; wherein the 5G Core is configured to switch from the first data transmission method to the second transmission method; and wherein the first NG-RAN node is configured to transmit second data from the set of content providers to the first UE according to the second data transmission method in the second session.

A third aspect provides a method for switching from a first data transmission mode to a second data transmission mode in a communication network comprising a new generation radio access network (NG-RAN) node, a Core node and a content provider, wherein the method comprises transmitting, by the NG-RAN node, first data from the content provider to a user equipment (UE) according to the first data transmission mode in a first session, wherein the first data transmission mode is a unicast transmission mode via individual delivery; deciding, by the NG-RAN node or the core node or the content provider, to switch from the first data transmission mode to the second data transmission mode, wherein the second data transmission mode is a multicast transmission mode via shared delivery; initializing, by the core node, a second session for the second data transmission mode; switching, by the core node, from the first data transmission mode to the second data transmission mode; and transmitting, by the NG-RAN node, second data from the content provider to the UE according to the second data transmission mode in the second session.

A fourth aspect provides an apparatus for switching from a first data transmission mode to a second data transmission mode in a communication network, the apparatus comprising a new generation radio access Network (NG-RAN) node, a core node, and a content provider, wherein the NG-RAN node is configured to transmit first data from the content provider to the user equipment (UE) according to the first data transmission mode in a first session, wherein the first data transmission mode is a unicast transmission mode via individual delivery, wherein the NG-RAN node or the core node or the content provider is configured to decide to switch from the first data transmission mode to the second data transmission mode, wherein the core node is configured to initialize a second session for the second data transmission mode, wherein the second data transmission mode is a multicast transmission mode via shared delivery, wherein the core node is configured to switch from the first data transmission mode to the second data transmission mode, and wherein the NG-RAN node is configured to transmit second data from the content provider to the UE according to the second data transmission mode in the second session.

A fifth aspect provides a method for switching from a first data transmission mode to a second data transmission mode in a communication network comprising a new generation radio access network (NG-RAN) node, a core node and a content provider, wherein the method comprises transmitting, by the NG-RAN node, first data from the content provider to the user equipment (UE) according to the first data transmission mode in a first session, wherein the first data transmission mode is a multicast or a broadcast data transmission mode via shared delivery; deciding, by the NG-RAN node or the core node or the content provider, to switch from the first data transmission mode to the second data transmission mode, wherein the second data transmission mode is a unicast transmission mode via individual delivery; initializing, by the core node, a second session for the second data transmission mode; switching, by the core node, from the first data transmission mode to the second data transmission mode; and transmitting, by the NG-RAN node, second data from the content provider to the UE according to the second data transmission mode in the second session.

A sixth aspect provides an apparatus for switching from a first data transmission mode to a second data transmission mode in a communication network, the apparatus comprising a new generation radio access network (NG-RAN) node, a core node, and a content provider, wherein the NG-RAN node is configured to transmit first data from the content provider to the user equipment (UE) according to the first data transmission mode in a first session, wherein the first data transmission mode is a multicast or a broadcast data transmission mode via shared delivery, wherein the NG-RAN node or the core node or the content provider is configured to decide to switch from the first data transmission mode to the second data transmission mode, wherein the second data transmission mode is a unicast transmission mode via individual delivery, wherein the core node is configured to initialize a second session for the second data transmission mode, wherein the core node is configured to switch from the first data transmission mode to the second data transmission mode, and wherein the NG-RAN node is configured to transmit second data from the content provider to the UE according to the second data transmission mode in the second session.

BRIEF DESCRIPTION OF DRAWINGS

For a better understanding of the invention, and to show how exemplary embodiments of the same may be brought into effect, reference will be made, by way of example only, to the accompanying diagrammatic Figures, in which:

FIGS. 9A and 9B schematically depict a process according to an exemplary embodiment;

MODE FOR THE INVENTION

According to the present invention there is provided a process of switching from a first data transmission method to a second data transmission method in a 5G network, as set forth in the appended claims. Also provided is a 5G network for switching from a first data transmission method to a second data transmission method in a 5G network. Other features of the invention will be apparent from the dependent claims, and the description that follows.

This current invention focuses on the transmission of multicast/broadcast content and the switching of the delivery method from unicast to multicast/broadcast and vice versa. The invention is relevant to the next generation 5G cellular network, for which there is no delivery method switching solution approved at the time of filing.

Multicast/Broadcast in 4G Networks

Multicasting/Broadcasting is a data transmission method that delivers the same content to multiple devices (i.e. a subset of devices or all devices in the network) at the same time. In 4G cellular networks, multicast/broadcast services are provided by the enhanced Multimedia Broadcast Multicast Service (eMBMS). There is currently no equivalent standardised solution for 5G systems. To enable eMBMS, the following entities have been introduced in the 4G core network architecture:

i. Multicast Coordination Entity (MCE): MCE is usually a logical entity that can be co-located with other network elements. It is responsible for admission control, network resource allocation, and MBMS session control.

ii. MBMS Gateway (MBMS-GW): The MBMS-GW is another usually logical entity that is responsible for forwarding the MBMS data to the base stations transmitting the service and performing MBMS session control towards the Radio Access Network (RAN) via the Mobility Management Entity (MME).

iii. Broadcast Multicast Service Centre (BM-SC): The BM-SC includes the MBMS Bearer Services and the MBMS User service. It is the entity responsible for scheduling the MBMS service(s), announcing the services to the users, authorising the users, allocating bearer service identification to the services and initiating/terminating the MBMS service resources.

Figure 1:
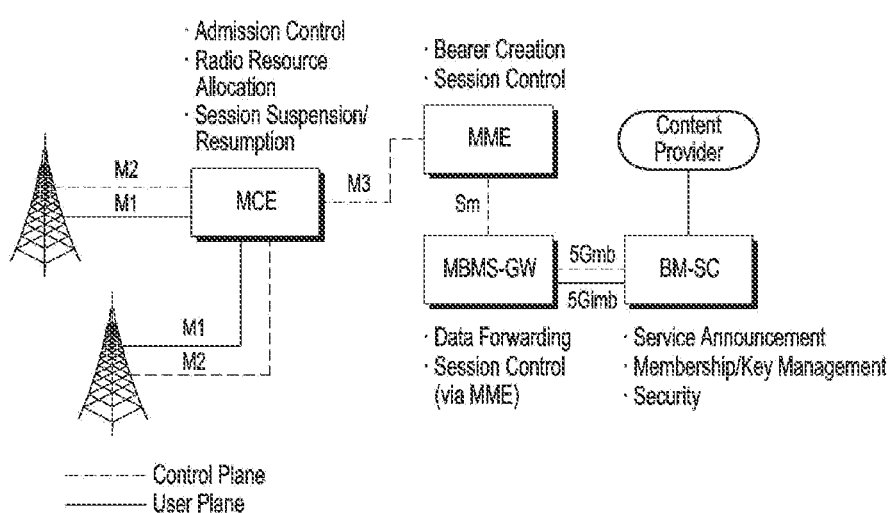
FIG. 1 schematically depicts an eMBMS architecture.

FIG. 1 schematically depicts an eMBMS architecture;

In 4G networks, an eMBMS multicast session includes the following steps:

i. Subscription, during which devices subscribe to a service by establishing an agreement with the content provider.

ii. Service Announcement informs the users about the list of available user services and user service bundles.

iii. Joining is the process with which a device becomes a member of the multicast group by indicating its volition to receive data of a multicast service.

iv. Session Start is when the BM-SC is ready to start transmitting the multicast data. Specifically, at sessions start, the BM-SC allocates the required network resources for the MBMS services.

v. MBMS Notification informs the devices receiving the MBMS service about the upcoming data transmission.

vi. Data Transfer is the phase during which the MBMS data are being transferred to the devices vii. Session Stop is the point when there are no more MBMS data to be transferred and thus the BM-SC tears down any bearers established during the Session Start procedure.

viii. Leaving is the procedure used by a device when it no longer wishes to receive data for an MBMS service is has previously subscribed to, and thus needs to leave the multicast group.

In an eMBMS broadcast session only the Service Announcement, Session Start, MBMS notification, Data Transfer and Session Stops steps are included.

MBMS services in 4G networks can be delivered in either full service more or transport only mode. In the former mode, the MBMS system provides full service layer capabilities. The BM-SC is aware of the content being transmitted and it is capable to transform it into a 3GPP-compliant stream. In the latter mode, the 4G network provides only data transport services. Any signalling and data being transferred via the MBMS bearers are transparent to the BM-SC, and decisions on whether the data will be transmitted in multicast or unicast is up to the content provider.

Multicast/Broadcast to Unicast Switching in 4G

When data is being transmitted in full service mode and depending on the number of devices receiving the same data, it might be desirable that previously unicast transmissions are switched to multicast in order to save network resources. Towards this end, the Multicast operation on Demand (MooD) service has been proposed [1] by 3GPP. According to the solution, when the number of devices consuming the same content in unicast mode reaches a certain threshold (usually defined by the Mobile Network Operator (MNO)), the network dynamically switches the transmission method to multicasting/broadcasting. MooD mainly targets mobile TV, radio broadcasting, live streaming video services an emergency alerts.

5G Architecture

The 5G System (5GS) is designed to provide a more flexible deployment compared to prior 4G systems. In contrast to the 4G architecture where different physical entities are responsible for different functionality, 5G networks move towards a new Service-Based Architecture (SBA) architecture [2], where the different functionality is offered by a collection of network functions (NFs).

With the use of NFs, 5G networks allow the implementation of different network slices that allow the multiplexing of virtualized and independent logical functions over the same physical infrastructure. In 5GS, network slices are identified with a Single Network Slice Selection Assistance Information (S-NSSAI). As explained in [2], [4], an S-NSSAI is comprised of:

A Slice/Service type (SST), which refers to the expected Network Slice behaviour in terms of features and services;

A Slice Differentiator (SD), which is optional information that complements the Slice/Service type(s) to differentiate amongst multiple Network Slices of the same Slice/Service type.

In addition, a related concept is network slice instance (NSI), identified by and NSI ID and defined as a set of Network Function instances and the required resources (e.g. compute, storage and networking resources) which form a deployed Network Slice. Crucially, current specifications allow for a number of NSI IDs to be associated with the same S-NSSAI while also allowing multiple S-NSSAIs to be associated with one NSI ID. Hence, the mapping is two-fold.

This architecture results in flexible and highly adaptable deployments of new services for verticals with different requirements. The major focus points and differences compared to the 4G architecture [2] are the following:

Separation of control and user plane NFs to allow independent and flexible deployments
Modularization of the functions to design
Definition of procedures and services (whenever possible)
Possibility for each NF to directly interact with other NFs if required
Minimization of dependencies between the Access Network (AN) and the Core Network (CN)
Support for stateless NFs so that the computing resources are decoupled from the storage resources.

Figure 2:
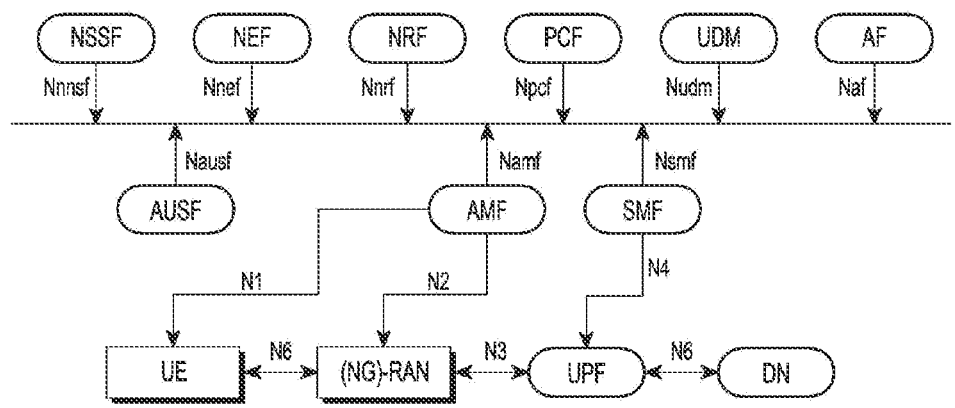
FIG. 2 schematically depicts a 5GS service-based architecture.

FIG. 2 schematically depicts a 5GS service-based architecture;

SBA defines the basic NFs, as shown in FIG. 2. Note that the shown NFs are not exhaustive and includes only the functions that are relevant to the present invention. The detailed functionalities of each NF are described in [2].

Despite the existence of the eMBMS service in 4G networks, eMBMS was not initially included in the specifications for 5G networks. However, it is now considered a basic requirement, and there are currently ongoing discussions on the architectural enhancements needed to support multicast/broadcast in 5GS. The current proposal is concerned with different methodologies/procedure to provide dynamic switching between multicast/broadcast and unicast services in 5GS for different architecture models currently discussing within 3GPP.

5 Mbs Architecture Reference Models

3GPP has agreed to include a study (and a subsequent) work items in Rel-17 on 5G multicast-broadcast Services (5MBS). As since Rel-17 the 5GS is considered a brand new core network (i.e. 5GC) with respect to previous releases, three different architecture reference models may be considered in Rel-17 for the support of multicast/broadcast functionality in 5G networks. It should be understood that the method and network described herein are applicable to the different architecture reference models, as described herein, and that the method and network described herein are not dependent on adoption of any particular architecture reference model. The differences among the architecture reference models lie in the number of the new NFs introduced (if any), and the functionality that each of the new and existing NFs undertake in order to support multicast/broadcast transmissions and delivery method switching.

In the context of this invention, the following definitions apply:

Multicast communication service: A communication service in which the same service and the same specific content data are provided simultaneously to a dedicated set of UEs (i.e., not all UEs in the multicast coverage are authorized to receive the data).
Broadcast communication service: A communication service in which the same service and the same specific content data are provided simultaneously to all UEs in a geographical area (i.e., all UEs in the broadcast coverage area are authorized to receive the data).
MBS service: A communication service that is a multicast communication service and/or a broadcast communication service.
Multicast service area: The area within which data of one or multiple Multicast session(s) are sent.
Broadcast service area: The area within which data of one or multiple Broadcast session(s) are sent.
MBS service area: The area within which data of one or multiple Multicast session(s) and/or broadcast sessions are sent.
MBS session: A multicast session or a broadcast session.
MBS unicast session: a unicast session that may be switched to a multicast and/or broadcast session.

From the view point of 5G CN, two delivery methods are possible:

5GC Individual MBS traffic delivery: A delivery service, also called unicast herein, where the 5G CN receives a single copy of MBS data packets and delivers separate copies of those MBS data packets to individual UEs via per-UE PDU session.
5GC shared MBS traffic delivery: A delivery service, also called multicast herein, where the 5G CN receives a single copy of MBS data packets and delivers a single copy of those MBS data packets to a RAN node.

From the viewpoint of RAN, (in the case of the shared delivery) two delivery methods are available for the transmission of MBS packet flows over radio:

Point-to-Point (PTP) delivery method: a RAN node delivers separate copies of MBS data packet over radio to individual UE.
Point-to-Multipoint (PTM) delivery method: a RAN node delivers a single copy of MBS data packets over radio to a set of UEs.

First Architecture Reference Model

Figure 3A:
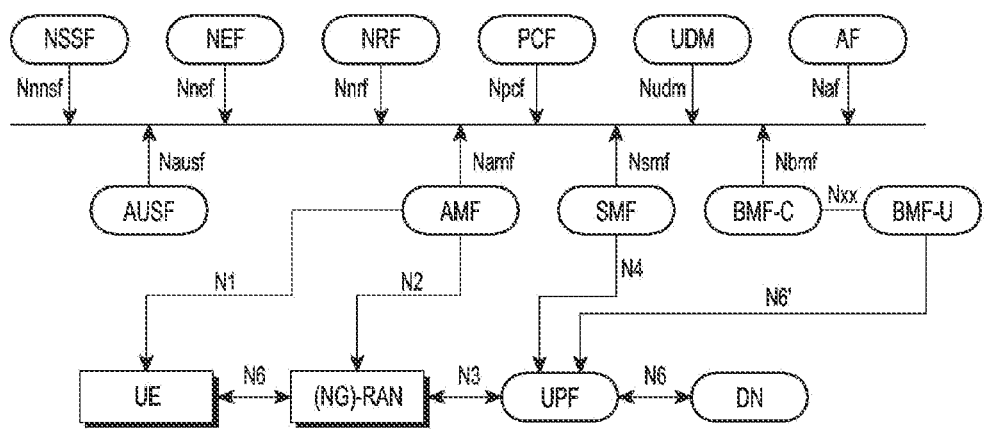
FIG. 3A schematically depicts a first architecture reference model for multicast/broadcast support in 5G.

FIG. 3A schematically depicts a first architecture reference model for multicast/broadcast support in 5G.

In the first architecture reference model (FIG. 3A), a new NF is introduced (i.e. Broadcast Multicast Function (BMF)) for which the principles of control and user plane separation are applied, yielding the BMF-Control Plane (BMF-C) and BMF-User Plane (BMF-U)) entities shown in FIG. 3A. They undertake the role of the BM-SC in the 4G eMBMS framework. The BMF-C function is responsible for controlling the multicast/broadcast sessions, such as the service announcements, and IP multicast/broadcast session control, and can be reached through the Nbmf interface. The BMF-U is responsible for functionality such as data transmission from the content provider and content synchronisation. It is reachable through the BMF-C using the Nxx interface. The BMF-U can also directly communicate with the UPF over the N6' interface.

The functionality of the MBMS-GW is incorporated in the SMF and UPF NFs. Specifically, the multicasting/broadcasting of the data to the RAN nodes of the MBMS-GW is now undertaken by the UPF, while the SMF is now responsible for session control signalling, such as session start and session stop. The functionality of the MCE has been split into various NFs of the 5GC.

Figure 3B:
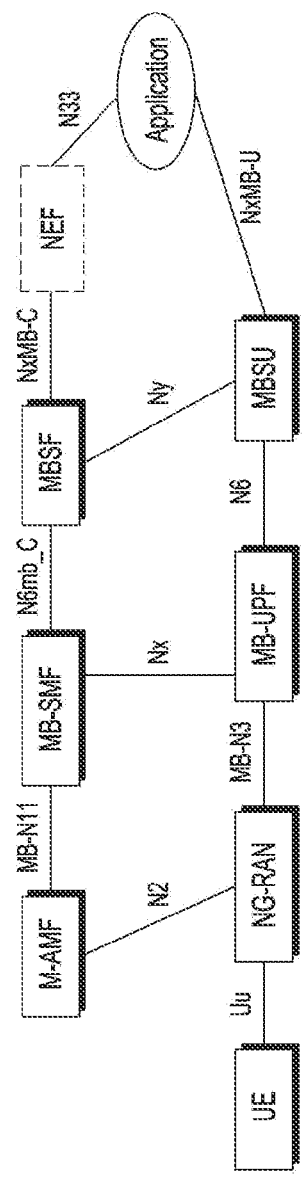
FIG. 3B schematically depicts the first architecture reference model for multicast/broadcast support in 5G of FIG. 3A, having renamed entities.

FIG. 3B schematically depicts the first architecture reference model for multicast/broadcast support in 5G of FIG. 3A, having renamed entities. The Application is also known as the Content Server.

Enhancement to existing entities and new functional components, with respect to existing 5GS architecture, may be as follows:

UE, NG-RAN and M-AMF are enhanced to support MBS.
MB-SMF (Multicast/Broadcast Session Management Function) and MB-UPF (Multicast/Broadcast User Plane Function) are new functional components in 5GS, previously referred to herein as SMF and UPF, respectively. It should be understood that the MB-SMF and/or the MB-UPF may be new entities or updated version of the current SMF and UPF entities.
MBSF (Multicast/Broadcast Service Function) is a new Network Function to handle signalling part to cater for the service layer capability in the Transport-Only and the Full Service Mode, previously referred to herein as BMF-C. It also provides an interface to the Application Server or content provider in the Transport Only mode.

MBSU (Multicast/Broadcast Service User plane) is new entity to handle the payload part to cater for the service layer capability, previously referred to herein as BMF-U.

NEF is an existing NF.

PCF may be enhanced, further details FFS.

Enhancement to existing interfaces and new interfaces may be as follows:

Uu interface
N2 interface
N6 interface
MB-N11
MB-N3
Nx
Ny: new (optional) interface between the new MBSF and MBSU
N6mb-C: new interface between the MBSF and MB-SMF
NxMB-C and NxMB-U: new interface between the new MBSF/MBSU and NEF The difference between transport only and full service mode of operation relies on the transparent delivery of the MBS service via 3GPP networks.

Second Architecture Reference Model

In the second architecture reference model, no new NFs are introduced, and all the functionality is undertaken by the existing NFs of 5G networks. In particular, the control plane functionality of BM-SC and MBMS-GW is now supported in the SMF, while the user plane functionality of BM-SC and MBMS-GW is undertaken by the UPF. PCF may also be updated to account for the policy rules of 5MBS. The functionality of the MCE is similar to that of the first and third architecture reference models.

Third Architecture Reference Model

Figure 4:
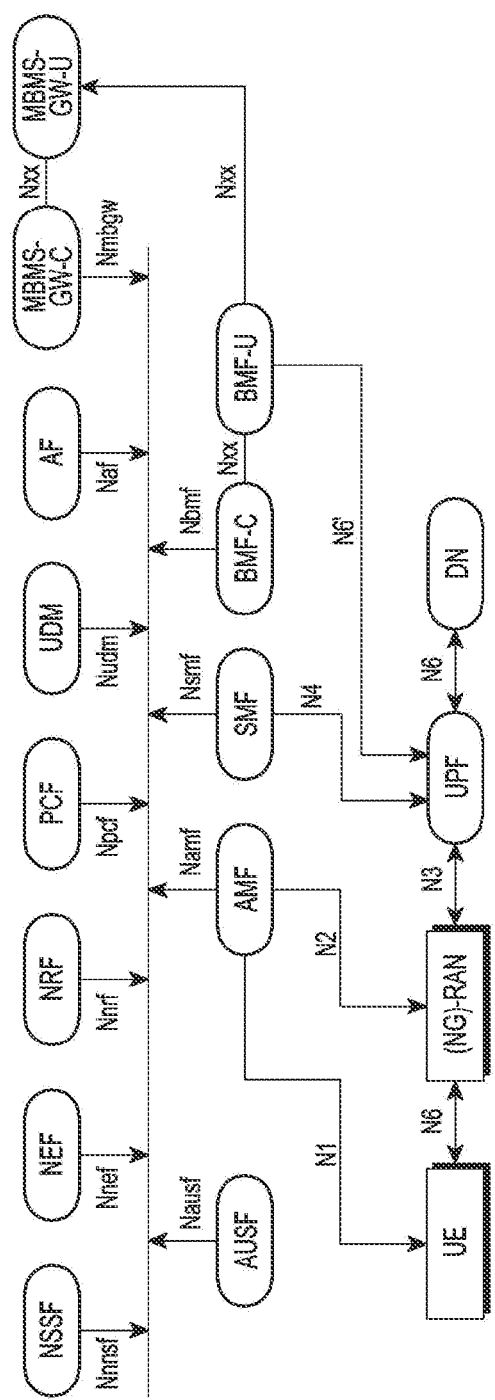
FIG. 4 schematically depicts a third architecture reference model for multicast/broadcast support in 5G.

FIG. 4 schematically depicts a third architecture reference model for multicast/broadcast support in 5G.

In the third architecture reference model (FIG. 4) two additional NFs are introduced that undertake the functionality of the MBMS-GW. Following the split between the control and user plane in 5G networks, the two new NFs are the MBMS-GW-C and MBMS-GW-U respectively. These NFs are in addition to the BMF-C and BMF-U functions introduced in the architecture model #1. The MBMS-GW-C function is reachable through the newly introduced Nmbgw interface, while the MBMS-GW-U function is reachable via the MBMS-GW-C through the Nxx interface. The MBMS-GW-U is also directly reachable by the BMF-U for data transmission from the content provider. In this model, the MBMS-GW-C function is responsible for the control plane functionality of the MBMS-GW in 4G networks (e.g. session control signalling), while the MBMS-GW-U is responsible for sending the multicast/broadcast data to the NG-RAN nodes.

The functionality of the MCE is similar to that of the first architecture reference model.

Figure 5:
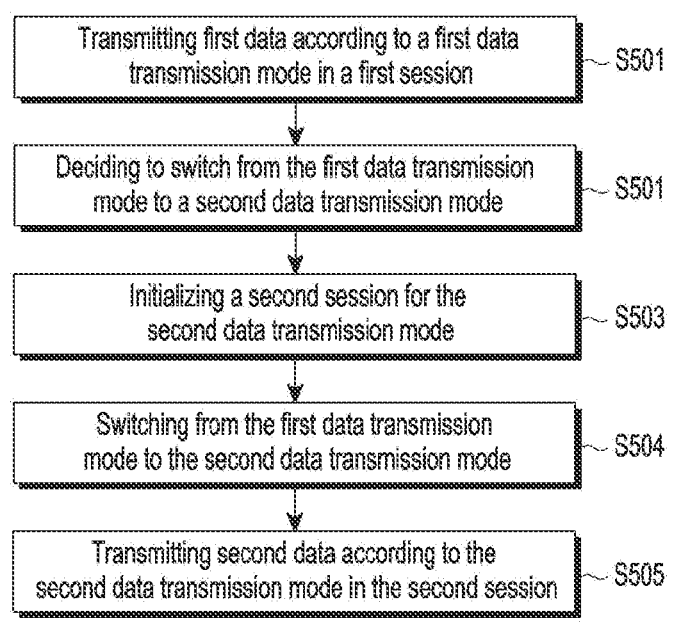
FIG. 5 schematically depicts a flow chart according to an exemplary embodiment.

FIG. 5 schematically depicts a flow chart according to an exemplary embodiment.

In One Embodiment

A method for switching from a first data transmission mode to a second data transmission mode in a communication network comprising a new generation radio access network (NG-RAN) node, a Core node and a content provider, wherein the method comprises:

transmitting, by the NG-RAN node, first data from the content provider to a user equipment (UE) according to the first data transmission mode in a first session, wherein the first data transmission mode is a unicast transmission method via individual delivery; (S501)

deciding, by the NG-RAN node or the core node or the content provider, to switch from the first data transmission mode to the second data transmission mode, wherein the second data transmission mode is a multicast transmission mode via shared delivery; (S502)

initializing, by the core node, a second session for the second data transmission mode; (S503)

switching, by the core node, from the first data transmission mode to the second data transmission mode; and (S504)

transmitting, by the NG-RAN node, second data from the content provider to the UE according to the second data transmission mode in the second session. (S505)

In Another Embodiment

The process is of switching from a first data transmission method to a second data transmission method in a 5G network comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network.

The process comprises:

transmitting, by the first NG-RAN node, first data from the set of content providers to the first UE according to the first data transmission method in a first session (S501);

deciding, by the first UE or the first NG-RAN node or the 5G Core or the Content Server, to switch from the first data transmission method to the second transmission method (S502);

initializing, by the 5G Core, a second session for the second transmission method (S503);

switching, by the 5G Core, from the first data transmission method to the second transmission method (S504); and transmitting, by the first NG-RAN node, second data from the set of content providers to the first UE according to the second data transmission method in the second session (S505).

Figure 6:
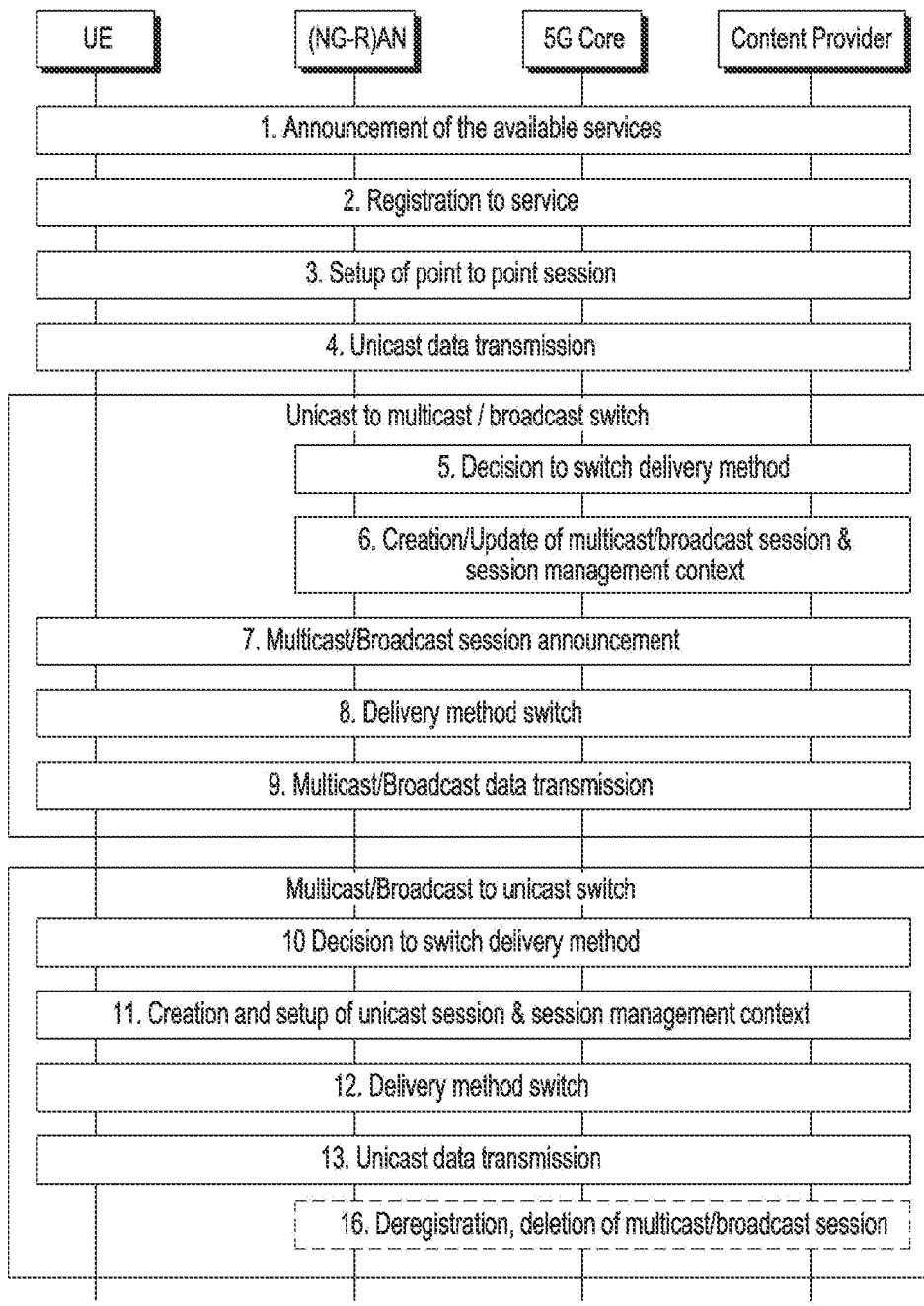
FIG. 6 schematically depicts a process according to an exemplary embodiment.

FIG. 6 schematically depicts a process according to an exemplary embodiment.

This invention presents a novel mechanism to perform switching of the delivery data transmission method over a 5GS. This means that detailed mechanisms involving a plurality of 5GC NFs are presented enabling a unicast transmission method for a UE to be switched to multicast or broadcast transmission over a 5GC (commonly referred as 5MBS), as well as the case when a 5MBS transmission method is switched to unicast transmission. The feature of delivery mode switching in cellular networks (i.e. unicast to multicast/broadcast or vice versa) presents significant benefits, as it is described below. Hence, switching over 5GC is a highly desirable functionality in need of a novel set of procedures based on the current 5GS service-based architecture.

As an example, when a UE wishes to receive content from an application server (also known as content provider) a point to point connection can be set up. Depending on the number of devices that receive the same content, their respective locations as well as other RAN considerations such as the air interface resource usage, the content provider and/or the network operator may decide to switch the delivery method from multiple point to point connections to a single multicast/broadcast connection. Another example is the case of multiple cars having one to one connections with a gNB in a V2X scenario, where a notification for an incident needs to be sent to all vehicles within a certain area. In this case, the current one to one connections of the vehicles need to be switched to broadcast or multicast to ensure that all vehicles within the affected area receive the important notifications, making sure that service continuity is guaranteed. In addition, it is possible that a UE receiving a multicast session moves across NG-RAN nodes, from a gNB that supports 5MBS to a gNB that does not or that is currently delivers multicast/broadcast sessions via point to point connections. In this case, it is required that the multicast session of the UE is switched a unicast, point to point transmission. Other switching scenarios examples can be found in services such as industrial internet of things (IIoT) or public safety.

Hence, the text above shows that different triggers may exist to perform session switch from unicast to multicast/broadcast or vice versa, including service continuity during UE mobility, transmission efficiency depending on the amount of users accessing certain media content, specific requirements of IIoT or public safety, etc. Moreover, the switch may be triggered as a result of one or several network entities making such a decision. As described in Section 3.5, the network entities that may trigger the switch are the UE, the radio access network (i.e. NG-RAN for 5G), the 5GC (i.e. one or several NFs that compose it), or the external content/application server. Depending on the triggering entity, there may be required a counting step to determine how much traffic is being consumed in the network in any of the delivery methods mentioned above, i.e. unicast, multicast or broadcast. Those reports may also be shared with different entities within the network before the actual session switching mechanisms start.

In this invention we provide a solution to support delivery method switching between unicast and multicast/broadcast in 5G networks. An exemplary embodiment is depicted in FIG. 6, without loss of generality, in which we assume that no multicast sessions exist and the initial connection is a unicast one). The content provider in collaboration with the 5GS announces the available services. UEs that are interested in receiving a service have to register to it. During registration the network and content provider perform the necessary checks to ensure that the UE is authorised to receive the service. Once the UE has passed all necessary checks, the network sets up a point to point connection, after which data is being transmitted in unicast mode. Once the decision to switch has been made, the network creates and sets up a multicast session, and then announces the session throughout its 5MBS service area. Afterwards, the network informs the UE that a session switch is required, providing it with all essential information for switching to the new session. When switching from unicast to multicast the UE needs to join the new session. Subsequently, for both multicast and broadcast sessions the data transmission commences. Finally, if the UE moves within the coverage area of a base station that does not provide multicast sessions or if the network in collaboration with the content provider decides to switch the multicast session to a unicast one, a new point to point connection must be established. The network then notifies the UEs about the delivery method switch and sets up a point to point connection and requests the UE to switch from the previous multicast session to the newly established unicast session. The data transmission can then begin. Optionally, if the delivery method switch occurs within cells that previously transmitted the data in multicast mode, the network may decide to delete the session and any relevant information of the multicast transmission.

An additional aspect of the switching proposal included in some embodiments are slice and session considerations, namely whether a new session and/or network slice is required to perform the delivery method switch.

Session considerations: when a unicast transmission is switched into multicast or broadcast (i.e. 5MBS) transmission, it may be possible to keep the same session alive if the set of NFs needed to deliver the session are the same. Hence, a reference architecture alternative requiring specific NFs to execute the 5MBS transmission would necessarily require a new session being established, while an architecture alternative without specific NFs for 5MBS may either establish a new session or switch the previously existing session. In addition, in some embodiments, an MBS session may be used for unicast transmission and may be updated for multicast delivery, and vice versa. In that case, any MBS dedicated entity may handle both the unicast and multicast sessions.

Slicing considerations: similarly, when a delivery method switch is performed, the slice carrying the previously existing session may or may not change in the process. It is important to note that a change in the slice may be performed via a variety of slicing parameters, i.e., both/either the network slice (identified by S-NSSAI) and/or network slice instance (identified by NSI ID) may play a role in the switching slicing considerations. If the switch is performed without taking slicing considerations into account, then both S-NSSAI and NSI ID remain the same. If they are taken into account, they may change in a number of possible ways. As stated in [2], it is both possible that a number of network slice instances are mapped to the same network slice, and one same network slice instance is mapped to a set of network slices. Hence, when a switch is performed, it is both possible that S-NSSAI doesn't change while the NSI ID changes, and the S-NSSAI doesn't change while the NSI ID changes. If the S-NSSAI changes, then both the SST and SD may change, or only the SD changes while the SST is kept.

Furthermore, for some embodiments, the session and slicing considerations above will also depend on the content continuity, i.e. whether the UE continues to receive content from the same application server before and after the switch, and whether the service itself is the same before and after the switch happened. As a set of examples, the switching mechanism may not be the same i) if the switch is performed to distribute the same content over multicast in a more efficient way, ii) if it is performed to guarantee service continuity due to UE mobility across different NG-RAN nodes with support of 5MBS and lack thereof, or iii) whether the switch happens because the UE is forced to switch to a public safety service while it was busy with a different unicast type of service.

Process (Method)

The first aspect provides a process of switching from a first data transmission method to a second data transmission method in a 5G network comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network, wherein the method comprises:
- transmitting, by the first NG-RAN node, first data from the set of content providers to the first UE according to the first data transmission method in a first session;
- deciding, by the first UE or the first NG-RAN node or the 5G Core or the Content Server, to switch from the first data transmission method to the second transmission method;
- initializing, by the 5G Core, a second session for the second transmission method;
- switching, by the 5G Core, from the first data transmission method to the second transmission method; and
- transmitting, by the first NG-RAN node, second data from the set of content providers to the first UE according to the second data transmission method in the second session.

In one example, the 5G Core may be called core node, the content provider may be called content server or application server, and the transmission method maybe called transmission mode. In one example, the process comprises performing, by the first UE, a registration procedure, for example according to [3].

In one example, the process comprises establishing, by the first UE and/or the 5G Core, the first session, for example according to [3].

In one example, the process comprises requesting, by the UE, the first NG-RAN node, the 5G Core and/or the Content Server, the second session from the 5G Core, for example from a Broadcast Multicast Service Center Control/User Plane, BMF-C, and/or a Session Management Function, SMF, thereof.

In one example, the process comprises discovering, by the 5G Core, for example by a BMF-C and/or a SMF thereof, the second session.

In one example, the second session comprises and/or is the first session i.e. the same session. In one example, the second session and the first session are different sessions.

In one example initializing, by the 5G Core, the second session comprises creating, by the 5G Core, for example by a SMF thereof, the second session, wherein the second session is a newly-created session.

In one example, initializing, by the 5G Core, the second session comprises updating, by the 5G Core, for example by a SMF thereof, the second session, wherein the second session is a pre-existing session.

In one example, the process comprises configuring, by the 5G Core, for example by a BMF-C and/or a SMF thereof, a second session management context for the second session.

In one example, configuring, by the 5G Core, the second session management context comprises creating, by the 5G Core, for example by the SMF thereof, the second session management context, wherein the second session management context is a newly-created session management context.

In one example, configuring, by the 5G Core, the second session management context comprises updating, by the 5G Core, for example by the SMF thereof, the second session management context, wherein the second session management context is a pre-existing session management context.

In one example, the process comprises registering, by the 5G Core, for example by a SMF thereof, the second session.

In one example, the process comprises announcing, by the 5G Core, the second session.

In one example, the process comprises transferring, by the 5G Core, for example by an Access and Mobility Function, AMF, thereof, a message to the first NG-RAN node.

In one example, the process comprises requesting, by the 5G Core, for example by a SMF to an AMF thereof, to transfer a message to the first NG-RAN node.

In one example, the process comprises establishing, by the first NG-RAN node, resources associated with the second session.

In one example, the process comprises joining, by the first NG-RAN node, the second session, for example wherein the second data transmission method is a multicast broadcast transmission method.

In one example, the process comprises updating, by the 5G Core, the second session management context with information from the first NG-RAN node.

In one example, the process comprises releasing, by the first NG-RAN node, resources associated with the first session.

In one example, the process comprises deregistering, by the 5G Core, the first session.

In one example, the first data transmission method is a unicast data transmission method and wherein the second data transmission method is a multicast or a broadcast transmission method.

In one example, the first data transmission method is a multicast or a broadcast data transmission method and wherein the second data transmission method is a unicast transmission method.

In one example, transmitting, by the first NG-RAN node, the first data from the set of content providers to the first UE according to the first data transmission method in the first session comprises transmitting, by the first NG-RAN node, the first data from the first content provider to the first UE according to the first data transmission method in the first session. In one example, transmitting, by the first NG-RAN node, the second data from the set of content providers to the first UE according to the second data transmission method in the second session comprises transmitting, by the first NG-RAN node, the second data from the first content provider to the first UE according to the second data transmission method in the second session. In one example, transmitting, by the first NG-RAN node, the first data from the set of content providers to the first UE according to the first data transmission method in the first session comprises transmitting, by the first NG-RAN node, the first data from the first content provider to the first UE according to the first data transmission method in the first session and transmitting, by the first NG-RAN node, the second data from the set of content providers to the first UE according to the second data transmission method in the second session comprises transmitting, by the first NG-RAN node, the second data from the first content provider to the first UE according to the second data transmission method in the second session. In one example, the set of content providers includes a second content provider, different from the first content provider, and transmitting, by the first NG-RAN node, the second data from the set of content providers to the first UE according to the second data transmission method in the second session comprises transmitting, by the first NG-RAN node, the second data from the second content provider to the first UE according to the second data transmission method in the second session. In one example, the set of content providers includes a second content provider, different from the first content provider, transmitting, by the first NG-RAN node, the first data from the set of content providers to the first UE according to the first data transmission method in the first session comprises transmitting, by the first NG-RAN node, the first data from the first content provider to the first UE according to the first data transmission method in the first session and transmitting, by the first NG-RAN node, the second data from the set of content providers to the first UE according to the second data transmission method in the second session comprises transmitting, by the first NG-RAN node, the second data from the second content provider to the first UE according to the second data transmission method in the second session.

In one example, the first aspect provides a process of switching from a first data transmission method to a second data transmission method in a 5G network comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network, wherein the process comprises:
- transmitting, by the first NG-RAN node, first data from the set of content providers to the first UE according to the first data transmission method in a first session, wherein the first data transmission method is a unicast transmission method via individual delivery;
- deciding, by the first NG-RAN node or the 5G Core or the first content provider, to switch from the first data transmission method to the second transmission method, wherein the second data transmission method is a multicast transmission method via shared delivery;
- initializing, by the 5G Core, a second session for the second transmission method;
- switching, by the 5G Core, from the first data transmission method to the second transmission method; and
- transmitting, by the first NG-RAN node, second data from the set of content providers to the first UE according to the second data transmission method in the second session.

In one example, the process comprises requesting, by the first NG-RAN node, the 5G Core and/or the first content provider, the second session from the 5G Core, for example from a Multicast/Broadcast Service Function, MBSF, thereof.

In one example, the process comprises discovering, by the 5G Core, for example by a MBSF thereof, the second session.

In one example, initializing, by the 5G Core, the second session comprises updating, by the 5G Core, for example by a SMF and/or a MB-SMF thereof, the second session, wherein the second session is a pre-existing session.

In one example, the process comprises configuring, by the 5G Core, for example by a MBSF and/or a MB-SMF thereof, a second session management context for the second session.

In one example, the process comprises transferring, by the 5G Core, for example by an AMF thereof, a message to the first NG-RAN node.

In one example, the process comprises establishing, by the first NG-RAN node, resources associated with the second session.

In one example, deciding, by the first NG-RAN node or the 5G Core or the first content provider, to switch from the first data transmission method to the second transmission method comprises deciding, by the first NG-RAN node, to switch from the first data transmission method to the second transmission method.

In one example, the process comprises requesting, by the MBSF to the MB-SMF, to update the first session of the UE, thereby providing the second session and/or registering, by the MB-SMF to the UDM, the update from the first session to the second session and optionally, acknowledging, by the UDM to the MB-SMF.

In one example, the process comprises exchanging, by the MBSF and the MBSU, messages and/or comprising transmitting, by the MB-SMF to the AMF, a message and requesting, by the MB-SMF to the AMF, to forward the message to the first NG-RAN node, wherein the message comprises parameters of the second session.

In one example, the first data transmission method is a MBS data transmission method, for example wherein the first session comprises and/or is an individual MBS session; and
wherein the second data transmission method is a MBS data transmission method, for example wherein the second session comprises and/or is a shared MBS session.

In one example, the first aspect provides a process of switching from a first data transmission method to a second data transmission method in a 5G network comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network, wherein the process comprises:
- transmitting, by the first NG-RAN node, first data from the set of content providers to the first UE according to the first data transmission method in a first session, wherein the first data transmission method is a multicast or a broadcast data transmission method via shared delivery;
- deciding, by the first NG-RAN node or the 5G Core or the first content provider, to switch from the first data transmission method to the second transmission method, wherein the second data transmission method is a unicast transmission method via individual delivery;
- initializing, by the 5G Core, a second session for the second transmission method;
- switching, by the 5G Core, from the first data transmission method to the second transmission method; and
- transmitting, by the first NG-RAN node, second data from the set of content providers to the first UE according to the second data transmission method in the second session.

In one example, the process comprises requesting, by the first NG-RAN node, the 5G Core and/or the first content provider, the second session from the 5G Core, for example from a Multicast/Broadcast Service Function, MBSF, thereof.

In one example, the process comprises discovering, by the 5G Core, for example by a MBSF thereof, the second session.

In one example, initializing, by the 5G Core, the second session comprises updating, by the 5G Core, for example by a SMF and/or a MB-SMF thereof, the second session, wherein the second session is a pre-existing session.

In one example, the process comprises configuring, by the 5G Core, for example by a MBSF and/or a MB-SMF thereof, a second session management context for the second session.

In one example, the process comprises transferring, by the 5G Core, for example by an AMF thereof, a message to the first NG-RAN node.

In one example, the process comprises establishing, by the first NG-RAN node, resources associated with the second session.

In one example, deciding, by the first NG-RAN node or the 5G Core or the first content provider, to switch from the first data transmission method to the second transmission method comprises deciding, by the first NG-RAN node, to switch from the first data transmission method to the second transmission method.

In one example, the process comprises requesting, by the MBSF to the MB-SMF, to update the first session of the UE, thereby providing the second session and/or registering, by the MB-SMF to the UDM, the update from the first session to the second session and optionally, acknowledging, by the UDM to the MB-SMF.

In one example, the process comprises exchanging, by the MBSF and the MBSU, messages and/or comprising transmitting, by the MB-SMF to the AMF, a message and requesting, by the MB-SMF to the AMF, to forward the message to the first NG-RAN node, wherein the message comprises parameters of the second session.

In one example, the first data transmission method is a MBS data transmission method, for example wherein the first session comprises and/or is a shared MBS session, such as a pre-existing shared MBS session; and wherein the second data transmission method is a MBS data transmission method, for example wherein the second session comprises and/or is an individual MBS session.

In one example, the process comprises suspending and/or releasing, for example by the 5GC, the first session, if the number of UEs included in the first session is less than a threshold number, for example if there are no UEs included in the first session.

In one example, the process comprises requesting, by the MBSF to the MB-SMF, suspension of the first session.

In one example, the process comprises requesting, by the MB-SMF to the AMF, release of the first session and/or deletion of associated resources.

The network may be as described with respect to the second aspect.

5G NETWORK (Communication Network)

The second aspect provides a 5G network for switching from a first data transmission method to a second data transmission, comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network;
  wherein the first NG-RAN node is configured to transmit first data from the set of content providers to the first UE according to the first data transmission method in a first session;
  wherein the first UE or the first NG-RAN node or the 5G Core or the Content Server is configured to decide to switch from the first data transmission method to the second transmission method;
  wherein the 5G Core is configured to initialize a second session for the second transmission method;
  wherein the 5G Core is configured to switch from the first data transmission method to the second transmission method; and
  wherein the first NG-RAN node is configured to transmit second data from the set of content providers to the first UE according to the second data transmission method in the second session.

It should be understood that the set of content providers (also known as content servers or application servers) are communicatively coupled to the 5G network (communication network) and may be considered a separate or an integral part thereof.

The 5G network may be configured to implement any of the process according to the first aspect.

In one example, the 5G network comprises a M-AMF, a MB-SMF, a MB-UBF, a MBSF, a MBSU and/or a NEF. In one example, the M-AMF is communicatively coupled, for example bidirectionally, to the NG-RAN and/or the MB-SMF. In one example, the MB-SMF is communicatively coupled, for example bidirectionally, to the M-AMF, the MB-UPF and/or the MBSF. In one example, the MBSF is communicatively coupled, for example bidirectionally, to the MB-SMF, the MBSU, the NEF and/or the Content Server. In one example, the MBSU is communicatively coupled, for example bidirectionally, to the MB-UPF, the MBSF and/or the Content Server. In one example, the MB-UPF is communicatively coupled, for example bidirectionally, to the NG-RAN, the MB-SMF and/or the MBSU.

In one example, the 5G Core comprises an AMF, a SMF and/or a BMF-C. In one example, the 5G Core comprises an AMF, a SMF and a BMF-C.

In one example, the 5G Core comprises a NSSF, an AUSF, a NEF, a NRF, an AMF, a PCF, a SMF, an UPF, a DN, a UDM, a BMF-C, a BMF-U and/or an AF. In one example, the 5G Core comprises a NSSF, an AUSF, a NEF, a NRF, an AMF, a PCF, a SMF, an UPF, a DN, a UDM, a BMF-C, a BMF-U and an AF.

In one example, the 5G Core comprises a NSSF, an AUSF, a NEF, a NRF, an AMF, a PCF, a SMF, an UPF, a DN, a UDM, a BMF-C, a BMF-U, an AF, a MBMS-GW-C and/or a MBMS-GW-U. In one example, the 5G Core comprises a NSSF, an AUSF, a NEF, a NRF, an AMF, a PCF, a SMF, an UPF, a DN, a UDM, a BMF-C, a BMF-U, an AF, a MBMS-GW-C and a MBMS-GW-U.

In one example, the set of content providers includes a second content provider, for example different from the first content provider.

In one example, the second aspect provides a 5G network for switching from a first data transmission method to a second data transmission, comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network;
  wherein the first NG-RAN node is configured to transmit first data from the set of content providers to the first UE according to the first data transmission method in a first session, wherein the first data transmission method is a unicast transmission method via individual delivery;
  wherein the first NG-RAN node or the 5G Core or the Content Server is configured to decide to switch from the first data transmission method to the second transmission method;
  wherein the 5G Core is configured to initialize a second session for the second transmission method, wherein the second data transmission method is a multicast transmission method via shared delivery;
  wherein the 5G Core is configured to switch from the first data transmission method to the second transmission method; and
  wherein the first NG-RAN node is configured to transmit second data from the set of content providers to the first UE according to the second data transmission method in the second session.

In one example, the second aspect provides a 5G network for switching from a first data transmission method to a second data transmission, comprising a set of user equipment, UE, including a first UE, a set of New Generation Radio Access Network (NG-RAN) nodes including a first NG-RAN node, a 5G Core and a set of content providers, including a first content provider, communicatively coupled to the 5G network;

wherein the first NG-RAN node is configured to transmit first data from the set of content providers to the first UE according to the first data transmission method in a first session, wherein the first data transmission method is a multicast or a broadcast data transmission method via shared delivery;

wherein the first NG-RAN node or the 5G Core or the Content Server is configured to decide to switch from the first data transmission method to the second transmission method, wherein the second data transmission method is a unicast transmission method via individual delivery;

wherein the 5G Core is configured to initialize a second session for the second transmission method;

wherein the 5G Core is configured to switch from the first data transmission method to the second transmission method; and wherein the first NG-RAN node is configured to transmit second data from the set of content providers to the first UE according to the second data transmission method in the second session.

In one example, the third aspect provides a method for switching from a first data transmission mode to a second data transmission mode in a communication network comprising a new generation radio access network (NG-RAN) node, a Core node and a content provider, wherein the method comprises:

transmitting, by the NG-RAN node, first data from the content provider to a user equipment (UE) according to the first data transmission mode in a first session, wherein the first data transmission mode is a unicast transmission method via individual delivery;

deciding, by the NG-RAN node or the core node or the content provider, to switch from the first data transmission mode to the second data transmission mode, wherein the second data transmission mode is a multicast transmission mode via shared delivery;

initializing, by the core node, a second session for the second data transmission mode;

switching, by the core node, from the first data transmission mode to the second data transmission mode; and transmitting, by the NG-RAN node, second data from the content provider to the UE according to the second data transmission mode in the second session.

In one example, the method comprises at least one of:

requesting, by the NG-RAN node, the core node and/or the content provider, the second session from the core node, for example from a multicast/broadcast service function (MBSF) thereof;

discovering, by the core node, for example by the MBSF thereof, the second session;

configuring, by the core node, for example by the MBSF and/or a multicast/broadcast session management function (MB-SMF) thereof, a second session management context for the second session;

transferring, by the core node, for example by an access and mobility function (AMF) thereof, a message to the NG-RAN node; and establishing, by the NG-RAN node, resources associated with the second session.

In one example, wherein initializing, by the core node, the second session comprises updating, by the core node, for example by a SMF and/or a MB-SMF thereof, the second session, wherein the second session is a pre-existing session.

In one example, the method comprises at least one of:

requesting, by the MBSF of the core node to the MB-SMF of the core node, to update the first session of the UE, thereby providing the second session and/or registering, by the MB-SMF to a unified data management (UDM) of the core node, the update from the first session to the second session and optionally, acknowledging, by the UDM to the MB-SMF.

In one example, the method comprises at least one of:

exchanging, by the MBSF and a multicast/broadcast service user plane (MBSU) of the core node, messages; and/or transmitting, by the MB-SMF of the core node to the AMF of the core node, a message and requesting, by the MB-SMF of the core node to the AMF of the core node, to forward the message to the NG-RAN node, wherein the message comprises parameters of the second session.

In one example, wherein the first data transmission mode is a MBS data transmission mode, for example wherein the first session comprises an individual MBS session; and wherein the second data transmission mode is a MBS data transmission mode, for example wherein the second session comprises a shared MBS session.

In one example, the fourth aspect provides an apparatus for switching from a first data transmission mode to a second data transmission mode in a communication network, the apparatus comprising a new generation radio access Network (NG-RAN) node, a core node, and a content provider, wherein the NG-RAN node is configured to transmit first data from the content provider to the user equipment (UE) according to the first data transmission mode in a first session, wherein the first data transmission mode is a unicast transmission mode via individual delivery;

wherein the NG-RAN node or the core node or the content provider is configured to decide to switch from the first data transmission mode to the second data transmission mode;

wherein the core node is configured to initialize a second session for the second data transmission mode, wherein the second data transmission mode is a multicast transmission mode via shared delivery;

wherein the core node is configured to switch from the first data transmission mode to the second data transmission mode; and wherein the NG-RAN node is configured to transmit second data from the content provider to the UE according to the second data transmission mode in the second session.

In one example, the fifth aspect provides a method for switching from a first data transmission mode to a second data transmission mode in a communication network comprising a new generation radio access network (NG-RAN) node, a core node and a content provider, wherein the method comprises:

transmitting, by the NG-RAN node, first data from the content provider to the user equipment (UE) according to the first data transmission mode in a first session, wherein the first data transmission mode is a multicast or a broadcast data transmission mode via shared delivery;

deciding, by the NG-RAN node or the core node or the content provider, to switch from the first data transmission mode to the second data transmission mode, wherein the second data transmission mode is a unicast transmission mode via individual delivery;

initializing, by the core node, a second session for the second data transmission mode;

switching, by the core node, from the first data transmission mode to the second data transmission mode; and transmitting, by the NG-RAN node, second data from the content provider to the UE according to the second data transmission mode in the second session.

In one example, the method comprises at least one of:

requesting, by the NG-RAN node, the core node and/or the content provider, the second session from the core node, for example from a multicast/broadcast service function (MBSF) thereof;

discovering, by the core node, for example by the MBSF thereof, the second session;

configuring, by the core node, for example by the MBSF and/or a multicast/broadcast session management function (MB-SMF) thereof, a second session management context for the second session;

transferring, by the core node, for example by an access and mobility function (AMF) thereof, a message to the NG-RAN node; and establishing, by the NG-RAN node, resources associated with the second session.

In one example, wherein initializing, by the core node, the second session comprises updating, by the core node, for example by a SMF and/or a MB-SMF thereof, the second session, wherein the second session is a pre-existing session.

In one example, the method comprises at least one of:

requesting, by the MBSF of the core node to the MB-SMF of the core node, to update the first session of the UE, thereby providing the second session and/or registering, by the MB-SMF to a unified data management (UDM) of the core node, the update from the first session to the second session and optionally, acknowledging, by the UDM to the MB-SMF.

In one example, the method comprises at least one of:

exchanging, by the MBSF of the core node and a multicast/broadcast service user plane (MBSU) of the core node, messages, and/or transmitting, by the MB-SMF of the core node to the AMF of the core node, a message and requesting, by the MB-SMF of the core node to the AMF of the core node, to forward the message to the NG-RAN node, wherein the message comprises parameters of the second session.

In one example, wherein the first data transmission mode is a MBS data transmission mode, for example wherein the first session comprises a shared MBS session, such as a pre-existing shared MBS session; and wherein the second data transmission mode is a MBS data transmission mode, for example wherein the second session comprises an individual MBS session.

In one example, the method comprises at least one of:

suspending and/or releasing, by the core node, the first session, if a number of UEs included in the first session is less than a threshold number, for example if there are no UEs included in the first session;

requesting, by the MBSF of the core node to the MB-SMF of the core node, suspension of the first session; and requesting, by the MB-SMF of the core node to the AMF of the core node, release of the first session and/or deletion of associated resources.

In one example, the sixth aspect provides an apparatus for switching from a first data transmission mode to a second data transmission mode in a communication network, the apparatus comprising a new generation radio access network (NG-RAN) node, a core node, and a content provider, wherein the NG-RAN node is configured to transmit first data from the content provider to the user equipment (UE) according to the first data transmission mode in a first session, wherein the first data transmission mode is a multicast or a broadcast data transmission mode via shared delivery, wherein the NG-RAN node or the core node or the content provider is configured to decide to switch from the first data transmission mode to the second data transmission mode, wherein the second data transmission mode is a unicast transmission mode via individual delivery, wherein the core node is configured to initialize a second session for the second data transmission mode, wherein the core node is configured to switch from the first data transmission mode to the second data transmission mode, and wherein the NG-RAN node is configured to transmit second data from the content provider to the UE according to the second data transmission mode in the second session.

EXAMPLES

This section presents different solutions for supporting delivery method switching (unicast to multicast/broadcast, multicast/broadcast to unicast) in 5G networks. As the final architecture model for 5G networks has not yet been defined, we present solutions for the most prominent architecture reference models. For each of the models, we present examples for switching the delivery method from unicast to multicast/broadcast, as well as from multicast/broadcast to unicast. Furthermore, we also consider whether a session pre-exists the delivery method switch or not separately.

Solutions for the First Architecture Reference Model

This embodiment is relevant to the first architecture reference model, where the BMF-C and BMF-U additional network functions are considered. When switching the delivery method from unicast to either multicast or broadcast, two different solutions are presented depending on whether a session pre-exists or not. When the delivery method is switched from multicast/broadcast to unicast, we present a single solution as a new session will have to be established as long as the UE to be switched is not the last one in the 5MBS group.

Example 1.1 Unicast to Multicast/Broadcast Delivery Method Switching with No Pre-Existing Session In this example, there exist neither a multicast session nor any session management context for the service, and thus a new session (i.e. the second session) and session management context must be created once the delivery method switch is triggered.

In one example, the process comprises registering, by the UE (i.e. the first UE), with the 5GS, for example by performing the registration procedure according to [3].

In one example, the process comprises establishing, by the UE and the 5G Core, a unicast PDU session, for example according to [3].

In one example, the process comprises transmitting, by the content server (i.e. the set of content providers), the unicast transmission (i.e. the first data transmission method). In one example, the process comprises starting, by the content server, the unicast transmission.

In one example, the process comprises transmitting, by the UE, consumption reports to the network regarding respective unicast PDU sessions. In one example, the process comprises periodically transmitting, by the UE, consumption reports to the network regarding respective unicast PDU sessions. These reports may later be used by the network to trigger the delivery method switch. As this step is optional the delivery method switch may be triggered based on other criteria.

In one example, the process comprises deciding, by the UE or the NG-RAN or the 5G Core or the Content Server, to switch the delivery method from the unicast session and/or multiple unicast sessions (i.e. the first session), for example, to a multicast/broadcast session (i.e. the second session), for example a single multicast/broadcast session.

In one example, the process comprises requesting, by the UE or the NG-RAN or the 5G Core or the Content Server, a new session (i.e. the second session) from the BMF-C. In one example, the step of deciding and the step of requesting are both performed by the UE or the NG-RAN or the 5G Core or the Content Server (i.e. by the same entity). In one example, the process comprises requesting, by the Content Server, a new session from the BMF-C, for example in the case where it was the Content Server that decided the delivery method switch.

In one example, the process comprises discovering, by the BMF-C, the downstream network functions that will be involved in the new session. The execution of this step is subject to different conditions.

The following, not exhaustive list, includes some cases where NF discovery is required:
  a. A UE being the first one to switch the delivery method from unicast to multicast, i.e. a new session and session management context need to be created.
  b. The UE moving from a cell where the content is delivered in unicast mode, to a 5MBS-capable cell, where there is no ongoing multicast session.

The following, not exhaustive list, includes some cases where NF discovery is not required:
  a. The UE moving from a cell where the content is delivered in unicast mode, to a 5MBS-capable cell, where there is an ongoing multicast session.
  b. A previous multicast session exists in an inactive state and can be re-used.

In one example, the process comprises requesting, by the BMF-C, creation of the new session by the SMF. In one example, requesting the creation of the new session comprises providing, by the BMF-C, required parameters for the new session. In one example, the process comprises responding, by the SMF, to acknowledge the creation of the new session. In one example, responding comprises providing, by the SMF, its multicast IP address and port number.

In one example, the process comprises sending, by the BMF-C, a message, for example a Nsmf_PDUSession_CreateSMContext message, to the SMF to request creation of a new session management context. In one example, the process comprises confirming, by the SMF, successful creation of the new session management context, for example by including, by the SMF, a Nsmf_PDUSession_CreateSMContext Response message.

In one example, the process comprises registering, by the SMF, the multicast session to the UDM.

In one example, the process comprises announcing, the new session to the network. In one example, the announcing comprises providing information such as multicast IP address and/or port number.

In one example, the process comprises requesting, by the SMF to the AMF, to transfer a message to the NG-RAN node(s). In one example, the requesting comprises transmitting, by the SMF to the AMF, the message and requesting, by the SMF to the AMF, to transfer a message to the NG-RAN node(s). In one example, the message comprises and/or is an Namf_Communication_N1N2MessageTransfer message.

In one example, the process comprises sending, by the AMF, a session creation request to the NG-RAN, for example via a N2_PDU Session request message. In one example, the process comprises acknowledging, by the NG-RAN node, the session creation, for example with a N2_PDU Session response message.

In one example, the process comprises establishing, by the NG-RAN, resource for the new session, for example the required resources.

In one example, the process comprises joining, by the NG-RAN node, the relevant multicast group of NG-RAN nodes, if the session is switched to multicast, for example. Otherwise, if the delivery method is switched to broadcast, no such joining may be required.

In one example, the process comprises transmitting, by the AMF, a request, for example a Nsmf_PDUSession_UpdateSMContext request, to the SMF to update the multicast session context, for example with information from the NG-RAN. In one example, the process comprises confirming, by the SMF, reception of the request, for example with an Nsmf_PDUSession_UpdateSMContext response message.

In one example, the process comprises requesting, by the SMF to the BMF-C, to update the multicast session context with the information from the NG-RAN with the received request, for example the Nbmf_PDUSession_UpdatePDUContext request. In one example, the process comprises acknowledging, by the BMF-C, the context update, for example with an Nbmf_PDUSession_UpdatePDUContext response.

In one example, the process comprises starting the multicast transmission, for example using the multicast session and bearers. In one example, the process comprises initially transmitting, by the Content Provider to the BMF-U, the content (i.e. data) in unicast mode and forwarding, by the BMF-U, the content to the UPF, for example in the same manner. In one example, the process comprises processing, by the UPF, the forwarded content (i.e. received data), for example by applying FEC and/or raptor codes, and sending the processed content to the NG-RAN nodes, for example using IP multicast. In one example, the process comprises multicasting/broadcasting, by the NG-RAN nodes, the processed content using point-to-multipoint radio bearers.

Example 1.2 Unicast to Multicast/Broadcast Delivery Method Switching with Pre-Existing Session In this example, there exist both a multicast session and a session management context for the service, and thus no new sessions or session management context need to be created once the delivery method switch is triggered.

In one example, the process comprises registering, by the UE, with the 5GS, for example by performing the registration procedure according to [3].

In one example, the process comprises establishing, by the UE and the 5G Core, a unicast PDU session, for example according to [3].

In one example, the process comprises transmitting, by the content server, the unicast transmission. In one example, the process comprises starting, by the content server, the unicast transmission.

In one example, the process comprises transmitting, by the UE, consumption reports to the network regarding respective unicast PDU sessions. In one example, the process comprises periodically transmitting, by the UE, consumption reports to the network regarding respective unicast PDU sessions. These reports may later be used by the network to trigger the delivery method switch. As this step is optional the delivery method switch may be triggered based on other criteria.

In one example, the process comprises deciding, by the UE or the NG-RAN or the 5G Core or the Content Server, to switch the delivery method from the unicast session and/or multiple unicast sessions, for example, to a multicast/broadcast session, for example a single multicast/broadcast session.

In one example, the process comprises requesting, by the UE or the NG-RAN or the 5G Core or the Content Server, a new session from the BMF-C. In one example, the step of deciding and the step of requesting are both performed by the UE or the NG-RAN or the 5G Core or the Content Server. In one example, the process comprises requesting, by the Content Server, a new session from the BMF-C, for example in the case where it was the Content Server that decided the delivery method switch.

In one example, the process comprises requesting, by the BMF-C to the SMF, an update of the session, for example wherein the requesting comprises providing the required parameters. In one example, the process comprises responding, by the SMF, to acknowledge modification of the session.

In one example, the process comprises requesting, by the BMF-C to the SMF, an update of the session management context associated with the existing multicast session.

In one example, the process comprises registering, by the SMF, the update (i.e. the modification) of the multicast session to the UDM.

In one example, the process comprises announcing the updated session to the network, for example comprising providing information such as multicast IP address and port number.

In one example, the process comprises requesting, by the SMF to the AMF, to transfer a message to the NG-RAN node(s). In one example, the requesting comprises transmitting, by the SMF to the AMF, the message and requesting, by the SMF to the AMF, to transfer a message to the NG-RAN node(s). In one example, the message comprises and/or is an Namf_Communication_N1N2MessageTransfer message.

In one example, the process comprises sending, by the AMF, a session creation request to the NG-RAN, for example via a N2_PDU Session request message. In one example, the process comprises acknowledging, by the NG-RAN node, the session creation, for example with a N2_PDU Session response message.

In one example, the process comprises establishing, by the NG-RAN, resource for the new session, for example the required resources.

In one example, the process comprises joining, by the NG-RAN node, the relevant multicast session, if the session is switched to multicast, for example. Otherwise, if the delivery method is switched to broadcast, no such joining may be required.

In one example, the process comprises transmitting, by the AMF, a request, for example a Nsmf_PDUSession_UpdateSMContext request, to the SMF to update the multicast session context, for example with information from the NG-RAN. In one example, the process comprises confirming, by the SMF, reception of the request, for example with an Nsmf_PDUSession_UpdateSMContext response message.

In one example, the process comprises requesting, by the SMF to the BMF-C, to update the multicast session context with the information from the NG-RAN with the received request, for example the Nbmf_PDUSession_UpdatePDUContext request. In one example, the process comprises acknowledging, by the BMF-C, the context update, for example with an Nbmf_PDUSession_UpdatePDUContext response.

In one example, the process comprises starting the multicast transmission, for example using the multicast session and bearers. In one example, the process comprises initially transmitting, by the Content Provider to the BMF-U, the content (i.e. data) in unicast mode and forwarding, by the BMF-U, the content to the UPF, for example in the same manner. In one example, the process comprises processing, by the UPF, the forwarded content (i.e. received data), for example by applying FEC and/or raptor codes, and sending the processed content to the NG-RAN nodes, for example using IP multicast. In one example, the process comprises multicasting/broadcasting, by the NG-RAN nodes, the processed content using point-to-multipoint radio bearers.

Example 1.3 Multicast/Broadcast to Unicast Delivery Method Switching

In this example, the UE(s) are already registered with the network and an active multicast session already exists. In addition, the UE(s) for which the session switch is performed are not the last ones in the 5MBS group receiving the multicast context, and as such a new unicast session must be setup.

A multicast/broadcast session is ongoing.

In one example, the process comprises deciding, by the UE or the NG-RAN or the 5G Core or the Content Server, to switch the multicast/broadcast session, for example of the UE, to unicast session.

In one example, the process comprises requesting, by the UE or the NG-RAN or the 5G Core or the Content Server, a new session from the BMF-C. In one example, the step of deciding and the step of requesting are both performed by the UE or the NG-RAN or the 5G Core or the Content Server. In one example, the process comprises requesting, by the Content Server, a new session from the BMF-C, for example in the case where it was the Content Server that decided the delivery method switch.

In one example, the process comprises performing, by the network, NF discovery for the new session.

In one example, the process comprises requesting, by the BMF-C to the SMF, creation of a new PDU session.

In one example, the process comprises requesting, by the BMF-C to the SMF, creation of a new session management context.

In one example, the process comprises requesting, by the SMF to the UDM, registration of the new session.

In one example, the process comprises requesting, by the SMF to the AMF, to transfer a message to the NG-RAN node(s). In one example, the requesting comprises transmitting, by the SMF to the AMF, the message and requesting, by the SMF to the AMF, to transfer a message to the NG-RAN node(s). In one example, the message comprises and/or is an Namf_Communication_N1N2MessageTransfer message.

In one example, the process comprises sending, by the AMF, a session creation request to the NG-RAN, for example via a N2_PDU Session request message. In one example, the process comprises acknowledging, by the NG-RAN node, the session creation, for example with a N2_PDU Session response message.

In one example, the process comprises establishing, by the NG-RAN, resource for the new session, for example the required unicast resources such as point-to-multipoint-radio bearers.

In one example, the process comprises transmitting, by the AMF, a request, for example a Nsmf_PDUSession_UpdateSMContext request, to the SMF to update the unicast session context, for example with information from the NG-RAN. In one example, the process comprises confirming, by the SMF, reception of the request, for example with an Nsmf_PDUSession_UpdateSMContext response message.

In one example, the process comprises requesting, by the SMF to the BMF-C, to update the unicast session context with the information from the NG-RAN with the received request, for example the Nbmf_PDUSession_UpdatePDUContext request. In one example, the process comprises acknowledging, by the BMF-C, the context update, for example with an Nbmf_PDUSession_UpdatePDUContext response.

In one example, the process comprises starting the unicast transmission, for example using the multicast session and bearers. In one example, the process comprises initially transmitting, by the Content Provider to the BMF-U, the content (i.e. data) and forwarding, by the BMF-U, the content to the UPF, for example in the same manner. In one example, the process comprises processing, by the UPF, the forwarded content (i.e. received data), for example by applying FEC and/or raptor codes, and sending the processed content to the NG-RAN nodes. In one example, the process comprises transmitting, by the NG-RAN nodes, the processed content using the point-to-multipoint radio bearers.

In one example, the process comprises releasing, by the NG-RAN node, the multicast resources if the switched UE is the last UE in the 5MBS group, as the multicast resources are no longer required.

In one example, the process comprises deregistering, releasing and/or deleting, by the network, the multicast session if the switched UE is the last UE in the 5MBS group.

Solutions for the Second Architecture Reference Model

Example 2 is relevant to the second architecture reference model, where no additional network functions are considered. Similar to Example 1, when switching the delivery method from unicast to either multicast or broadcast, two different solutions (Examples 2.1 and 2.2) are presented depending on whether a session pre-exists or not. When the delivery method is switched from multicast/broadcast to unicast, a single solution (Example 2.3) is presented since a new session will have to be established as long as the UE to be switched is not the last one in the 5MBS group.

Example 2.1 Unicast to Multicast/Broadcast Delivery Method Switching with No Pre-Existing Session In this embodiment, there exist neither a multicast session nor any session management context for the service, and thus a new session and session management context must be created once the delivery method switch is triggered.

In one example, the process comprises registering, by the UE, with the 5GS, for example by performing the registration procedure according to [3].

In one example, the process comprises establishing, by the UE and the 5G Core, a unicast PDU session, for example according to [3].

In one example, the process comprises transmitting, by the content server, the unicast transmission. In one example, the process comprises starting, by the content server, the unicast transmission.

In one example, the process comprises transmitting, by the UE, consumption reports to the network regarding respective unicast PDU sessions. In one example, the process comprises periodically transmitting, by the UE, consumption reports to the network regarding respective unicast PDU sessions. These reports may later be used by the network to trigger the delivery method switch. As this step is optional the delivery method switch may be triggered based on other criteria.

In one example, the process comprises deciding, by the UE or the NG-RAN or the 5G Core or the Content Server, to switch the delivery method from the unicast session and/or multiple unicast sessions, for example, to a multicast/broadcast session, for example a single multicast/broadcast session.

In one example, the process comprises requesting, by the Content Server, requests a new session from the SMF.

In one example, the process comprises discovering, by the SMF, the downstream network functions that will be involved in the new session. The execution of this step is subject to different conditions.

The following, not exhaustive list, includes some cases where NF discovery is required:
  a. A UE being the first one to switch the delivery method from unicast to multicast, i.e. a new session and session management context need to be created.
  b. The UE moving from a cell where the content is delivered in unicast mode, to a 5MBS-capable cell, where there is no ongoing multicast session.

The following, not exhaustive list, includes some cases where NF discovery is not required:
  a. The UE moving from a cell where the content is delivered in unicast mode, to a 5MBS-capable cell, where there is an ongoing multicast session.
  b. A previous multicast session exists in an inactive state and can be re-used.

In one example, the process comprises creating, by the SMF, a new session based on the required parameters for the new session. In one example, the creating comprises allocating, by the SMF, a multicast IP address and/or a port number for the new session.

In one example, the process comprises creating, by the SMF, a new SM context. In one example, the process comprises updating, by the SMF, an existing SM context, as applicable.

In one example, the process comprises registering, by the SMF, the new multicast session to the UDM.

In one example, the process comprises announcing the new session to the network. In one example, the announcing comprises providing information such as multicast IP address and/or port number.

In one example, the process comprises requesting, by the SMF to the AMF, to transfer a message to the NG-RAN node(s). In one example, the requesting comprises transmitting, by the SMF to the AMF, the message and requesting, by the SMF to the AMF, to transfer a message to the NG-RAN node(s). In one example, the message comprises and/or is an Namf_Communication_N1N2MessageTransfer message.

In one example, the process comprises sending, by the AMF, a session creation request to the NG-RAN, for example via a N2_PDU Session request message. In one example, the process comprises acknowledging, by the NG-RAN node, the session creation, for example with a N2_PDU Session response message.

In one example, the process comprises establishing, by the NG-RAN, resource for the new session, for example the required resources.

In one example, the process comprises joining, by the NG-RAN node, the relevant multicast group of NG-RAN nodes, if the session is switched to multicast, for example. Otherwise, if the delivery method is switched to broadcast, no such joining may be required.

In one example, the process comprises transmitting, by the AMF, a request, for example a Nsmf_PDUSession_UpdateSMContext request, to the SMF to update the multicast session context, for example with information from the NG-RAN. In one example, the process comprises confirming, by the SMF, reception of the request, for example with an Nsmf_PDUSession_UpdateSMContext response message.

In one example, the process comprises updating, by the SMF, the multicast session context with the information from the NG-RAN.

In one example, the process comprises starting the multicast transmission using the multicast session and bearers. In one example, the process comprises initially transmitting, from the Content Provider to the UPF, the content (i.e. data) in unicast mode. In one example, the process comprises processing, by the UPF, the forwarded content (i.e. received data), for example by applying FEC and/or raptor codes, and sending the processed content to the NG-RAN nodes, for example using IP multicast. In one example, the process comprises multicasting/broadcasting, by the NG-RAN nodes, the processed content using point-to-multipoint radio bearers.

Example 2.2 Unicast to Multicast/Broadcast Delivery Method Switching with Pre-Existing Session In this embodiment, there exist both a multicast session and a session management context for the service, and thus no new sessions or session management context need to be created once the delivery method switch is triggered.

In one example, the process comprises registering, by the UE, with the 5GS, for example by performing the registration procedure according to [3].

In one example, the process comprises establishing, by the UE and the 5G Core, a unicast PDU session, for example according to [3].

In one example, the process comprises transmitting, by the content server, the unicast transmission. In one example, the process comprises starting, by the content server, the unicast transmission.

In one example, the process comprises transmitting, by the UE, consumption reports to the network regarding respective unicast PDU sessions. In one example, the process comprises periodically transmitting, by the UE, consumption reports to the network regarding respective unicast PDU sessions. These reports may later be used by the network to trigger the delivery method switch. As this step is optional the delivery method switch may be triggered based on other criteria.

In one example, the process comprises deciding, by the UE or the NG-RAN or the 5G Core or the Content Server, to switch the delivery method from the unicast session and/or multiple unicast sessions, for example, to a multicast/broadcast session, for example a single multicast/broadcast session.

In one example, the process comprises requesting, by the Content Server, a new session from the SMF.

In one example, the process comprises updating, by the SMF, the pre-existing session based on the required parameters.

In one example, the process comprises creating, by the SMF, a new SM context. In one example, the process comprises updating, by the SMF, an existing SM context, as applicable.

In one example, the process comprises registering, by the SMF, modification of the multicast session to the UDM.

In one example, the process comprises announcing the new and/or the updated session to the network. In one example, the announcing comprises providing information such as multicast IP address and/or port number.

In one example, the process comprises requesting, by the SMF to the AMF, to transfer a message to the NG-RAN node(s). In one example, the requesting comprises transmitting, by the SMF to the AMF, the message and requesting, by the SMF to the AMF, to transfer a message to the NG-RAN node(s). In one example, the message comprises and/or is an Namf_Communication_N1N2MessageTransfer message.

In one example, the process comprises sending, by the AMF, a session creation request to the NG-RAN, for example via a N2_PDU Session request message. In one example, the process comprises acknowledging, by the NG-RAN node, the session creation, for example with a N2_PDU Session response message.

In one example, the process comprises establishing, by the NG-RAN, resource for the new session, for example the required resources.

In one example, the process comprises joining, by the NG-RAN node, the relevant multicast group of NG-RAN nodes, if the session is switched to multicast, for example. Otherwise, if the delivery method is switched to broadcast, no such joining may be required.

In one example, the process comprises transmitting, by the AMF, a request, for example a Nsmf_PDUSession_UpdateSMContext request, to the SMF to update the multicast session context, for example with information from the NG-RAN. In one example, the process comprises confirming, by the SMF, reception of the request, for example with an Nsmf_PDUSession_UpdateSMContext response message.

In one example, the process comprises updating, by the SMF, the multicast session context with the information from the NG-RAN.

In one example, the process comprises starting the multicast transmission, for example using the multicast session and bearers. In one example, the process comprises initially transmitting, by the Content Provider to the UPF, the content (i.e. data) in unicast mode. In one example, the process comprises processing, by the UPF, the forwarded content (i.e. received data), for example by applying FEC and/or raptor codes, and sending the processed content to the NG-RAN nodes, for example using IP multicast. In one example, the process comprises multicasting/broadcasting, by the NG-RAN nodes, the processed content using point-to-multipoint radio bearers.

Example 2.3 Multicast/Broadcast to Unicast Delivery Method Switching

In this example, the UE(s) are already registered with the network and an active multicast session already exists. In addition, the UE(s) for which the session switch is performed are not the last ones in the 5MBS group receiving the multicast context, and as such a new unicast session must be setup.

A multicast/broadcast session is ongoing.

In one example, the process comprises deciding, by the UE or the NG-RAN or the 5G Core or the Content Server, to switch the multicast/broadcast session, for example of the UE, to unicast session.

In one example, the process comprises requesting, by the UE or the NG-RAN or the 5G Core or the Content Server, a new session from the SMF. In one example, the step of deciding and the step of requesting are both performed by the UE or the NG-RAN or the 5G Core or the Content Server. In one example, the process comprises requesting, by the Content Server, a new session from the SMF, for example in the case where it was the Content Server that decided the delivery method switch.

In one example, the process comprises performing, by the network, NF discovery for the new session.

In one example, the process comprises creating, by the SMF, a new PDU session.

In one example, the process comprises creating, by the SMF, a new session management context.

In one example, the process comprises requesting, by the SMF to the UDM, registration of the new session.

In one example, the process comprises requesting, by the SMF to the AMF, to transfer a message to the NG-RAN node(s). In one example, the requesting comprises transmitting, by the SMF to the AMF, the message and requesting, by the SMF to the AMF, to transfer a message to the NG-RAN node(s). In one example, the message comprises and/or is an Namf_Communication_N1N2MessageTransfer message.

In one example, the process comprises sending, by the AMF, a session creation request to the NG-RAN, for example via a N2_PDU Session request message. In one example, the process comprises acknowledging, by the NG-RAN node, the session creation, for example with a N2_PDU Session response message.

In one example, the process comprises establishing, by the NG-RAN, resource for the new session, for example the required unicast resources such as point-to-multipoint radio bearers.

In one example, the process comprises transmitting, by the AMF, a request, for example a Nsmf_PDUSession_UpdateSMContext request, to the SMF to update the unicast session context, for example with information from the NG-RAN. In one example, the process comprises confirming, by the SMF, reception of the request, for example with an Nsmf_PDUSession_UpdateSMContext response message.

In one example, the process comprises updating, by the SMF, the unicast session context with the information from the NG-RAN.

In one example, the process comprises starting the unicast transmission, for example using the multicast session and bearers. In one example, the process comprises initially transmitting, by the Content Provider to the UPF. In one example, the process comprises processing, by the UPF, the forwarded content (i.e. received data), for example by applying FEC and/or raptor codes, and sending the processed content to the NG-RAN nodes. In one example, the process comprises transmitting, by the NG-RAN nodes, the processed content using the point-to-multipoint radio bearers.

In one example, the process comprises releasing, by the NG-RAN node, the multicast resources if the switched UE is the last UE in the 5MBS group, as the multicast resources are no longer required.

In one example, the process comprises deregistering, releasing and/or deleting, by the network, the multicast session if the switched UE is the last UE in the 5MBS group.

Example 3: Additional and/or Alternative Solutions for the First Architecture Reference Model This example is relevant to the first architecture reference model, where the MBSF and MBSU additional network functions are considered. In this example, there is a pre-existing MBS unicast session.

Figure 14:
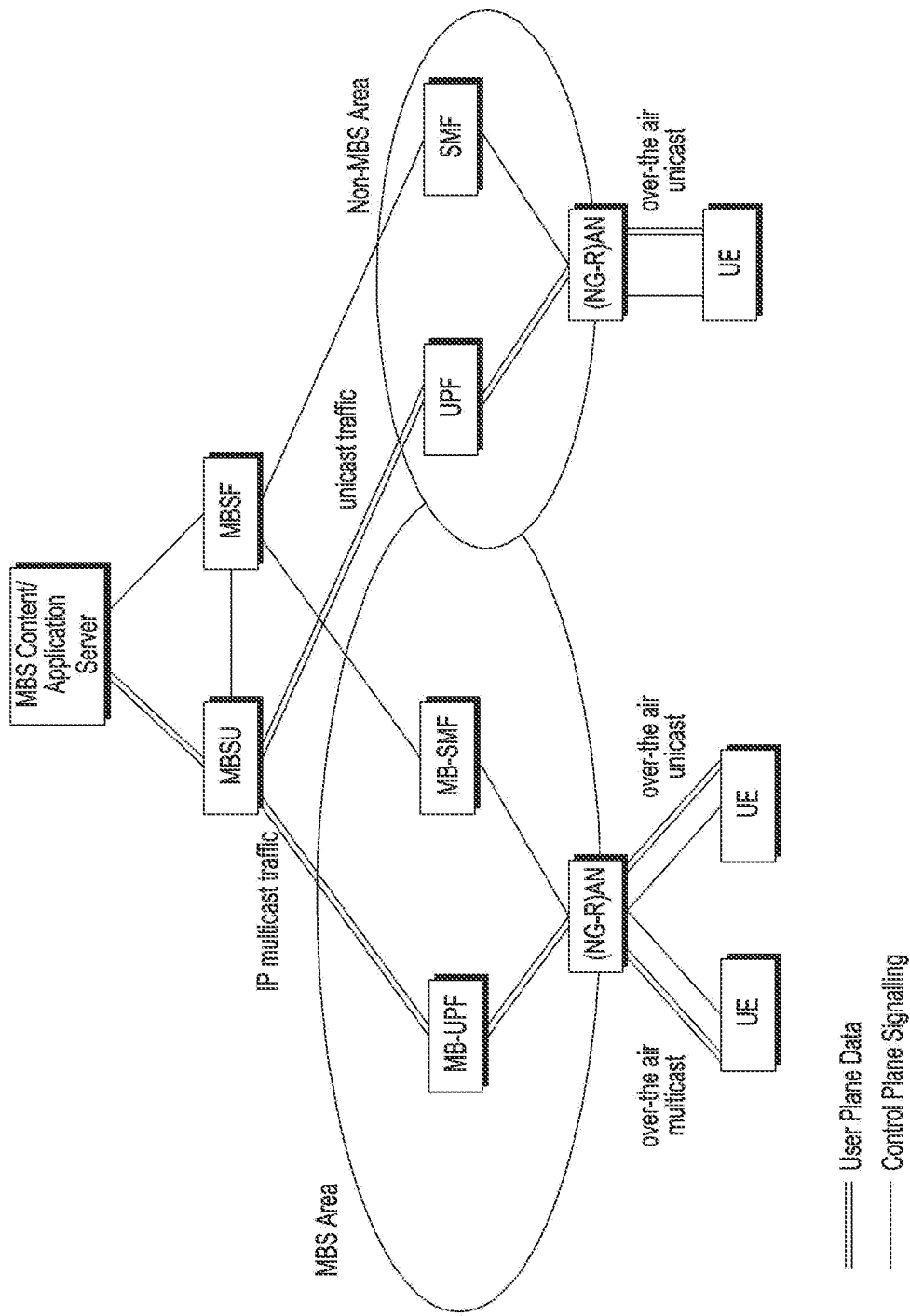
FIG. 14 schematically depicts a use case for a process according to an exemplary embodiment.

FIG. 14 schematically depicts a use case for a process according to an exemplary embodiment.

In more detail, FIG. 14 shows a high level depiction of a possible operation of this switching example. It shows the provision of an MBS service from an MBS application/content server to one or more UEs. The MBS content/application server transmits the signaling to the MBSF and the data to the MBSU. The UEs are shown to be located in MBS and non-MBS service areas. In a switching example, a UE may be in a non-MBS area, and then an MBS unicast PDU session serves the UE. The data are transmitted from the MBSU to the UPF, and can only be transmitted via over-the-air unicast by the NG-RAN in a non-multicast service area. In this example, the UE may move to an MBS area, so a switch may be triggered. The switch could be triggered by the new NG-RAN, or by the MBSF/MBSU. The data are then transmitted from the MBSU to the MB-UPF, and the NG-RAN uses over-the-air multicast.

Example 3.1 Flexible Unicast to Multicast Delivery Method Switching with Pre-Existing MBS Unicast Session In this example, the process is of switching from the first data transmission method to the second data transmission method in the 5G network comprising a set of user equipment, UE, including the first UE, the set of New Generation Radio Access Network (NG-RAN) nodes including the first NG-RAN node, the 5G Core and the set of content providers, including the first content provider, communicatively coupled to the 5G network, wherein the method comprises:
  transmitting, by the first NG-RAN node, first data from the set of content providers to the first UE according to the first data transmission method in the first session, wherein the first data transmission method is a unicast data transmission method, for example wherein the first session comprises and/or is a pre-existing MBS unicast session;
  deciding, by the first UE or the first NG-RAN node or the 5G Core or the first content provider to switch from the first data transmission method to the second transmission method, wherein the second data transmission method is a multicast transmission method;
  initializing, by the 5G Core, the second session for the second transmission method, wherein the second session comprises and/or is the first session and wherein initializing, by the 5G Core, comprises updating the first session to the second session;

switching, by the 5G Core, from the first data transmission method to the second transmission method; and transmitting, by the first NG-RAN node, second data from the set of content providers to the first UE according to the second data transmission method in the second session.

That is, in this example, the second session comprises and/or is the updated first session. In other words, the pre-existing MBS unicast session (i.e. the first session) is updated to become a multicast session (i.e. the second session).

In one example, the second session comprises and/or is the updated first session.

In one example, the 5G network comprises a M-AMF, a MB-SMF, a MB-UBF, a MBSF and a MBSU. In one example, the 5G network optionally comprises a NEF.

In one example, the process comprises registering, by the UE, with the 5G network, for example by performing the registration procedure according to [3].

In one example, the process comprises announcing, by the content server (i.e. the first content provider), availability of multicast transmission (i.e. the second session), for example via application layer signaling. In one example, announcing, by the content server, availability of multicast transmission comprises providing information, such as a multicast IP address and/or a port number of the multicast group, whereby the UE may join the multicast group.

In one example, the process comprises establishing, by the UE and the 5G Core, an MBS unicast PDU session, for example according to [3].

In one example, the process comprises starting, by the content server, the unicast transmission. In one example, the process comprises transmitting, by the content server, the unicast transmission. In one example, the process comprises exchanging data between the UE and the content server.

In one example, the process comprises transmitting, by the UE, consumption reports to the network regarding respective MBS unicast PDU sessions. In one example, the process comprises periodically transmitting, by the UE, consumption reports to the network regarding respective unicast PDU sessions. These reports may later be used by the network to trigger the delivery method switch, for example between unicast and multicast. As this step is optional, the delivery method switch may be triggered based on other criteria.

In one example, the process comprises deciding, by the UE or the NG-RAN or the 5G Core or the Content Server, to switch the delivery method from the MBS unicast session and/or multiple MBS unicast sessions, for example, to a multicast session, for example a single multicast session. It should be understood that deciding may be used synonymously herein with triggering. In other words, in one example, the process comprises triggering, by the UE or the NG-RAN or the 5G Core or the Content Server, to switch the delivery method from the MBS unicast session and/or multiple MBS unicast sessions, for example, to a multicast session, for example a single multicast session. It should be understood that triggering by the UE and triggering by the NG-RAN are essentially equivalent and thus a reference to triggering by the UE may be interchanged herein with triggering by the NG-RAN. It should be understood that triggering by the MBSF may also be known as triggering by the 5G Core. That is, a MBSF triggered switch is synonymous with an 5G Core triggered switch. It should be understood that deciding, by the UE or the NG-RAN or the 5G Core or the Content Server, to switch the delivery method from the MBS unicast session and/or multiple MBS unicast sessions, for example, to a multicast session, for example a single multicast session, is unitary in that the deciding is by the UE or the NG-RAN or the 5G Core or the Content Server i.e. these alternatives are mutually exclusive.

In one example, deciding, by the first UE or the first NG-RAN node or the 5G Core or the first content provider, to switch from the first data transmission method to the second transmission method comprises deciding, by the first NG-RAN node, to switch from the first data transmission method to the second transmission method. In one example, the process comprises deciding, by the NG-RAN, to switch the delivery method from the MBS unicast session and/or multiple MBS unicast sessions, for example, to a multicast session, for example a single multicast session. That is, the trigger for the switch is in and/or due to the NG-RAN. This may be termed an NG-RAN or RAN triggered switch. As described above, this trigger may also include and/or be a trigger originating at the UE. The NG-RAN may trigger the switch due to mobility reasons and/or due to consumption reports sent by the UE, for example. In one example, deciding, by the NG-RAN, to switch the delivery method from the MBS unicast session to a multicast session is conditional, wherein a request to switch the delivery method from the UE to the NG-RAN is sent only if the UE requests a switch from the MBS unicast session to a multicast session for the MBS service that the UE is already receiving. In one example, deciding, by the NG-RAN, to switch the delivery method from the MBS unicast session to a multicast session comprises modifying the established MBS unicast PDU session. In one example, modifying the established MBS unicast PDU session comprises forwarding messages, for example by the network. In one example, forwarding messages comprises sending, from the NG-RAN to the M-AMF, a N2_Session_Modification Request. In one example, forwarding messages comprises sending, from the M-AMF to the MB-SMF a Nsmf_Session_Modification Request, in response to the M-AMF receiving the N2_Session_Modification Request. In one example, forwarding messages comprises sending, from the MB-SMF to the MBSF, a N6mb-C Session Modification Request, in response to the MB-SMF receiving the Nsmf_Session-_Modification Request. In one example, forwarding messages optionally comprises sending, from the MBSF to the content server, a MBS Session Notification, in response to the MBSF receiving the N6mb-C Session Modification Request, for example if the content server is required to be aware of the switch from the MBS unicast session to a multicast session.

In one example, deciding, by the first UE or the first NG-RAN node or the 5G Core or the first content provider, to switch from the first data transmission method to the second transmission method comprises deciding, by a MBSF, to switch from the first data transmission method to the second transmission method. In one example, the process comprises deciding, by the MBSF, to switch the delivery method from the MBS unicast session and/or multiple MBS unicast sessions, for example, to a multicast session, for example a single multicast session. This may be termed a MBSF triggered switch. As described above, a MBSF triggered switch is synonymous with an 5G Core triggered switch. That is, the MBSF is the entity deciding to perform the switch from the MBS unicast session to a multicast session once the MBS service has been initiated. In one example, deciding, by the MBSF, to switch the delivery method from the MBS unicast session and/or multiple MBS unicast sessions, for example, to a multicast session is based, at least in part, on optimisation criteria, for example consumption reports received from the UE.

In one example, deciding, by the first UE or the first NG-RAN node or the 5G Core or the first content provider, to switch from the first data transmission method to the second transmission method comprises deciding, by the first content provider, to switch from the first data transmission method to the second transmission method. In one example, the process comprises deciding, by the Content Server, to switch the delivery method from the MBS unicast session and/or multiple MBS unicast sessions, for example, to a multicast session, for example a single multicast session. That is, the Content Server decides to switch from the MBS unicast session to a multicast session.

In one example, the process comprises comprising requesting, by the MBSF to the MB-SMF, to update the first session of the UE, thereby providing the second session. In one example, the process comprises requesting, by the MBSF to the MB-SMF, to update the MBS unicast session of the UE to a multicast session, optionally comprising providing parameters, for example SUPI, S-NSSAI, MBS ID/TMGI and/or DNN, for example using an Nsmf_PDUSession_Update Request. In one example, the process comprises acknowledging, by the MB-SMF, the session update, optionally comprising providing parameters, for example its multicast IP address and/or port number for NG-RAN, for example using an Nsmf_PDUSession_Update Response.

In one example, the process comprises registering, by the MB-SMF to the UDM, the update from the first session to the second session and optionally, acknowledging, by the UDM to the MB-SMF. In one example, the process comprises registering, by the MB-SMF, the update (i.e. the modification) of the multicast session to the UDM, for example using an Nudm_UECM_Update message, and optionally, acknowledging by the UDM.

In one example, the process comprises exchanging, by the MBSF and the MBSU, messages, for example internal messages.

In one example, the process comprises transmitting, by the MB-SMF to the M-AMF, a message and requesting, by the MB-SMF to the M-AMF, to forward the message to the first NG-RAN node, wherein the message comprises parameters of the second session and optionally, acknowledging, by the M-AMF to the MB-SMF, receipt of the message. In one example, the process comprises transmitting, by the MB-SMF to the M-AMF, a message, for example an Namf_Communication_N1N2MessageTransfer message, and requesting, by the MB-SMF to the M-AMF, to forward the message to the NG-RAN node(s), wherein the message comprises parameters of the multicast MBS session, such as the multicast IP address, the port number, the APN and/or the NSAPI. In one example, the M-AMF acknowledges receiving the message.

In one example, the process comprises creating the multicast session (i.e. the second session), for example in response to receiving, by the M-AMF, the message. In one example, creating the second session optionally comprises sending, by the M-AMF to the first NG-RAN node, a session creation request and optionally acknowledging, by the first NG-RAN node to the M-AMF, the session creation request. In one example, creating the multicast session comprises sending, by the M-AMF to the NG-RAN, a session creation request, for example using an N2_PDU Session request message. In one example, creating the multicast session comprises acknowledging, by the NG-RAN to the M-AMF, the session creation request, for example using an N2 PDU Session response message that may optionally include downlink tunnel information. In one example, acknowledging, by the NG-RAN to the M-AMF, the session creation request is after establishing, by the NG-RAN, resource for the new session, for example the required resources.

In one example, the process comprises establishing, by the first NG-RAN node, resources for the second session, for example in response to receiving, by the first NG-RAN node, the session creation request. In one example, the process comprises establishing, by the NG-RAN, resource for the new session, for example the required resources for the UE, such as by setting up relevant bearers.

In one example, the process comprises joining, by the NG-RAN node (i.e. the first NG-RAN node), the relevant multicast session (i.e. the second session).

In one example, the process comprises updating a second session management context of the second session, for example comprising transmitting, by the M-AMF to the MB-SMF, a request to update the second session management context. In one example, the process comprises updating a multicast session management context, for example comprising transmitting, by the M-AMF to the MB-SMF, a request to update the multicast session management context, for example with information, such as tunnel information, from NG-RAN, for example using a Nsmf_PDUSession_UpdateSMContext request and optionally, confirming, by the MB-SMF to the M-AMF, receipt of the request, for example using an Nsmf_PDUSession_UpdateSMContext response message.

In one example, the process comprises updating a second session context of the second session, for example comprising requesting, by the MB-SMF to the MBSF, to update the second session context. In one example, the process comprises updating a multicast session context, for example comprising requesting, by the MB-SMF to the MBSF, to update the multicast session context, for example with information, for example from the NG-RAN, for example via a N6mb-C interface and optionally, acknowledging, by the MBSF to the MB-SMF, the multicast session context update, for example via the N6mb-C interface.

In one example, the process comprises communicating, between the MBSF and the MBSU, regarding modification of the session parameters.

In one example, the process comprises modification of the second session, for example comprising sending, by the MB-SMF to the MB-UPF, a session modification request. In one example, the process comprises session modification, for example comprising sending, by the MB-SMF to the MB-UPF, a session modification request, for example an N4 session modification request, and optionally, acknowledging, by the MB-UPF to the MB-SMF, the session modification request.

In one example, transmitting, by the first NG-RAN node, second data from the set of content providers to the first UE according to the second data transmission method in the second session comprises: transmitting, by the first content provider to the MBSU, the second data; processing, by the MBSU, the transmitted data; forwarding, by the MBSU to the MB-UPF, the processed data; sending, by the MB-UPF to the first NG-RAN node, the forwarded data; and multicasting, by the first NG-RAN node, the sent data. In one example, the process comprises starting the multicast transmission, for example using the multicast session and bearers. In one example, the process comprises initially transmitting, by the Content Provider to the MBSU, the content (i.e. the data), for example in unicast mode. In one example, the process comprises processing, by the MBSU, the transmitted data, for example by applying FEC and/or raptor codes. In one example, the process comprises forwarding, by the MBSU to the MB-UPF, the processed data, for example in unicast mode. In one example, the process comprises sending, by the MB-UPF to the NG-RAN nodes, the forwarded data, for example using IP multicast. In one example, the process comprises multicasting, by the NG-RAN nodes, the sent data, for example using over-the-radio multicast or unicast bearers, whereby the multicast data are received by the UE.

Example 3.2 Flexible Unicast to Multicast Delivery Method Switching with Pre-Existing MBS Unicast Session Example 3.2 is generally as described with respect to Example 3.1.

In this example, the process is of switching from the first data transmission method to the second data transmission method in the 5G network comprising a set of user equipment, UE, including the first UE, the set of New Generation Radio Access Network (NG-RAN) nodes including the first NG-RAN node, the 5G Core and the set of content providers, including the first content provider, communicatively coupled to the 5G network, wherein the method comprises:
transmitting, by the first NG-RAN node, first data from the set of content providers to the first UE according to the first data transmission method in the first session, wherein the first data transmission method is a MBS data transmission method, for example wherein the first session comprises and/or is a unicast MBS session, such as a pre-existing unicast MBS session, with 5GC individual traffic delivery method according to [3];
deciding, by the first UE or the first NG-RAN node or the 5G Core or the first content provider to switch from the first data transmission method to the second transmission method, wherein the second data transmission method is a multicast transmission method;
initializing, by the 5G Core, the second session for the second transmission method, wherein the second session comprises and/or is the first session and wherein initializing, by the 5G Core, comprises updating the first session to the second session;
switching, by the 5G Core, from the first data transmission method to the second transmission method; and
transmitting, by the first NG-RAN node, second data from the set of content providers to the first UE according to the second data transmission method in the second session.

That is, in this example, the second session comprises and/or is the updated first session. In other words, the unicast MBS session (i.e. the first session) is updated to become a multicast session (i.e. the second session).

In one example, the second session comprises and/or is the updated first session.

In one example, the 5G network comprises a AMF, a MB-SMF, a MB-UBF, a MBSF and a MBSU. In one example, the 5G network optionally comprises a NEF. In one example, the MBSF and NEF are separate physical entities or are co-located.

In one example, the process comprises registering, by the UE, with the 5G network, for example by performing the registration procedure according to [3].

In one example, the process comprises announcing, by the content server (i.e. the first content provider), availability of multicast transmission (i.e. the second session), for example via application layer signaling. In one example, announcing, by the content server, availability of multicast transmission comprises providing information, such as a multicast IP address and/or a port number of the multicast group, whereby the UE may join the multicast group.

In one example, the process comprises establishing, by the UE and the 5G Core, an MBS session, for example according to [3].

In one example, the process comprises starting, by the content server, the MBS transmission. In one example, the process comprises transmitting, by the content server, the MBS transmission. In one example, the process comprises exchanging data between the UE and the content server.

In one example, the process comprises transmitting, by the UE, consumption reports to the network regarding respective MBS individual sessions. In one example, the process comprises periodically transmitting, by the UE, consumption reports to the network regarding respective MBS individual sessions. These reports may later be used by the network to trigger the delivery method switch, for example between unicast and multicast deliveries. As this step is optional, the delivery method switch may be triggered based on other criteria.

In one example, the process comprises deciding, by the UE or the NG-RAN or the 5G Core or the Content Server, to switch the delivery method from the MBS unicast session and/or multiple MBS unicast sessions, for example, to a multicast session, for example a single multicast session. It should be understood that deciding may be used synonymously herein with triggering. In other words, in one example, the process comprises triggering, by the UE or the NG-RAN or the 5G Core or the Content Server, to switch the delivery method from the MBS unicast session and/or multiple MBS unicast sessions, for example, to a multicast session, for example a single multicast session. It should be understood that triggering by the UE and triggering by the NG-RAN are essentially equivalent and thus a reference to triggering by the UE may be interchanged herein with triggering by the NG-RAN. It should be understood that triggering by the MBSF may also be known as triggering by the 5G Core. That is, a MBSF triggered switch is synonymous with an 5G Core triggered switch. It should be understood that deciding, by the UE or the NG-RAN or the 5G Core or the Content Server, to switch the delivery method from the MBS unicast session and/or multiple MBS unicast sessions, for example, to a multicast session, for example a single multicast session, is unitary in that the deciding is by the UE or the NG-RAN or the 5G Core or the Content Server i.e. these alternatives are mutually exclusive.

In one example, deciding, by the first UE or the first NG-RAN node or the 5G Core or the first content provider, to switch from the first data transmission method to the second transmission method comprises deciding, by the first NG-RAN node, to switch from the first data transmission method to the second transmission method. In one example, the process comprises deciding, by the NG-RAN, to switch the delivery method from the MBS unicast session and/or multiple MBS unicast sessions, for example, to a multicast session, for example a single multicast session. That is, the trigger for the switch is in and/or due to the NG-RAN. This may be termed an NG-RAN or RAN triggered switch. As described above, this trigger may also include and/or be a trigger originating at the UE. The NG-RAN may trigger the switch due to mobility reasons and/or due to consumption reports sent by the UE, for example. In one example, deciding, by the NG-RAN, to switch the delivery method from the MBS unicast session to a multicast session is conditional, wherein a request to switch the delivery method from the UE to the NG-RAN is sent only if the UE requests a switch from the MBS unicast session to a multicast session for the MBS service that the UE is already receiving. In one example, deciding, by the NG-RAN, to switch the delivery method from the MBS unicast session to a multicast session comprises modifying the established MBS session, for example via individual delivery. In one example, modifying the established MBS session comprises forwarding messages, for example by the network. In one example, forwarding messages comprises sending, from the NG-RAN to the AMF, a N2_Session_Modification Request. In one example, forwarding messages comprises sending, from the AMF to the MB-SMF a Nsmf_Session_Modification Request, in response to the AMF receiving the N2_Session_Modification Request. In one example, forwarding messages comprises sending, from the MB-SMF to the MBSF, a N6mb-C Session Modification Request, in response to the MB-SMF receiving the Nsmf_Session_Modification Request. In one example, forwarding messages optionally comprises sending, from the MBSF to the content server, a MBS Session Notification, in response to the MBSF receiving the N6mb-C Session Modification Request, for example if the content server is required to be aware of the switch from the MBS unicast session to a multicast session.

In one example, deciding, by the first UE or the first NG-RAN node or the 5G Core or the first content provider, to switch from the first data transmission method to the second transmission method comprises deciding, by a MBSF, to switch from the first data transmission method to the second transmission method. In one example, the process comprises deciding, by the MBSF, to switch the delivery method from the MBS unicast session and/or multiple MBS unicast sessions, for example, to a multicast session, for example a single multicast session. This may be termed a MBSF triggered switch. As described above, a MBSF triggered switch is synonymous with an 5G Core triggered switch. That is, the MBSF is the entity deciding to perform the switch from the MBS unicast session to a multicast session once the MBS service has been initiated. In one example, deciding, by the MBSF, to switch the delivery method from the MBS unicast session and/or multiple MBS unicast sessions, for example, to a multicast session is based, at least in part, on optimisation criteria, for example consumption reports received from the UE.

In one example, deciding, by the first UE or the first NG-RAN node or the 5G Core or the first content provider, to switch from the first data transmission method to the second transmission method comprises deciding, by the first content provider, to switch from the first data transmission method to the second transmission method. In one example, the process comprises deciding, by the Content Server, to switch the delivery method from the MBS unicast session and/or multiple MBS unicast sessions, for example, to a multicast session, for example a single multicast session. That is, the Content Server decides to switch from the MBS unicast session to a multicast session.

In one example, the process comprises comprising requesting, by the MBSF to the MB-SMF, to update the first session of the UE, thereby providing the second session. In one example, the process comprises requesting, by the MBSF to the MB-SMF, to update the MBS unicast session of the UE to a multicast session, optionally comprising providing parameters, for example SUPI, S-NSSAI, MBS ID/TMGI and/or DNN, for example using an Nsmf_PDUSession_Update Request. In one example, the process comprises acknowledging, by the MB-SMF, the session update, optionally comprising providing parameters, for example its multicast IP address and/or port number for NG-RAN, for example using an Nsmf_PDUSession_Update Response.

In one example, the process comprises registering, by the MB-SMF to the UDM, the update from the first session to the second session and optionally, acknowledging, by the UDM to the MB-SMF. In one example, the process comprises registering, by the MB-SMF, the update (i.e. the modification) of the multicast session to the UDM, for example using an Nudm_UECM_Update message, and optionally, acknowledging by the UDM.

In one example, the process comprises exchanging, by the MBSF and the MBSU, messages, for example internal messages. In one example, the process comprises modification of the UPF session, for example comprising sending, by the MB-SMF to the MB-UPF, a session modification request, for example a N4 session modification request; and optionally, acknowledging, by the MB-UPF, the session update.

In one example, the process comprises transmitting, by the MB-SMF to the AMF, a message and requesting, by the MB-SMF to the AMF, to forward the message to the first NG-RAN node, wherein the message comprises parameters of the second session and optionally, acknowledging, by the AMF to the MB-SMF, receipt of the message. In one example, the process comprises transmitting, by the MB-SMF to the AMF, a message, for example an Namf_Communication_N1N2MessageTransfer message, and requesting, by the MB-SMF to the AMF, to forward the message to the NG-RAN node(s), wherein the message comprises parameters of the multicast MBS session, such as the multicast IP address, the port number, the APN and/or the NSAPI. In one example, the AMF acknowledges receiving the message.

In one example, the process comprises creating the multicast session (i.e. the second session), for example in response to receiving, by the AMF, the message. In one example, creating the second session optionally comprises sending, by the AMF to the first NG-RAN node, a session creation request and optionally acknowledging, by the first NG-RAN node to the AMF, the session creation request. In one example, creating the multicast session comprises sending, by the AMF to the NG-RAN, a session creation request, such as a MBS session creation request, for example using an N2 Session request message. In one example, creating the multicast session comprises acknowledging, by the NG-RAN to the AMF, the session creation request, for example using an N2 Session response message that may optionally include downlink tunnel information. In one example, acknowledging, by the NG-RAN to the AMF, the session creation request is after establishing, by the NG-RAN, resource for the new session, for example the required resources.

In one example, the process comprises establishing, by the first NG-RAN node, resources for the second session, for example in response to receiving, by the first NG-RAN node, the session creation request. In one example, the process comprises establishing, by the NG-RAN, resource for the new session, for example the required resources for the UE, such as by setting up relevant bearers.

In one example, the process comprises joining, by the NG-RAN node (i.e. the first NG-RAN node), the relevant multicast session (i.e. the second session).

In one example, the process comprises updating a second session management context of the second session, for example comprising transmitting, by the AMF to the MB-SMF, a request to update the second session management context. In one example, the process comprises updating a multicast session management context, for example comprising transmitting, by the AMF to the MB-SMF, a request to update the multicast session management context, for example with information, such as tunnel information, from NG-RAN, for example using a Nsmf_PDUSession_UpdateSMContext request and optionally, confirming, by the MB-SMF to the AMF, receipt of the request, for example using an Nsmf_PDUSession_UpdateSMContext response message.

In one example, the process comprises updating a second session context of the second session, for example comprising requesting, by the MB-SMF to the MBSF, to update the second session context. In one example, the process comprises updating a multicast session context, for example comprising requesting, by the MB-SMF to the MBSF, to update the multicast session context, for example with information, for example from the NG-RAN and optionally, acknowledging, by the MBSF to the MB-SMF, the multicast session context update, for example via the N6mb-C interface.

In one example, the process comprises exchanging, by the MBSF and the MBSU, messages, for example internal messages.

In one example, the process comprises sending, by the MBSF to the AF, a MBS Session start message.

In one example, the process comprises communicating, between the MBSF and the MBSU, regarding modification of the session parameters.

In one example, the process comprises modification of the second session, for example comprising sending, by the MB-SMF to the MB-UPF, a session modification request, such as a UPF session modification request. In one example, the process comprises session modification, for example comprising sending, by the MB-SMF to the MB-UPF, a session modification request, for example an N4 session modification request, and optionally, acknowledging, by the MB-UPF to the MB-SMF, the session modification request.

In one example, transmitting, by the first NG-RAN node, second data from the set of content providers to the first UE according to the second data transmission method in the second session comprises: transmitting, by the first content provider to the MBSU, the second data; processing, by the MBSU, the transmitted data; forwarding, by the MBSU to the MB-UPF, the processed data; sending, by the MB-UPF to the first NG-RAN node, the forwarded data; and transmitting, by the first NG-RAN node, the sent data. In one example, the process comprises starting the multicast transmission, for example using the multicast session and/or bearers, such as PTM bearers. In one example, the process comprises initially transmitting, by the Content Provider to the MBSU, the content (i.e. the data), for example in unicast mode. In one example, the process comprises processing, by the MBSU, the transmitted data, for example by applying FEC and/or raptor codes. In one example, the process comprises forwarding, by the MBSU to the MB-UPF, the processed data, for example in unicast mode. In one example, the process comprises sending, by the MB-UPF to the NG-RAN nodes, the forwarded data, for example using IP multicast. In one example, the process comprises multicasting, by the NG-RAN nodes, the sent data, for example using over-the-radio multicast or unicast bearers, whereby the multicast data are received by the UE.

Example 3.3 Multicast to Unicast Delivery Method Switching for the First Architectural Reference Model In this example, there exist a multicast session and a session management context for the service. This may have been originally initiated as a multicast session or may have been switched to one from a previous unicast session.

Particularly, this example relates to a shared MBS to individual MBS traffic delivery method switch for the first architecture reference model, assuming a pre-existing shared MBS traffic delivery method. Such pre-existing MBS session may have been established directly as an MBS session with 5GC shared MBS traffic delivery or it may have been previously switched from 5GC individual MBS traffic delivery to shared delivery.

The process exemplifies the switch for one UE, but multiple UEs may be simultaneously switched from shared to individual deliveries by applying the same principle and set of services to a set of UEs.

In this example, the process is of switching from the first data transmission method to the second data transmission method in the 5G network comprising a set of user equipment, UE, including the first UE, the set of New Generation Radio Access Network (NG-RAN) nodes including the first NG-RAN node, the 5G Core and the set of content providers, including the first content provider, communicatively coupled to the 5G network, wherein the method comprises:

transmitting, by the first NG-RAN node, first data from the set of content providers to the first UE according to the first data transmission method in the first session, wherein the first data transmission method is a MBS data transmission method, for example wherein the first session comprises and/or is a shared MBS session, such as a pre-existing shared MBS session, or an individual MBS session, such as a pre-existing individual MBS session, with 5GC individual traffic delivery method according to [3];

deciding, by the first UE or the first NG-RAN node or the 5G Core or the first content provider to switch from the first data transmission method to the second transmission method, wherein the second data transmission method is a multicast initializing, by the 5G Core, the second session for the second transmission method, wherein the second session comprises and/or is the first session and wherein initializing, by the 5G Core, comprises updating the first session to the second session;

switching, by the 5G Core, from the first data transmission method to the second transmission method; and transmitting, by the first NG-RAN node, second data from the set of content providers to the first UE according to the second data transmission method in the second session.

That is, in this example, the second session comprises and/or is the updated first session. In other words, the shared or individual MBS session (i.e. the first session) is updated to become a multicast session (i.e. the second session).

In one example, the second session comprises and/or is the updated first session.

In one example, the 5G network comprises a AMF, a MB-SMF, a MB-UBF, a MBSF and a MBSU. In one example, the 5G network optionally comprises a NEF. In one example, the MBSF and NEF are separate physical entities or are co-located.

In one example, the process comprises registering, by the UE, with the 5G network, for example by performing the registration procedure according to [3].

In one example, the process comprises announcing, by the content server (i.e. the first content provider), availability of multicast transmission (i.e. the second session), for example via application layer signaling. In one example, announcing, by the content server, availability of multicast transmission comprises providing information, such as a multicast IP address and/or a port number of the multicast group, whereby the UE may join the multicast group.

In one example, the process comprises establishing, by the UE and the 5G Core, an MBS session, for example according to [3].

In one example, the process comprises starting, by the content server, the MBS transmission. In one example, the process comprises transmitting, by the content server, the MBS transmission. In one example, the process comprises exchanging data between the UE and the content server.

In one example, the process comprises transmitting, by the UE, consumption reports to the network regarding respective MBS individual sessions. In one example, the process comprises periodically transmitting, by the UE, consumption reports to the network regarding respective MBS individual sessions. These reports may later be used by the network to trigger the delivery method switch, for example between unicast and multicast deliveries. As this step is optional, the delivery method switch may be triggered based on other criteria.

In one example, the process comprises deciding, by the UE or the NG-RAN or the 5G Core or the Content Server, to switch the delivery method from the shared or individual MBS session, for example, to a multicast session, for example a single multicast session. It should be understood that deciding may be used synonymously herein with triggering. In other words, in one example, the process comprises triggering, by the UE or the NG-RAN or the 5G Core or the Content Server, to switch the delivery method from the shared or individual MBS session, for example, to a multicast session, for example a single multicast session. It should be understood that triggering by the UE and triggering by the NG-RAN are essentially equivalent and thus a reference to triggering by the UE may be interchanged herein with triggering by the NG-RAN. It should be understood that triggering by the MBSF may also be known as triggering by the 5G Core. That is, a MBSF triggered switch is synonymous with an 5G Core triggered switch. It should be understood that deciding, by the UE or the NG-RAN or the 5G Core or the Content Server, to switch the delivery method from the shared or individual MBS session, for example, to a multicast session, for example a single multicast session, is unitary in that the deciding is by the UE or the NG-RAN or the 5G Core or the Content Server i.e. these alternatives are mutually exclusive.

Alternative 1: RAN Triggered Switch

This alternative assumes the trigger for the switch is in the NG-RAN, hence the NG-RAN effectively may make the switch decision based on UE consumption reports, handover requirements, resource availability, etc. In addition, the NG-RAN may need to be involved in the switching procedure itself when the RAN delivery method needs to be changed from PTM to PTP.

In one example, deciding, by the first UE or the first NG-RAN node or the 5G Core or the first content provider, to switch from the first data transmission method to the second transmission method comprises deciding, by the first NG-RAN node, to switch from the first data transmission method to the second transmission method. In one example, the process comprises deciding, by the NG-RAN, to switch the delivery method from the shared or individual MBS session, for example, to a multicast session, for example a single multicast session. That is, the trigger for the switch is in and/or due to the NG-RAN. This may be termed an NG-RAN or RAN triggered switch. As described above, this trigger may also include and/or be a trigger originating at the UE. The NG-RAN may trigger the switch due to mobility reasons and/or due to consumption reports sent by the UE, handover requirements and/or resource availability, for example. In one example, deciding, by the NG-RAN, to switch the delivery method from the shared or individual MBS session to a multicast session is conditional, wherein a request to switch the delivery method from the UE to the NG-RAN is sent only if the UE requests a switch from the shared or individual MBS session to a multicast session for the MBS service that the UE is already receiving. In one example, deciding, by the NG-RAN, to switch the delivery method from the shared or individual MBS session to a multicast session comprises modifying the established MBS session, for example via individual delivery. In one example, modifying the established MBS session comprises forwarding messages, for example by the network. In one example, forwarding messages comprises sending, from the NG-RAN to the AMF, a N2_Session_Modification Request. In one example, forwarding messages comprises sending, from the AMF to the MB-SMF a Nsmf_Session_Modification Request, in response to the AMF receiving the N2_Session_Modification Request. In one example, forwarding messages comprises sending, from the MB-SMF to the MBSF, a Nmbs Session Modification Request, in response to the MB-SMF receiving the Nsmf_Session_Modification Request. In one example, forwarding messages optionally comprises sending, from the MBSF to the content server via the NEF, a MBS Session Notification, in response to the MBSF receiving the N6mb-C Session Modification Request, for example if the content server is required to be aware of the switch from the shared or individual MBS session to a multicast session.

Alternative 2: MBSF Triggered Switch

This alternative assumes MBSF is the entity deciding to perform a switch from shared to individual MBS traffic delivery. The decision may be based on different optimization criteria (e.g. consumption reports, UE population in certain area, etc.).

In one example, deciding, by the first UE or the first NG-RAN node or the 5G Core or the first content provider, to switch from the first data transmission method to the second transmission method comprises deciding, by a MBSF, to switch from the first data transmission method to the second transmission method. In one example, the process comprises deciding, by the MBSF, to switch the delivery method from the shared or individual MBS session, for example, to a multicast session, for example a single multicast session. This may be termed a MBSF triggered switch. As described above, a MBSF triggered switch is synonymous with an 5G Core triggered switch. That is, the MBSF is the entity deciding to perform the switch from the shared or individual MBS session to a multicast session once the MBS service has been initiated. In one example, deciding, by the MBSF, to switch the delivery method from the shared or individual MBS session, for example, to a multicast session is based, at least in part, on optimisation criteria, for example consumption reports received from the UE, UE population in certain area, etc.

Alternative 3: Content/Application Server Triggered Switch

This alternative accounts for the possibility of the content/application server deciding to switch from shared to individual MBS traffic delivery.

In one example, deciding, by the first UE or the first NG-RAN node or the 5G Core or the first content provider, to switch from the first data transmission method to the second transmission method comprises deciding, by the first content provider, to switch from the first data transmission method to the second transmission method. In one example, the process comprises deciding, by the Content Server, to switch the delivery method from the shared or individual MBS session, for example, to a multicast session, for example a single multicast session. That is, the Content Server decides to switch from the shared or individual MBS session to a multicast session.

In one example, the process comprises comprising requesting, by the MBSF to the MB-SMF, to update the first session of the UE, thereby providing the second session. In one example, the process comprises requesting, by the MBSF to the MB-SMF, to update the MBS unicast session of the UE to a multicast session, optionally comprising providing parameters, for example SUPI, S-NSSAI, MBS ID/TMGI and/or DNN, for example using an Nsmf_Session_Update Request. In one example, the process comprises acknowledging, by the MB-SMF, the session update, optionally comprising providing parameters, for example its multicast IP address and/or port number for NG-RAN, for example using an Nsmf_Session_Update Response.

In one example, the process comprises registering, by the MB-SMF to the UDM, the update from the first session to the second session and optionally, acknowledging, by the UDM to the MB-SMF. In one example, the process comprises registering, by the MB-SMF, the update (i.e. the modification) of the multicast session to the UDM, for example using an Nudm_UECM_Update message, and optionally, acknowledging by the UDM.

In one example, the process comprises modification of the UPF session, for example comprising sending, by the MB-SMF to the MB-UPF, a session modification request, for example a N4 session modification request; and optionally, acknowledging, by the MB-UPF, the session update.

In one example, the process comprises transmitting, by the MB-SMF to the AMF, a message and requesting, by the MB-SMF to the AMF, to forward the message to the first NG-RAN node, wherein the message comprises parameters of the second session and optionally, acknowledging, by the AMF to the MB-SMF, receipt of the message. In one example, the process comprises transmitting, by the MB-SMF to the AMF, a message, for example an Namf_Communication_N1N2MessageTransfer message, and requesting, by the MB-SMF to the AMF, to forward the message to the NG-RAN node(s), wherein the message comprises parameters of the multicast MBS session, such as the multicast IP address, the port number, the APN and/or the NSAPI. In one example, the AMF acknowledges receiving the message.

In one example, the process comprises creating the multicast session (i.e. the second session), for example in response to receiving, by the AMF, the message. In one example, creating the second session optionally comprises sending, by the AMF to the first NG-RAN node, a session creation request and optionally acknowledging, by the first NG-RAN node to the AMF, the session creation request. In one example, creating the multicast session comprises sending, by the AMF to the NG-RAN, a session creation request, such as a MBS session creation request, for example using an N2 Session request message. In one example, creating the multicast session comprises acknowledging, by the NG-RAN to the AMF, the session creation request, for example using an N2 Session response message that may optionally include downlink tunnel information. In one example, acknowledging, by the NG-RAN to the AMF, the session creation request is after establishing, by the NG-RAN, resource for the new session, for example the required resources and/or adjusting resources such as switching the PTM delivery to PTP.

In one example, the process comprises establishing, by the first NG-RAN node, resources for the second session, for example in response to receiving, by the first NG-RAN node, the session creation request. In one example, the process comprises establishing, by the NG-RAN, resource for the new session, for example the required resources for the UE, such as by setting up relevant bearers and/or adjusting resources such as switching the PTM delivery to PTP, for example when the delivery switch involves a switch in the RAN from PTM to PTP.

In one example, the process comprises joining, by the NG-RAN node (i.e. the first NG-RAN node), the relevant multicast session (i.e. the second session).

In one example, the process comprises updating a second session management context of the second session, for example comprising transmitting, by the AMF to the MB-SMF, a request to update the second session management context. In one example, the process comprises updating a multicast session management context, for example comprising transmitting, by the AMF to the MB-SMF, a request to update the multicast session management context, for example with information, such as tunnel information, from NG-RAN, for example using a Nsmf_Session_UpdateSMContext request and optionally, confirming, by the MB-SMF to the AMF, receipt of the request, for example using an Nsmf_Session_UpdateSMContext response message.

In one example, the process comprises updating a second session context of the second session, for example comprising requesting, by the MB-SMF to the MBSF, to update the second session context, such as to update the individual MBS session context with the information from the NG-RAN with an Nmbs Session Update SM Context request message. In one example, the process comprises acknowledging, by the MBSF to the MB-SMF, the connect update, for example with a Nmbs Session Update SM Context response.

In one example, the process comprises exchanging, by the MBSF and the MBSU, messages, for example internal messages.

In one example, the process comprises sending, by the MBSF to the AF, a MBS Session start message.

In one example, the process comprises modification of the second session, for example comprising sending, by the MB-SMF to the MB-UPF, a session modification request, such as an N4 session modification request optionally including new tunneling information. In one example, the process comprises session modification, for example comprising sending, by the MB-SMF to the MB-UPF, a session modification request, for example an N4 session modification request optionally including new tunneling information, and optionally, acknowledging, by the MB-UPF to the MB-SMF, the session modification request.

In one example, transmitting, by the first NG-RAN node, second data from the set of content providers to the first UE according to the second data transmission method in the second session comprises: transmitting, by the first content provider to the MBSU, the second data; processing, by the MBSU, the transmitted data; forwarding, by the MBSU to the MB-UPF, the processed data; sending, by the MB-UPF to the first NG-RAN node, the forwarded data; and transmitting, by the first NG-RAN node, the sent data. In one example, the process comprises starting the multicast transmission, for example using the multicast session and/or bearers, such as PTM bearers. In one example, the process comprises initially transmitting, by the Content Provider to the MBSU, the content (i.e. the data), for example in unicast mode. In one example, the process comprises processing, by the MBSU, the transmitted data, for example by applying FEC and/or raptor codes. In one example, the process comprises forwarding, by the MBSU to the MB-UPF, the processed data, for example in unicast mode. In one example, the process comprises sending, by the MB-UPF to the NG-RAN nodes, the forwarded data, for example using IP multicast. In one example, the process comprises multicasting, by the NG-RAN nodes, the sent data, for example using over-the-radio multicast or unicast bearers, whereby the multicast data are received by the UE.

In one example, the process comprises transmitting, by the first content provider to the MBSU, IP multicast data; processing, by the MBU, the received data, for example by applying FEC, raptor codes, etc.; forwarding, by the MBSU to the MB-UPF via 5GC individual traffic delivery, the processed data (i.e. the MBS data); sending, by the MB-UPF to the NG-RAN via individual delivery, the forwarded data; transmitting, by the NG-RAN, the sent data, for example over the air using PTP bearers; and receiving, by the UE, the transmitted data.

In one example, the process comprises suspending and/or releasing, for example by the 5GC, the second session (i.e. the MBS session), if the number of UEs included in the second session is less than a threshold number, for example if there are no UEs included in the second session. If no additional UEs are left in the MBS session with shared delivery, the 5GC may decide to either suspend or release the MBS session. Suspending the MBS session does not involve deleting the MBS session context in 5GC NFs to facilitate UEs to join the MBS session or switch to shared delivery in the future with reduced signaling; releasing an MBS session does delete the MBS session context from all entities in 5GC. In one example, the process comprises releasing resources, if the second session (i.e. the MBS session) is suspended and/or released. Outstanding NG-RAN resources for PTM delivery of the shared MBS session are released in both cases.

Alternative A: Suspension of Shared MBS Session

In one example, the process comprises requesting, by the MBSF to the MB-SMF, suspension of the second session (i.e. the shared MBS session). In one example, the process comprises transmitting, by the MBSF to the MB-SMF, an Nsmf Session Suspend request to request the suspension of the MBS session for shared delivery.

In one example, the process comprises forwarding, by the MB-SMF to the AMF, the request to suspend the second session. In one example, the process comprises transmitting, by the MB-SMF to the AMF, a Namf Session Suspend request to forward the suspension request of the MBS session for shared delivery.

In one example, the process comprises requesting, by the AMF to the NG-RAN, release of resources, for example outstanding PTM resources. In one example, the process comprises transmitting, by the AMF to the NG-RAN, an N2 Session Suspend request to release any outstanding PTM resources.

In one example, the process comprises acknowledging, by the NG-RAN to the AMF, suspension of the second session (i.e. the shared MBS session). In my example, the process comprises transmitting, by the NG-RAN to the AMF, an N2 Session suspend response message to acknowledge the suspension of the shared MBS session.

In one example, the process comprises releasing, by the NG-RAN, resources, for example any outstanding allocated resources to the shared MBS session for PTM delivery.

In one example, the process comprises acknowledging, by the AMF to the MB-SMF, suspension of the second session (i.e. the shared MBS session). In one example the process comprises transmitting, by the AMF to the MB-SMF, a Namf Session suspend response message to the MB-SMF to acknowledge the suspension of the shared MBS session.

In one example, the process comprises acknowledging, by the MB-SMF to the MBSF, suspension of the second session (i.e. the shared MBS session). In one example, the process comprises transmitting, by the MB-SMF to the MBSF, an Nsmf Session suspend response message to acknowledge the suspension of the shared MBS session.

Alternative B: Release of Shared MBS Session

In one example, the process comprises requesting, by the MB-SMF to the AMF, release of the second session (i.e. the shared MBS session) and/or deletion of associated resources. In one example, the process comprises transmitting, by the MB-SMF to the AMF, an Namf Session Release request to the AMF to request the release of the shared MBS session and/or deletion of associated resources. In one example, the process comprises acknowledging, by the AMF to the MB-SMF, release of the second session and/or deletion of associated resources.

In one example, the process comprises requesting, by the AMF to the NG-RAN, release of the resources allocated to the second session (i.e. the shared MBS session). In one example, the process comprises transmitting, by the AMF to the NG-RAN, an N2 Session Release request to the NG-RAN to request the release of the resources allocated to the shared MBS session. In one example, the process comprises acknowledging, by the NG-RAN to the AMF, release of the resources. In one example, the process comprises transmitting, by the NG-RAN to the AMF, an N2 Session release response message to acknowledge the resources release associated to the shared MBS session.

In one example, the process comprises releasing, by the, NG-RAN, resources, for example outstanding allocated resources, such as to the shared MBS session for PTM delivery.

In one example, the process comprises requesting, by the AMF to the MB-SMF, to release the session management context, for example the MBS session management context, for the second session (i.e. for the shared MBS session). In one example, the process comprises transmitting, by the AMF to the MB-SMF, an Nsmf Release SMContext request message to request the release of the MBS session management context for the shared MBS session. In one example, the process comprises acknowledging, by the MB-SMF to the AMF, release of the session management context. In one example, the process comprises transmitting, by the MB-SMF to the AMF, an Nsmf Release SMContext response message to the AMF to acknowledge the release of the MBS session management context for the shared MBS session.

In one example, the process comprises requesting, by the MB-SMF to the MBSF, to release the session management context, for example the MBSF session management context, for the second session (i.e. for the shared MBS session). In one example, the process comprises transmitting, by the MB-SMF to the MBSF, an Nmbs Release SMContext request to request the release of the MBS session management context for the shared MBS session. In one example, the process comprises acknowledging, by the MBSF to the MB-SMF, the release of the second session. In one example, the process comprises transmitting, by the MBSF to the MB-SMF, an Nsmf Release SMContext response message to the MB-SMF, to acknowledge the release of the MBS session management context for the shared MBS session.

In one example, the process comprises requesting, by the MB-SMF to the MB-UPF, to release the second session (i.e. the shared MBS session) and optionally, acknowledging by the MB-UPF. In one example, the process comprises transmitting, by the MB-SMF to the MB-UPF, an N4 Session release request to request the release of the shared MBS session, which is then acknowledged by the MB-UPF.

In one example, the process comprises exchanging, by the MBSF and the MBSU, messages, for example internal messages.

In one example, the process comprises transmitting, by the MBSF, an MBS session end message, for example to the Content/Application Server, which may optionally be first forwarded by the NEF before reaching the Content/Application Server.

DEFINITIONS

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

EXAMPLES

This section presents different solutions for supporting delivery method switching (unicast to multicast/broadcast, multicast/broadcast to unicast) in 5G networks. As the final architecture model for 5G networks has not yet been defined, we present solutions for the most prominent architecture reference models. For each of the models, we present examples for switching the delivery method from unicast to multicast/broadcast, as well as from multicast/broadcast to unicast. Furthermore, we also consider whether a session pre-exists the delivery method switch or not separately.

Example 1: Solutions for the First Architecture Reference Model

This example is relevant to the first architecture reference model, where the BMF-C and BMF-U additional network functions are considered. When switching the delivery method from unicast to either multicast or broadcast, we present two different solutions depending on whether a session pre-exists or not. When the delivery method is switched from multicast/broadcast to unicast, we present a single solution as a new session will have to be established as long as the UE to be switched is not the last one in the 5MBS group.

Example 1.1 Unicast to Multicast/Broadcast Delivery Method Switching with No Pre-Existing Session In this example, there exist neither a multicast session nor any session management context for the service, and thus a new session and session management context must be created once the delivery method switch is triggered.

Figure 7A:
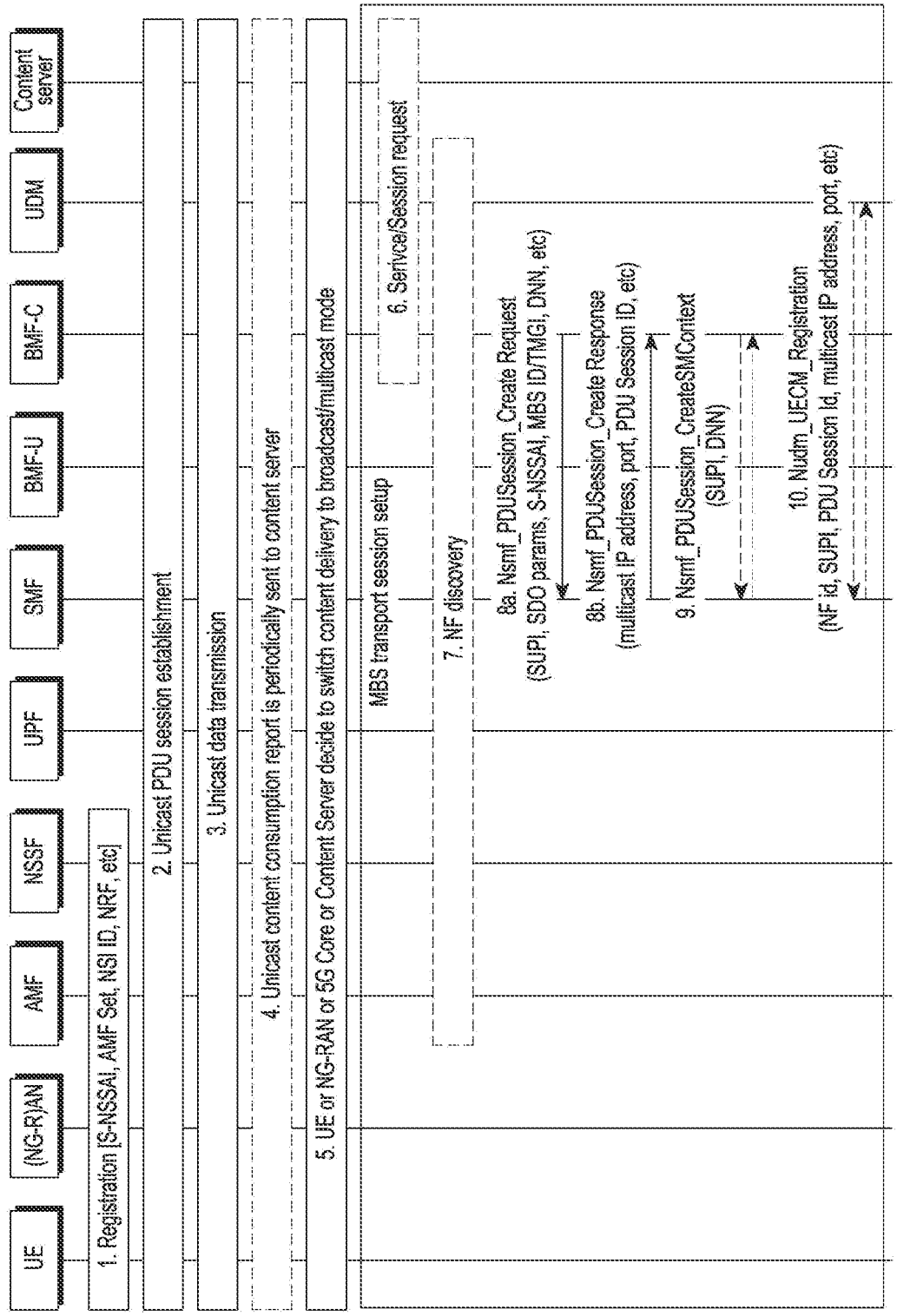
FIGS. 7A and 7B schematically depict a process according to an exemplary embodiment.
Figure 7B:
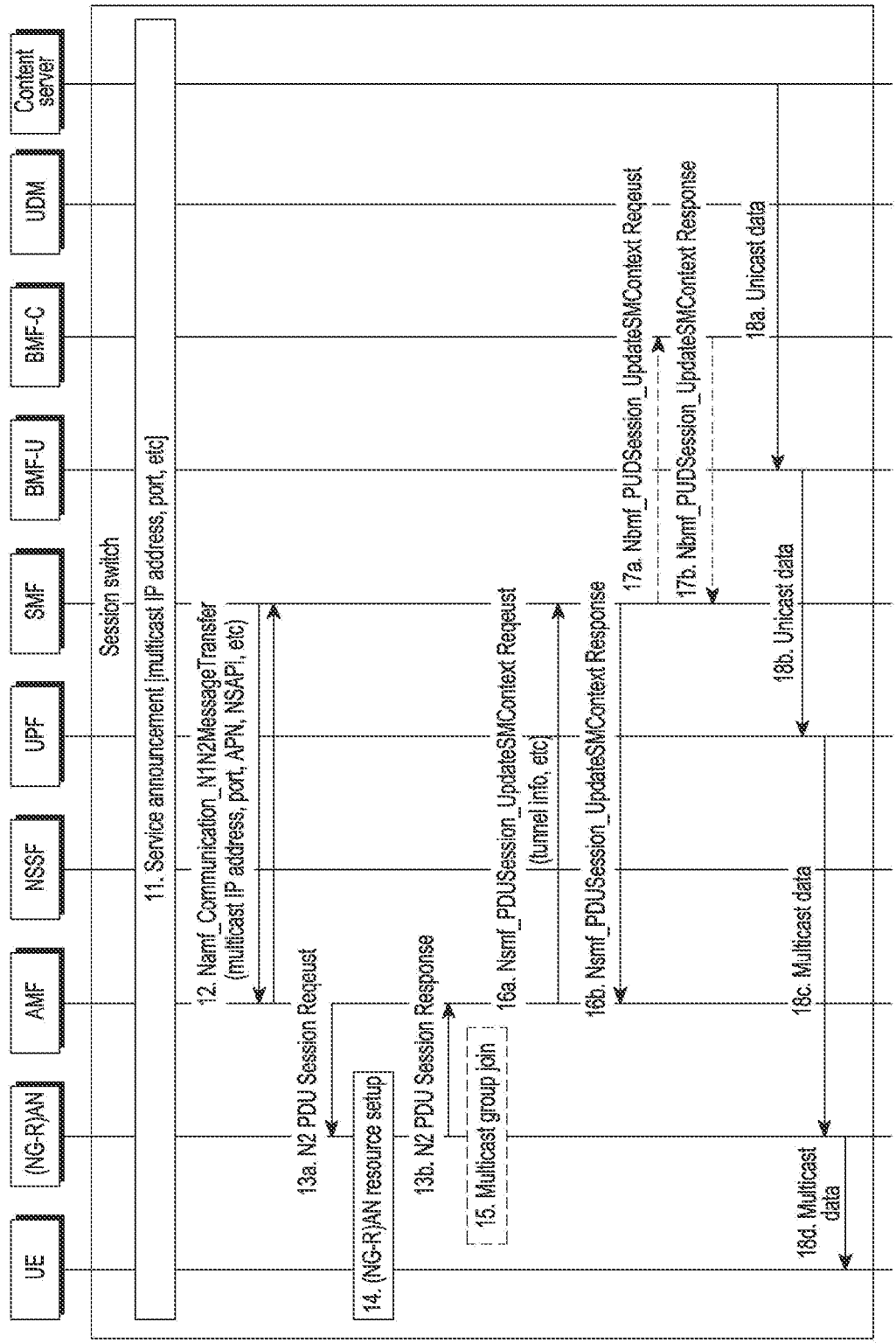

FIGS. 7A and 7B schematically depict a process according to an exemplary embodiment. Particularly, FIGS. 7A and 7B show a Unicast to Multicast/Broadcast delivery method switch with no pre-existing session for the first architecture reference model.

The switching process is as follows:
1. The UE performs the registration procedure according to [3].
2. The UE and the 5G Core establish a unicast PDU session according to [3].
3. The unicast transmission starts.
4. Optionally, the UE(s) periodically transmit consumption reports to the network regarding their unicast PDU sessions. These reports may later be used by the network to trigger the delivery method switch. As this step is optional the delivery method switch may be triggered based on other criteria.
5. At some point, the UE or the NG-RAN or the 5G Core or the Content Server decides to switch the delivery method from multiple unicast sessions to a single multicast/broadcast session.
6. Optionally, the Content Server requests a session from the BMF-C (e.g. in the case where it was the Content Server that decided the delivery method switch).
7. Optionally, the BMF-C discovers the downstream network functions that will be involved in the new session. The execution of this step is subject to different conditions. The following, not exhaustive list, includes some cases where NF discovery is required:
   a. A UE being the first one to switch the delivery method from unicast to multicast, i.e. a new session and session management context need to be created.
   b. The UE moving from a cell where the content is delivered in unicast mode, to a 5MBS-capable cell, where there is no ongoing multicast session.

The following, not exhaustive list, includes some cases where NF discovery is not required:
   a. The UE moving from a cell where the content is delivered in unicast mode, to a 5MBS-capable cell, where there is an ongoing multicast session.
   b. A previous multicast session exists in an inactive state and can be re-used 8. The BMF-C requests the creation of the new session by the SMF, providing the required parameters for the session. The SMF responds to acknowledge the creation of the session and provides its multicast IP address and port number.
9. The BMF-C sends an Nsmf_PDUSession_CreateSMContext message to the SMF to request the creation of a new session management context. If the context is successfully created the SMF confirms it with an Nsmf_PDUSession_CreateSMContext Response message.
10. Optionally, the SMF may register the multicast session to the UDM.
11. The new session is announced to the network providing information such as multicast IP address and port number.
12. The SMF transmits a Namf_Communication_N1N2MessageTransfer message to the AMF to request the transfer of the message to the NG-RAN nodes(s).
13. The AMF sends the session creation request to the NG-RAN via an N2_PDU Session request message. The session creation is later acknowledged with an N2_PDU Session response message.
14. The NG-RAN establishes the required resources.
15. If the session is switched to multicast, the NG-RAN node joins the relevant multicast. Otherwise, if the delivery method is switched to broadcast, no such joining is required.
16. The AMF now transmits an Nsmf_PDUSession_UpdateSMContext request to the SMF to update the multicast session context with the information from the NG-RAN, and the SMF confirms the reception with an Nsmf_PDUSession_UpdateSMContext response message.
17. The SMF requests the BMF-C to update the multicast session context with the information from the NG-RAN with the newly introduced Nbmf_PDUSession_UpdatePDUContext request, and the BMF-C acknowledges the context update with an Nbmf_PDUSession_UpdatePDUContext response.
18. The multicast transmission starts using the multicast session and bearers. Initially, the content is transmitted from the Content Provider to the BMF-U in unicast mode, and the BMF-U forwards the data to the UPF in the same manner. The UPF processes the received data (e.g. applies FEC, raptor codes) and sends them using IP multicast to the NG-RAN nodes. Finally, the NG-RAN nodes multicast/broadcast the data over the air using over-the radio multicast or unicast bearers.

Example 1.2 Unicast to Multicast/Broadcast Delivery Method Switching with Pre-Existing Session In this example, there exist both a multicast session and a session management context for the service, and thus no new sessions or session management context need to be created once the delivery method switch is triggered.

Figure 8A:
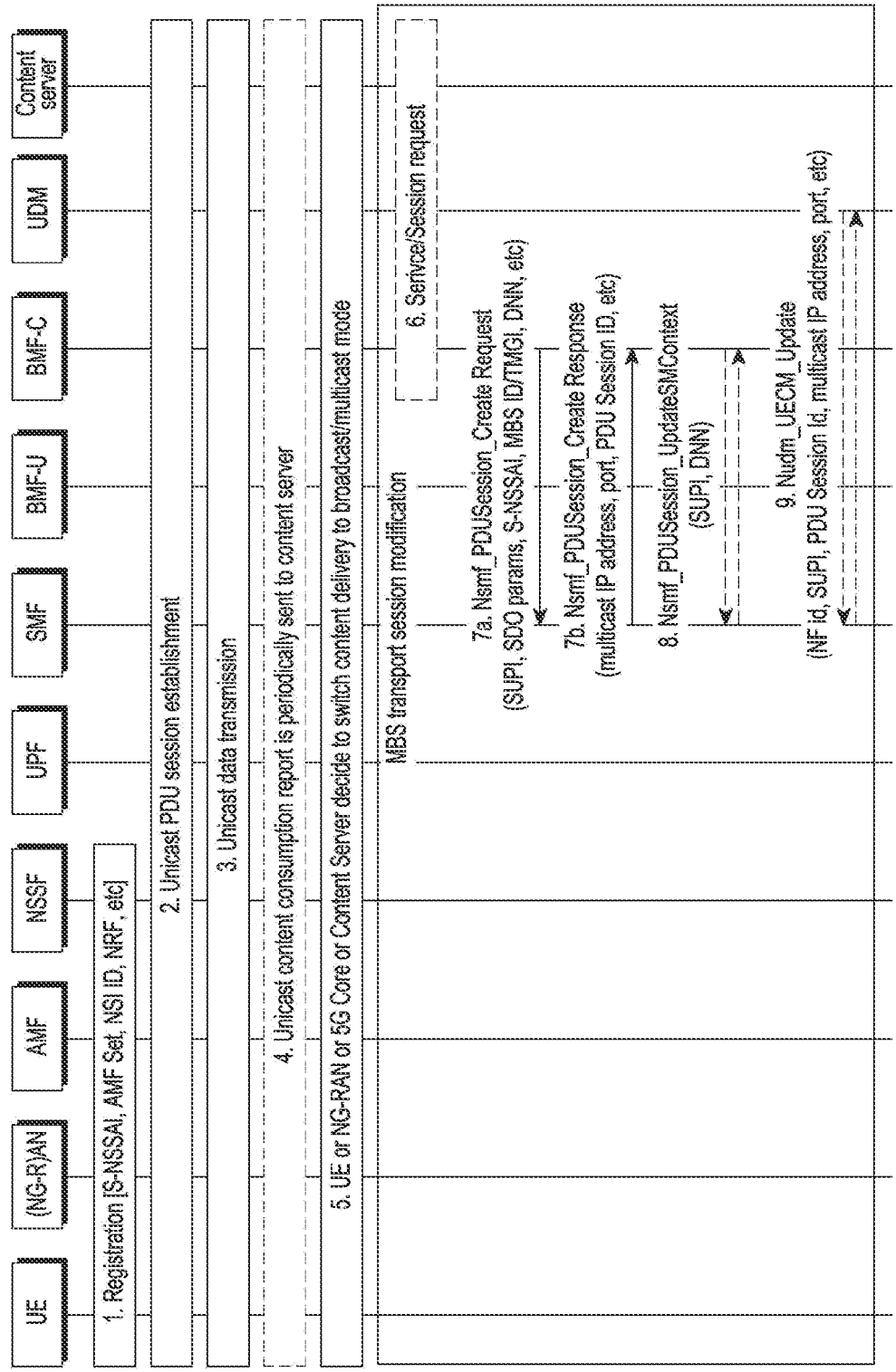
FIGS. 8A and 8B schematically depict a process according to an exemplary embodiment.
Figure 8B:
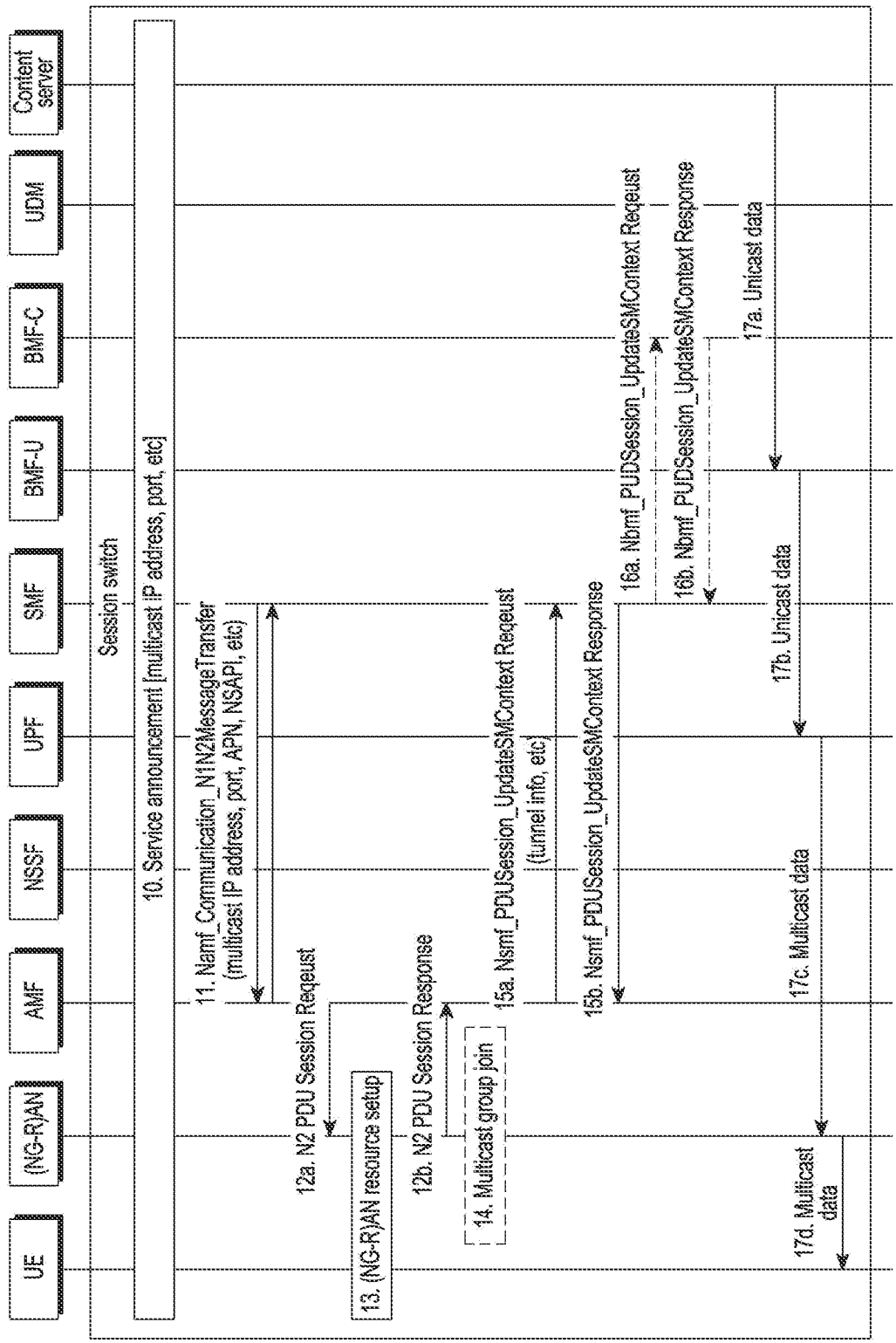

FIGS. 8A and 8B schematically depict a process according to an exemplary embodiment. Particularly, FIGS. 8A and 8B show a Unicast to Multicast/Broadcast delivery method switch with pre-existing session for the first architecture reference model.

The switching process is as follows:
1. The UE performs the registration procedure according to [3].
2. The UE and the 5G Core establish a unicast PDU session according to [3].
3. The unicast transmission starts.
4. Optionally, the UE(s) periodically transmit consumption reports to the network regarding their unicast PDU sessions. These reports may later be used by the network to trigger the delivery method switch. As this step is optional the delivery method switch may be triggered based on other criteria.
5. At some point, the UE or the NG-RAN or the 5G Core or the Content Server decides to switch the delivery method from multiple unicast sessions to a single multicast/broadcast session.
6. Optionally, the Content Server requests a session from the BMF-C (e.g. in the case where it was the Content Server that decided the delivery method switch).
7. The BMF-C requests the update of the session by the SMF, providing the required parameters. The SMF responds to acknowledge the modification of the.
8. Optionally, the BMF-C either requests the update of the session management context associated with the existing multicast session.
9. Optionally, the SMF may register the modification of the multicast session to the UDM.
10. The updated session is announced to the network providing information such as multicast IP address and port number.
11. The SMF transmits an Namf_Communication_N1N2MessageTransfer message to the AMF to request the transfer of the message to the NG-RAN node(s).
12. The AMF sends the session creation request to the NG-RAN via an N2_PDU Session request message. The session creation is later acknowledged with an N2_PDU Session response message.
13. The NG-RAN establishes the required resources.
14. If the session is switched to multicast, the NG-RAN node joins the relevant multicast. Otherwise, if the delivery method is switched to broadcast, no such joining is required.
15. The AMF now transmits an Nsmf_PDUSession_UpdateSMContext request to the SMF to update the multicast session context with the information from the NG-RAN, and the SMF confirms the reception with an Nsmf_PDUSession_UpdateSMContext response message.
16. The SMF requests the BMF-C to update the multicast session context with the information from the NG-RAN with the newly introduced Nbmf_PDUSession_UpdatePDUContext request, and the BMF-C acknowledges the context update with an Nbmf_PDUSession_UpdatePDUContext response.
17. The multicast transmission starts using the multicast session and bearers. Initially, the content is transmitted from the Content Provider to the BMF-U in unicast mode, and the BMF-U forwards the data to the UPF in the same manner. The UPF processes the received data (e.g. applies FEC, raptor codes) and sends them using IP multicast to the NG-RAN nodes. Finally, the NG-RAN nodes multicast/broadcast the data over the air using over-the radio multicast or unicast bearers.

Example 1.3 Multicast/Broadcast to Unicast Delivery Method Switching

In this example, the UE(s) are already registered with the network and an active multicast session already exists. In addition, the UE(s) for which the session switch is performed are not the last ones in the 5MBS group receiving the multicast context, and as such a new unicast session must be setup.

Figure 9A:
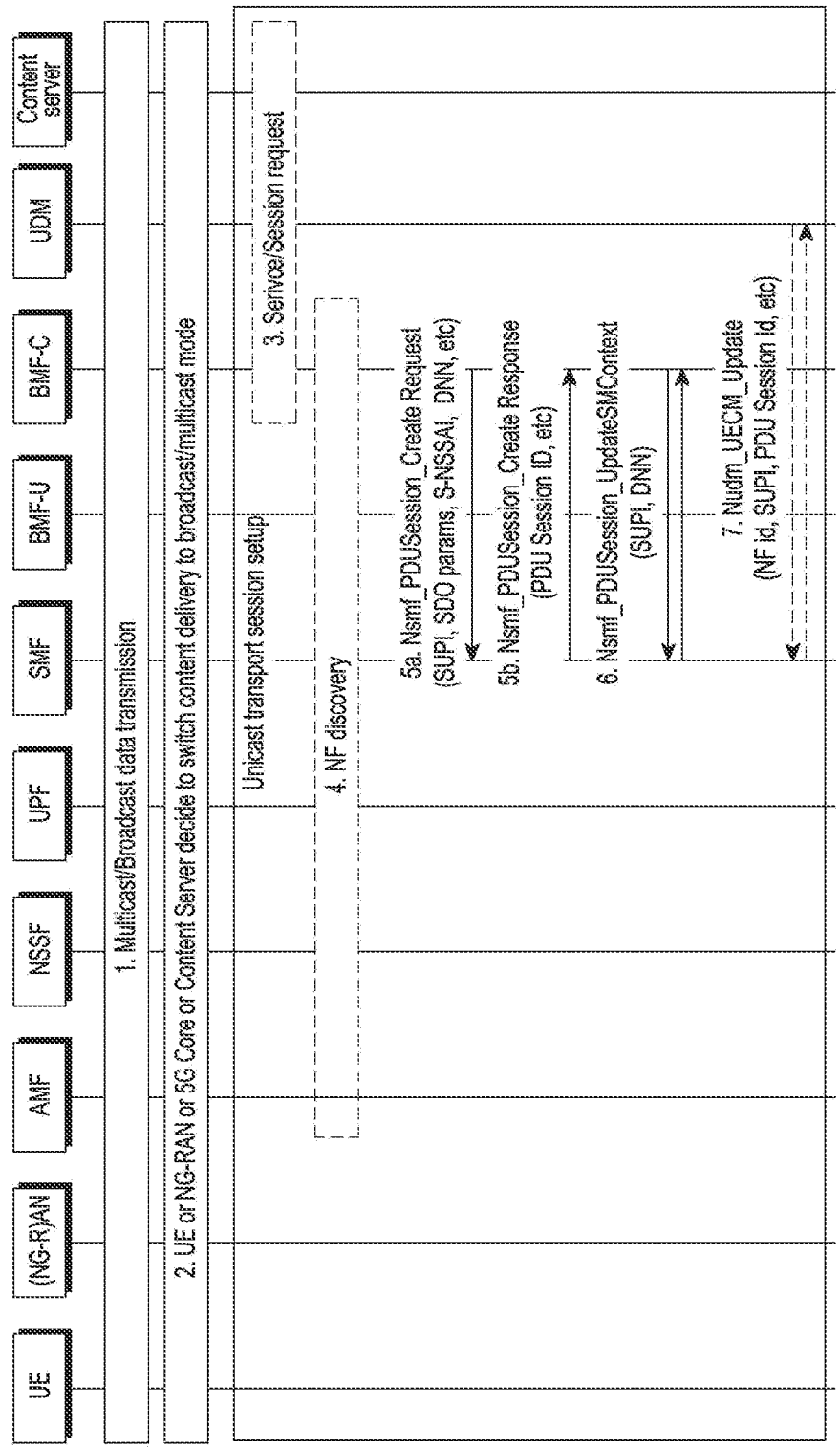

FIGS. 9A and 9B schematically depict a process according to an exemplary embodiment. Particularly, FIGS. 9A and 9B show a Multicast/Broadcast to Unicast delivery method switch for the first architecture reference model.

The switching process is as follows:
1. A multicast/broadcast session is ongoing.
2. At some point, the UE or the NG-RAN or the 5G Core or the Content Server decides to switch the multicast/broadcast session of a UE to unicast.
3. Optionally, the Content Server requests a session from the BMF-C (e.g. in the case where it was the Content Server that decided the delivery method switch).
4. Optionally, the network performs NF discovery for the new session.
5. The BMF-C requests the creation of a new PDU session from the SMF.
6. The BMF-C requests the creation of a new session management context from the SMF.
7. Optionally, the SMF requests the registration of the new session to the UDM.
8. The SMF transmits an Namf_Communication_N1N2Message Transfer message to the AMF to request the transfer of the message to the NG-RAN node(s).
9. The AMF sends the session creation request to the NG-RAN via an N2_PDU Session request message. The session creation is later acknowledged with an N2_PDU Session response message.
10. The NG-RAN establishes the required unicast resources.
11. The AMF now transmits an Nsmf_PDUSession_UpdateSMContext request to the SMF to update the new unicast session context with the information from the NG-RAN, and the SMF confirms the reception with an Nsmf_PDUSession_UpdateSMContext response message.
12. Optionally, the SMF requests the BMF-C to update the unicast session context with the information from the NG-RAN with the newly introduced Nbmf_PDUSession_UpdatePDUContext request, and the BMF-C acknowledges the context update with an Nbmf_PDUSession_UpdatePDUContext response.
13. The unicast transmission starts using the multicast session and bearers. Initially, the content is transmitted from the Content Provider to the BMF-U and the BMF-U forwards the data to the UPF in the same manner. The UPF processes the received data (e.g. applies FEC, raptor codes) and sends them to the NG-RAN node. Finally, the NG-RAN nodes transmit the data over the air using the over-the-radio unicast bearers established in step 10.
14. Optionally, if the switched UE was the last one in the 5MBS group, the NG-RAN node releases the multicast resources, as they are no longer need.
15. Optionally, if the switched UE was the last one in the 5MBS group, the network optionally deregisters, releases and deletes the multicast session.

Example 2: Solutions for the Second Architecture Reference Model

Example 2 is relevant to the second architecture reference model, where no additional network functions are considered. Similar to Example 1, when switching the delivery method from unicast to either multicast or broadcast, two different solutions (Examples 2.1 and 2.2) are presented depending on whether a session pre-exists or not. When the delivery method is switched from multicast/broadcast to unicast, a single solution (Example 2.3) is presented since a new session will have to be established as long as the UE to be switched is not the last one in the 5MBS group.

Example 2.1 Unicast to Multicast/Broadcast Delivery Method Switching with No Pre-Existing Session In this example, there exist neither a multicast session nor any session management context for the service, and thus a new session and session management context must be created once the delivery method switch is triggered.

Figure 10A:
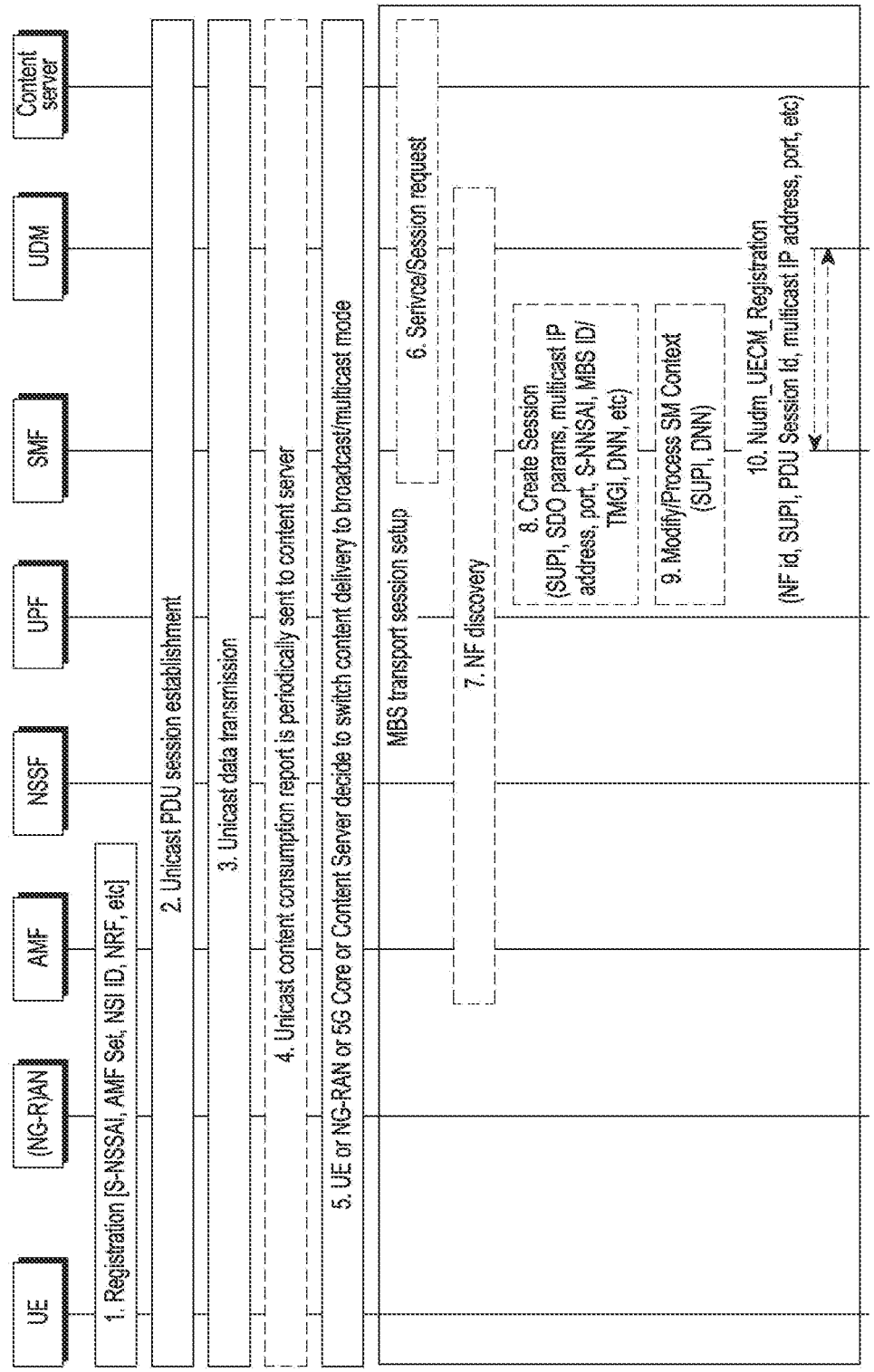
FIGS. 10A and 10B schematically depict a process according to an exemplary embodiment.
Figure 10B:
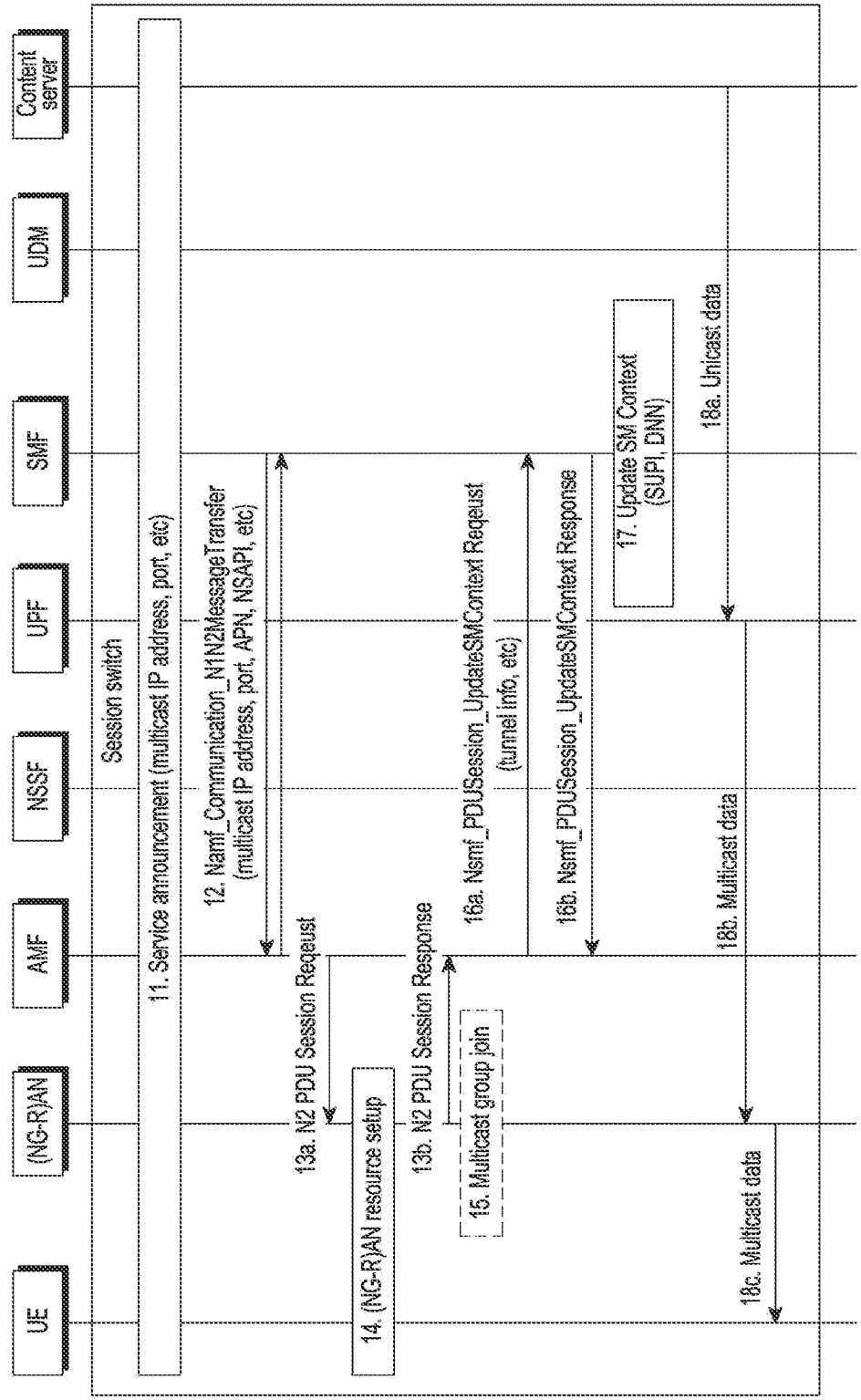

FIGS. 10A and 10B schematically depict a process according to an exemplary embodiment. Particularly, FIGS. 10A and 10B show a Unicast to Multicast/Broadcast delivery method switch with no pre-existing session for the second architecture reference model.

The switching process is as follows:
The UE performs the registration procedure according to [3].
The UE and the 5G Core establish a unicast PDU session according to [3].
The unicast transmission starts.
Optionally, the UE(s) periodically transmit consumption reports to the network regarding their unicast PDU sessions. These reports may later be used by the network to trigger the delivery method switch. As this step is optional the delivery method switch may be triggered based on other criteria.
At some point, the UE or the NG-RAN or the 5G Core or the Content Server decides to switch the delivery method from multiple unicast sessions to a single multicast/broadcast session.
The Content Server requests a session from the SMF.
Optionally, the SMF discovers the downstream network functions that will be involved in the new session. The execution of this step is subject to different conditions. The following, not exhaustive list, includes some cases where NF discovery is required:
A UE being the first one to switch the delivery method from unicast to multicast, i.e. a new session and session management context need to be created.
The UE moving from a cell where the content is delivered in unicast mode, to a 5MBS-capable cell, where there is no ongoing multicast session.
The following, not exhaustive list, includes some cases where NF discovery is not required:
The UE moving from a cell where the content is delivered in unicast mode, to a 5MBS-capable cell, where there is an ongoing multicast session.
A previous multicast session exists in an inactive state and can be re-used
8. The SMF creates a new session based on the required parameters for the session. The SMF also allocates a multicast IP address and a port number for the new session.
9. The SMF creates a new SM context or updates the existing one if applicable.
10. Optionally, the SMF registers the new multicast session to the UDM.
11. The new session is announced to the network providing information such as multicast IP address and port number.

12. The SMF transmits an Namf_Communication_N1N2MessageTransfer message to the AMF to request the transfer of the message to the NG-RAN nodes(s).
13. The AMF sends the session creation request to the NG-RAN via an N2_PDU Session request message. The session creation is later acknowledged with an N2_PDU Session response message.
14. The NG-RAN establishes the required resources.
15. If the session is switched to multicast, the NG-RAN node joins the relevant multicast. Otherwise, if the delivery method is switched to broadcast, no such joining is required.
16. The AMF now transmits an Nsmf_PDUSession_UpdateSMContext request to the SMF to update the multicast session context with the information from the NG-RAN, and the SMF confirms the reception with an Nsmf_PDUSession_UpdateSMContext response message.
17. The SMF updates the multicast session context with the information from the NG-RAN.
18. The multicast transmission starts using the multicast session and bearers. Initially, the content is transmitted from the Content Provider to the UPF in unicast mode. The UPF processes the received data (e.g. applies FEC, raptor codes) and sends them using IP multicast to the NG-RAN nodes. Finally, the NG-RAN nodes multicast/broadcast the data over-the-radio multicast or unicast bearers.

Example 2.2 Unicast to Multicast/Broadcast Delivery Method Switching with Pre-Existing Session In this example, there exist both a multicast session and a session management context for the service, and thus no new sessions or session management context need to be created once the delivery method switch is triggered.

Figure 11A:
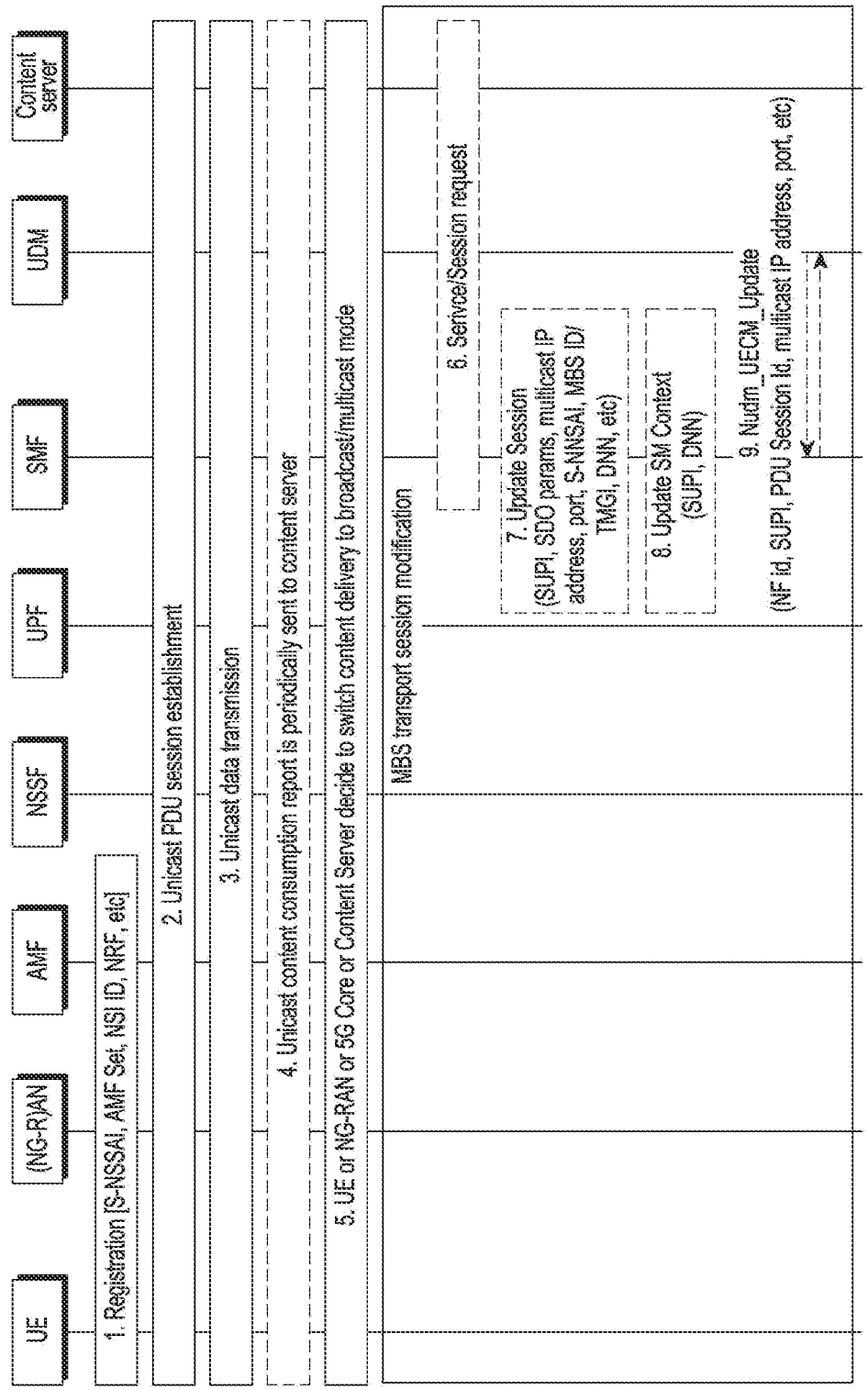
FIGS. 11A and 11B schematically depict a process according to an exemplary embodiment.
Figure 11B:
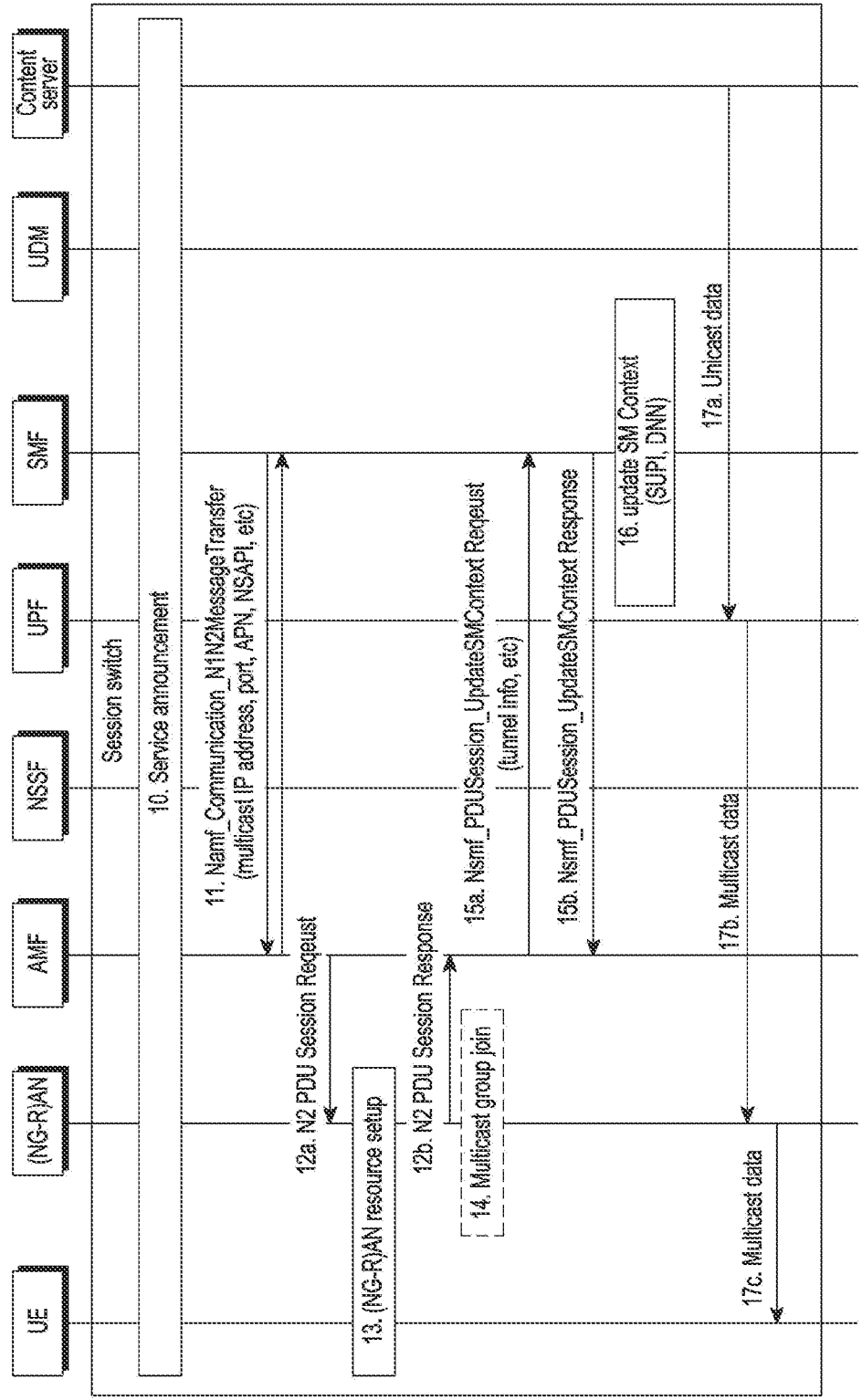

FIGS. 11A and 11B schematically depict a process according to an exemplary embodiment. Particularly, FIGS. 11A and 11B show a Unicast to Multicast/Broadcast delivery method switch with pre-existing session for the second architecture reference model.

The switching process is as follows:
1. The UE performs the registration procedure according to [3].
2. The UE and the 5G Core establish a unicast PDU session according to [3].
3. The unicast transmission starts.
4. Optionally, the UE(s) periodically transmit consumption reports to the network regarding their unicast PDU sessions. These reports may later be used by the network to trigger the delivery method switch. As this step is optional the delivery method switch may be triggered based on other criteria.
5. At some point, the UE or the NG-RAN or the 5G Core or the Content Server decides to switch the delivery method from multiple unicast sessions to a single multicast/broadcast session.
6. Optionally, the Content Server requests a session from the SMF.
7. The SMF the updates the pre-existing session based on the required parameters.
8. Optionally, the SMF creates a new SM context or updates the existing one if applicable.
9. Optionally, the SMF may register the modification of the multicast session to the UDM.
10. The updated session is announced to the network providing information such as multicast IP address and port number.
11. The SMF transmits an Namf_Communication_N1N2MessageTransfer message to the AMF to request the transfer of the message to the NG-RAN node(s).
12. The AMF sends the session creation request to the NG-RAN via an N2_PDU Session request message. The session creation is later acknowledged with an N2_PDU Session response message.
13. The NG-RAN establishes the required resources.
14. If the session is switched to multicast, the NG-RAN node joins the relevant multicast. Otherwise, if the delivery method is switched to broadcast, no such joining is required.
15. The AMF now transmits an Nsmf_PDUSession_UpdateSMContext request to the SMF to update the multicast session context with the information from the NG-RAN, and the SMF confirms the reception with an Nsmf_PDUSession_UpdateSMContext response message.
16. The SMF updates the multicast session context with the information from the NG-RAN.
17. The multicast transmission starts using the multicast session and bearers. Initially, the content is transmitted from the Content Provider to the UPF in unicast mode. The UPF processes the received data (e.g. applies FEC, raptor codes) and sends them using IP multicast to the NG-RAN nodes. Finally, the NG-RAN nodes multicast/broadcast the data over the air using over-the-radio multicast or unicast bearers.

Example 2.3 Multicast/Broadcast to Unicast Delivery Method Switching

In this example, the UE(s) are already registered with the network and an active multicast session already exists. In addition, the UE(s) for which the session switch is performed are not the last ones in the 5MBS group receiving the multicast context, and as such a new unicast session must be setup.

Figure 12A:
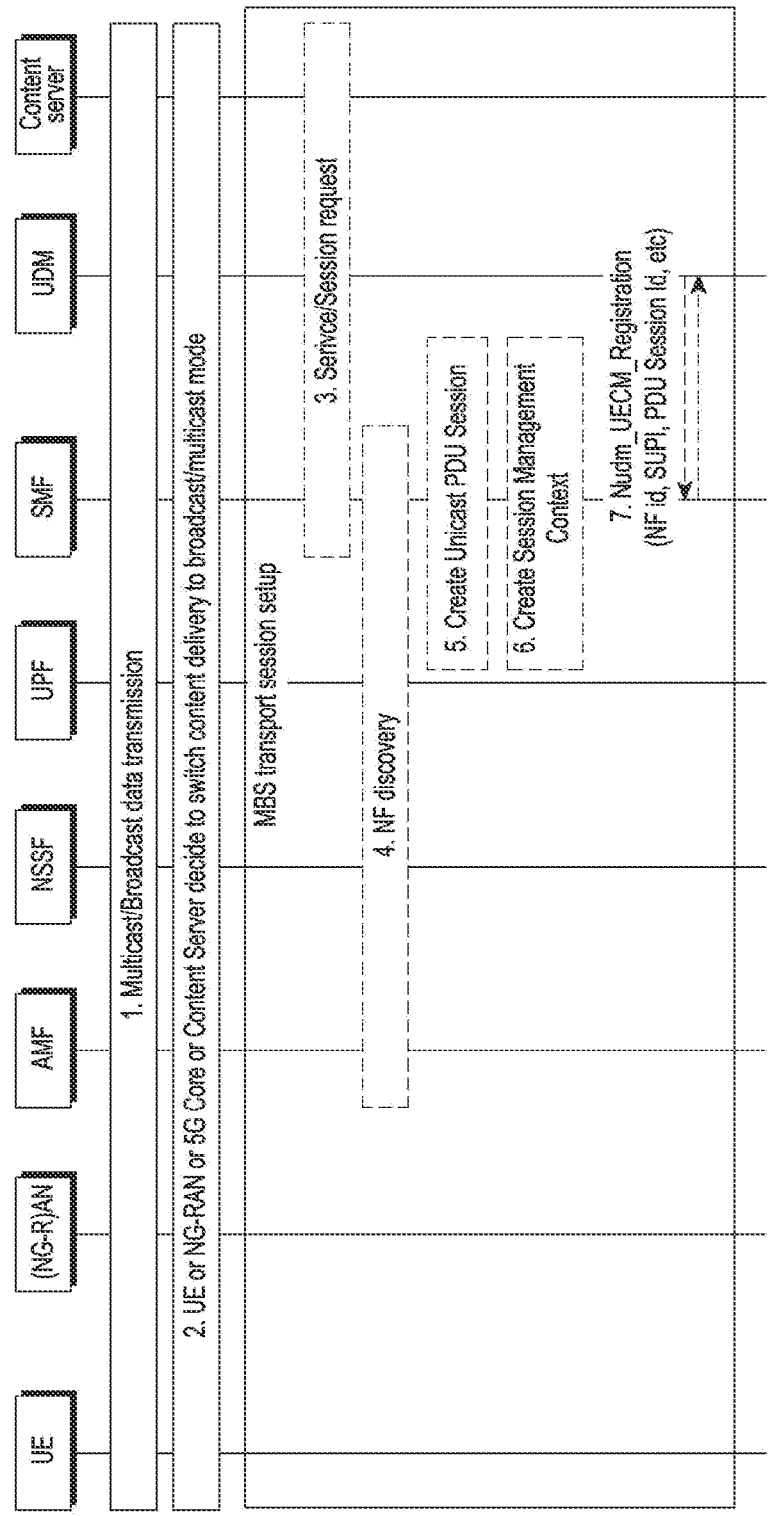
FIGS. 12A and 12B schematically depict a process according to an exemplary embodiment.
Figure 12B:
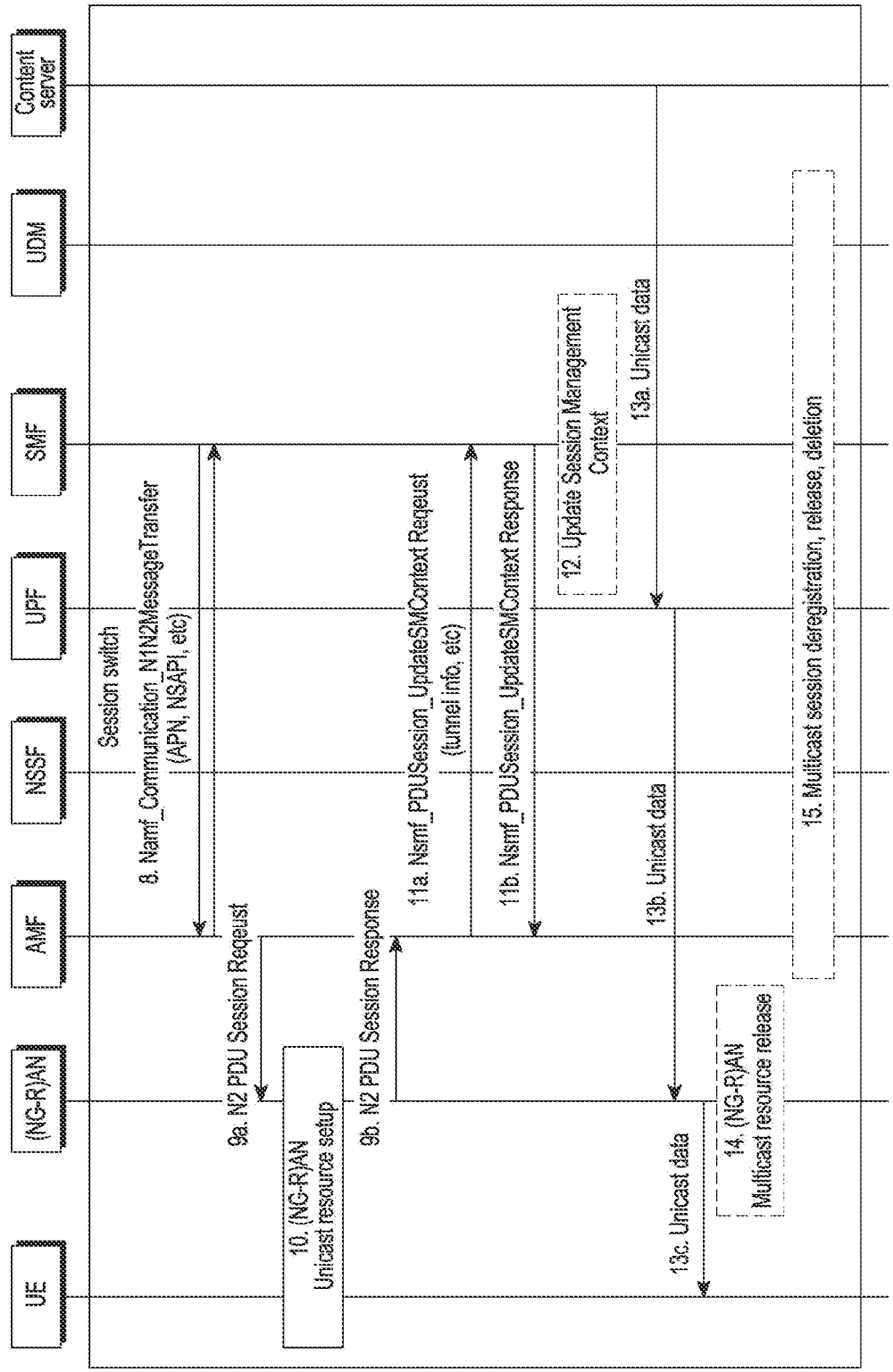

FIGS. 12A and 12B schematically depict a process according to an exemplary embodiment. Particularly, FIGS. 12A and 12B show a Multicast/Broadcast to Unicast delivery method switch for the third architecture reference model.

The switching process is as follows:
1. A multicast/broadcast session is ongoing.
2. At some point, the UE or the NG-RAN or the 5G Core or the Content Server decides to switch the multicast/broadcast session of a UE to unicast.
3. Optionally, the Content Server requests a session from the SMF (e.g. in the case where it was the Content Server that decided the delivery method switch).
4. Optionally, the network performs NF discovery for the new session.
5. The SMF creates a new PDU session.
6. The SMF creates a new session management context.
7. Optionally, the SMF requests the registration of the new session to the UDM.
8. The SMF transmits an Namf_Communication_N1N2MessageTransfer message to the AMF to request the transfer of the message to the NG-RAN node(s).
9. The AMF sends the session creation request to the NG-RAN via an N2_PDU Session request message.

The session creation is later acknowledged with an N2_PDU Session response message.
10. The NG-RAN establishes the required unicast resources.
11. The AMF now transmits an Nsmf_PDUSession_UpdateSMContext request to the SMF to update the new unicast session context with the information from the NG-RAN, and the SMF confirms the reception with an Nsmf_PDUSession_UpdateSMContext response message.
12. Optionally, the SMF updates the unicast session context with the information from the NG-RAN.
13. The unicast transmission starts using the multicast session and bearers. The content is transmitted from the Content Provider to the UPF. The UPF processes the received data (e.g. applies FEC, raptor codes) and sends them to the NG-RAN node. Finally, the NG-RAN nodes transmit the data over the air using the over-the-radio unicast bearers established in step 10.
14. Optionally, if the switched UE was the last one in the 5MBS group, the NG-RAN node releases the multicast resources, as they are no longer need.
15. Optionally, if the switched UE was the last one in the 5MBS group, the network optionally deregisters, releases and deletes the multicast session.

Example 3: Additional and/or Alternative Solutions for the First Architecture Reference Model This example is relevant to the first architecture reference model, particularly as described with reference to FIG. 3B, where the MBSF and MBSU additional network functions are considered.

Figure 13A:
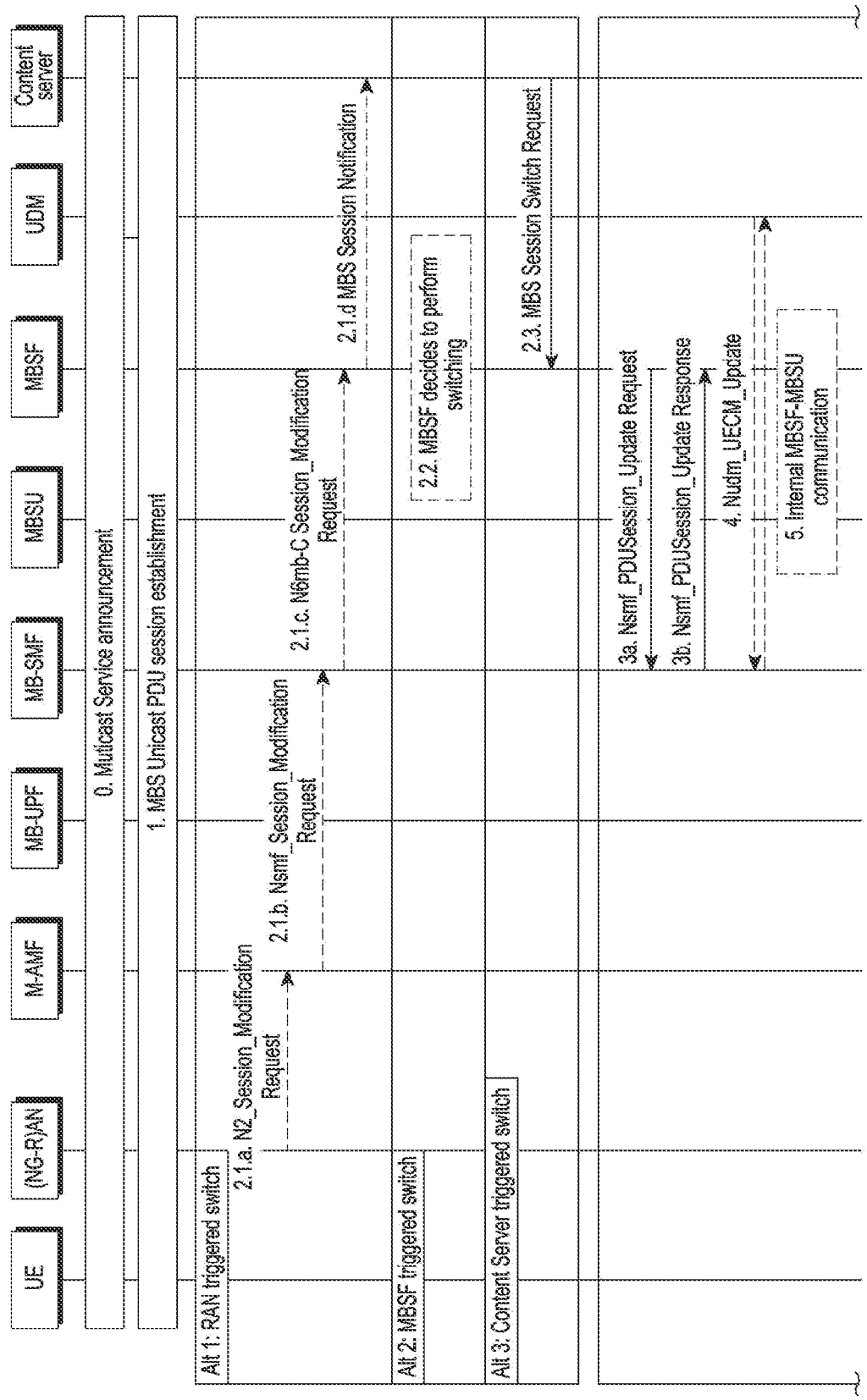
FIGS. 13A and 13B schematically depict a process according to an exemplary embodiment.
Figure 13B:
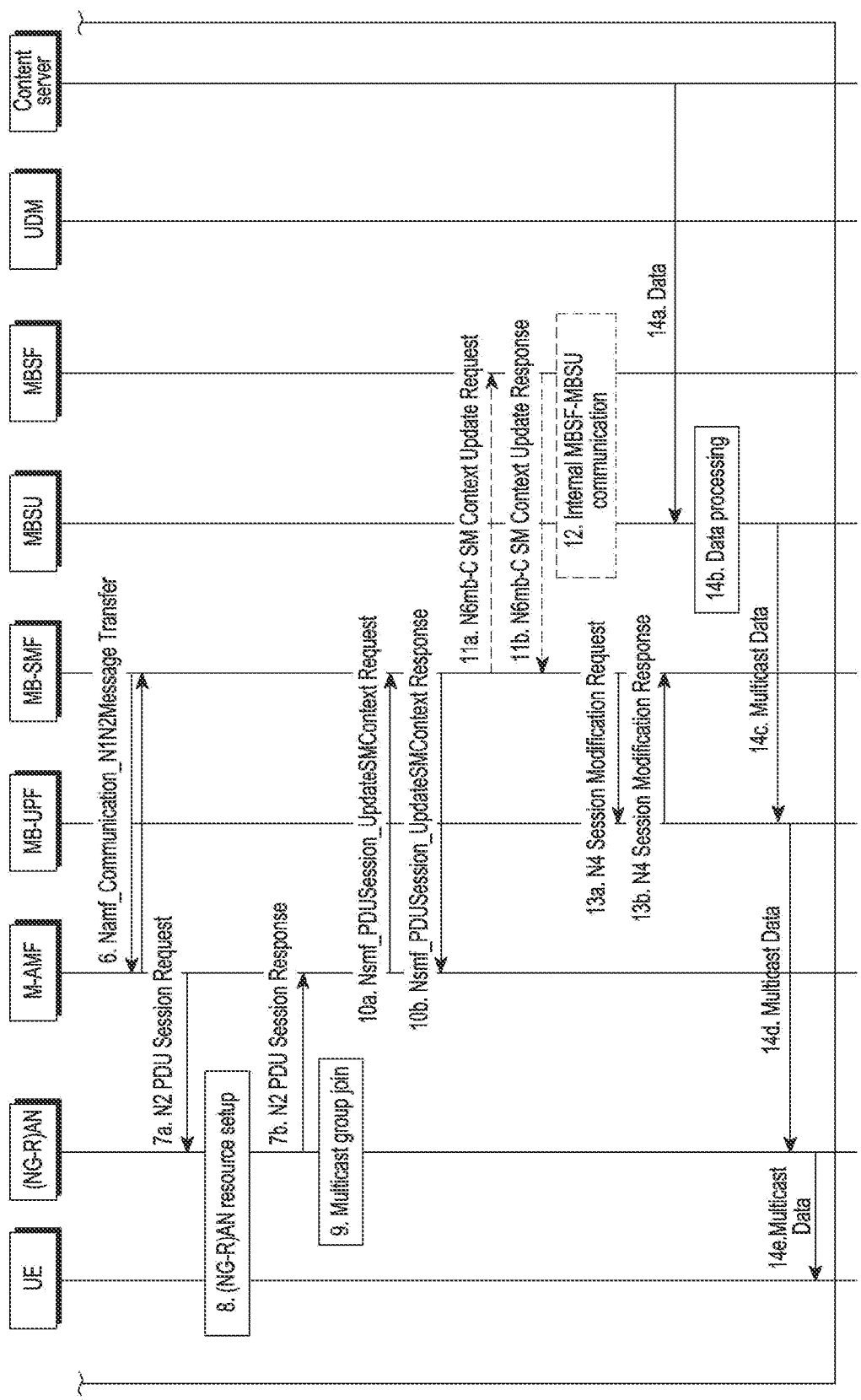

Example 3.1 Flexible Unicast to Multicast Delivery Method Switching with Pre-Existing MBS Unicast Session FIGS. 13A and 13B schematically depict a process according to an exemplary embodiment. Particularly, FIGS. 13A and 13B show a Unicast to Multicast delivery method switch with pre-existing MBS unicast session for the first architecture reference model. Dashed arrows are generally used to indicate optional steps.
The switching process is as follows:
0. The availability of the multicast service is announced by the content server e.g. via application layer signaling. The announcement may provide information such as multicast IP address and port number of the multicast group the UE can join.
1. The UE and the 5GC establish an MBS unicast PDU session according to [3]. The unicast data transmission may start, and data may be exchanged between content/application server and the UE. Optionally, the UE may periodically transmit consumption reports to the network regarding their MBS unicast PDU sessions. These reports might be used to trigger the switch between unicast and multicast.
Step 2 shows three potential alternatives to trigger the switch from unicast to multicast in 5GS. Only one of them may trigger each switch, and the subsequent steps of the solution are shared. Step 2 of Example 3.1 corresponds generally with Step 5 of Example 1.2, as shown in FIGS. 8A and 8B.
Alternative 1: RAN Triggered Switch
This alternative assumes the trigger for the switch is in the NG-RAN. This means the unicast MBS session was delivered via over-the-air unicast and the NG-RAN decides to switch to over-the-air multicast. This may optionally also include a trigger originated at the UE sent to the NG-RAN.
  2.1.a. to 2.1.c. show the set of request messages originated by NG-RAN that need to be forwarded by the network to modify the MBS unicast PDU session already established. Since the NG-RAN triggers the switch, it may have done so e.g. due to mobility reasons, due to consumption reports sent by the UE in step 1, etc.
  2.1.a. N2 Session_Modification Request is sent from NG-RAN to M-AMF.
  2.1.b. Nsmf_Session_Modification Request is sent from M-AMF to MB-SMF, in response to the M-AMF receiving the N2_Session_Modification Request.
  2.1.c. N6mb-C Session Modification Request is sent from the MB-SMF to the MBSF, in response to the MB-SMF receiving the Nsmf_Session_Modification Request.
  2.1.d. MBS Session Notification is optionally sent from the MBSF to the content/application server-only needs to take place in case the content server is required to be aware of the switch from unicast to multicast.
Alternative 2: MBSF Triggered Switch
  2.2 This alternative assumes MBSF is the entity deciding to perform a switch from unicast to multicast once the MBS service has been initiated. The decision may be based on different optimization criteria (e.g. consumption reports, etc.).
Alternative 3: Content/Application Server Triggered Switch
  2.3 This alternative accounts for the possibility of the content/application server deciding to switch from unicast to multicast.
3 MBSF update comprising:
  3.a. The MBSF requests the update of the UE's session from the MB-SMF, using a Nsmf_PDUSession_Update Request. The MBSF may provide several parameters, e.g. SUPI, S-NSSAI, MBS ID/TMGI, DNN, etc.
  3.b. The MB-SMF responds, using an Nsmf_PDUSession_Update Response, to acknowledge the update of the session and may provide its multicast IP address and port number for NG-RAN, among other parameters.
4. Optionally, the MB-SMF may register the multicast session with the UDM, using a Nudm_UECM_Update message, which may acknowledge.
5. MBSF and MBSU may exchange internal messages.
6. The MB-SMF transmits an Namf_Communication_N1N2MessageTransfer message to the M-AMF to request the transfer of the message to the NG-RAN nodes(s). The message may contain parameters such as the multicast IP address, the port number, the APN, the NSAPI, etc. of the multicast MBS session. The M-AMF may acknowledge this transmission.
7: Session creation comprising:
  7.a. The M-AMF sends the session creation request to the NG-RAN via an N2_PDU Session request message.
  7.b. The session creation is later acknowledged (after step 8) by the NG-RAN to the M-AMF with an N2_PDU Session response message that may include downlink tunnel information.
8. The NG-RAN establishes the required resources for the UE by e.g. setting up the relevant bearers.
9. The NG-RAN node may join the relevant multicast group.

10: Multicast session management context update comprising:
  10.a. The M-AMF transmits an Nsmf_PDUSession_UpdateSMContext request to the MB-SMF to update the multicast session management context with the information from the NG-RAN (e.g. tunnel information)
  10.b. The MB-SMF confirms the reception with an Nsmf_PDUSession_UpdateSMContext response message.
11: Multicast session context update comprising:
  11.a. The MB-SMF may request the MBSF to update the multicast session context with the information from the NG-RAN via the N6mb-C interface.
  11.b The MBSF may acknowledge the context update via the same interface.
12. Optionally, the MBSF may need to internally communicate with the MBSU regarding the modification of the session parameters.
13. Session modification comprising:
  13.a. The MB-SMF sends a N4 session modification request to the MB-UPF.
  13.b. The MB-UPF then acknowledges the session update.
14. Data transmission takes place comprising:
  14.a. Initially, the content is transmitted from the content provider to the MBSU.
  14.b. The MBSU processes the received data (e.g. applies FEC, raptor codes, etc.).
  14.c. The MBSU forwards the multicast data (i.e. the processed data) to the MB-UPF.
  14.d. The MB-UPF sends the forwarded data using IP multicast to the NG-RAN nodes.
  14.e. Finally, the NG-RAN nodes multicast the data over the air using over-the-air multicast bearers, which is received by the UE.

Figure 15A:
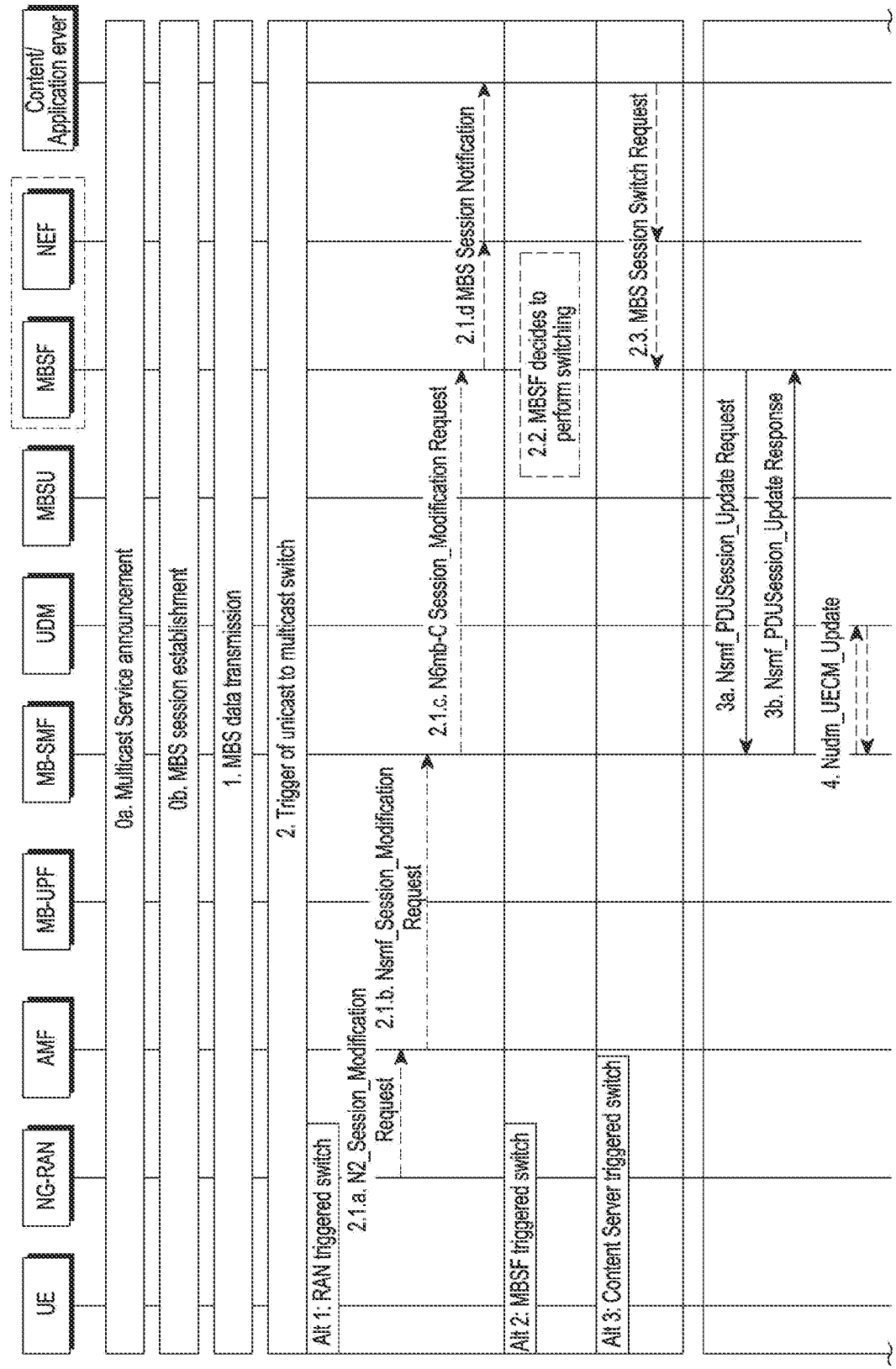
FIGS. 15A and 15B schematically depict a process according to an exemplary embodiment.
Figure 15B:
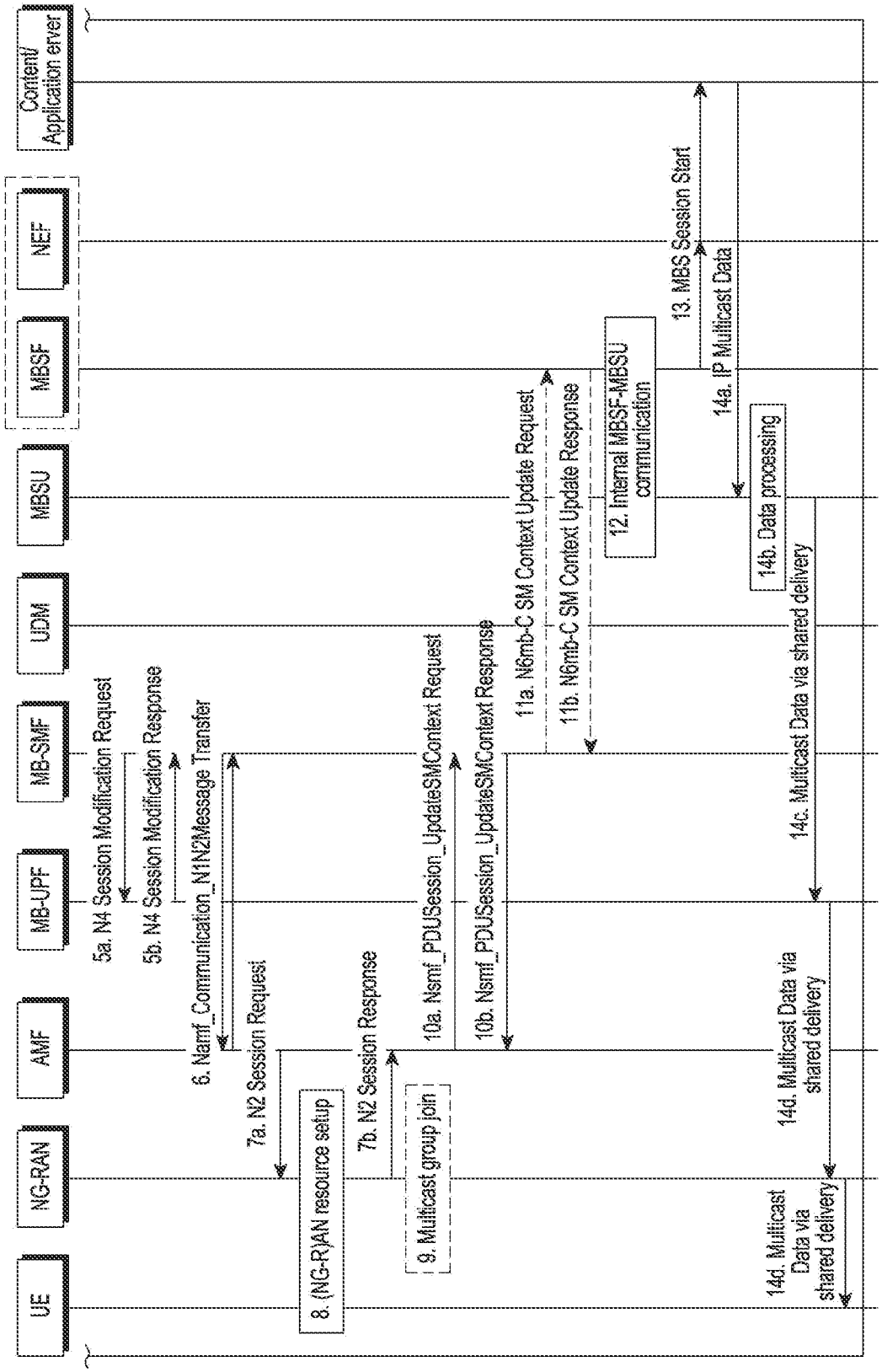
Figure 16A:
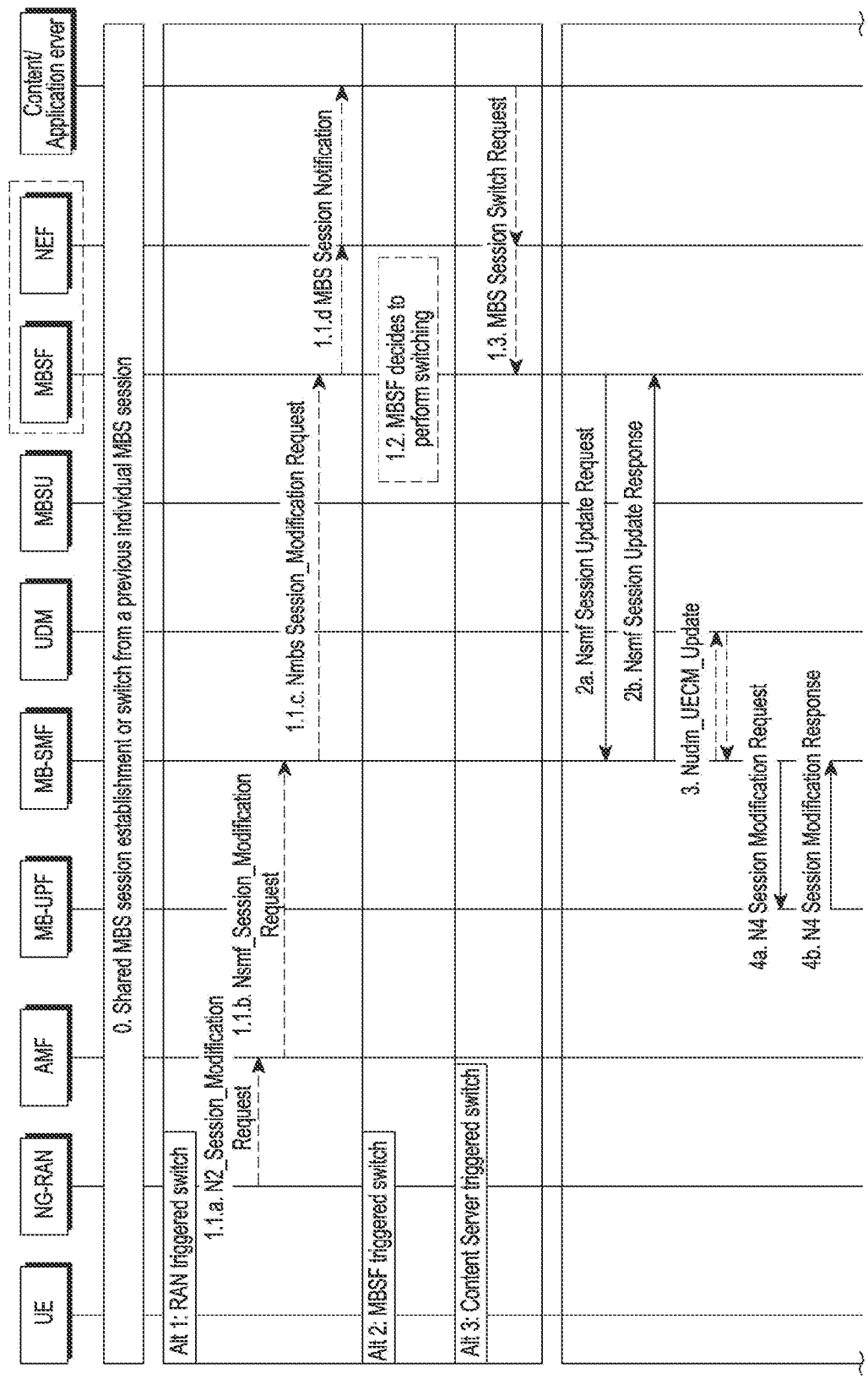
FIGS. 16A, 16B, 16C and 16D schematically depict a process according to an exemplary embodiment.
Figure 16B:
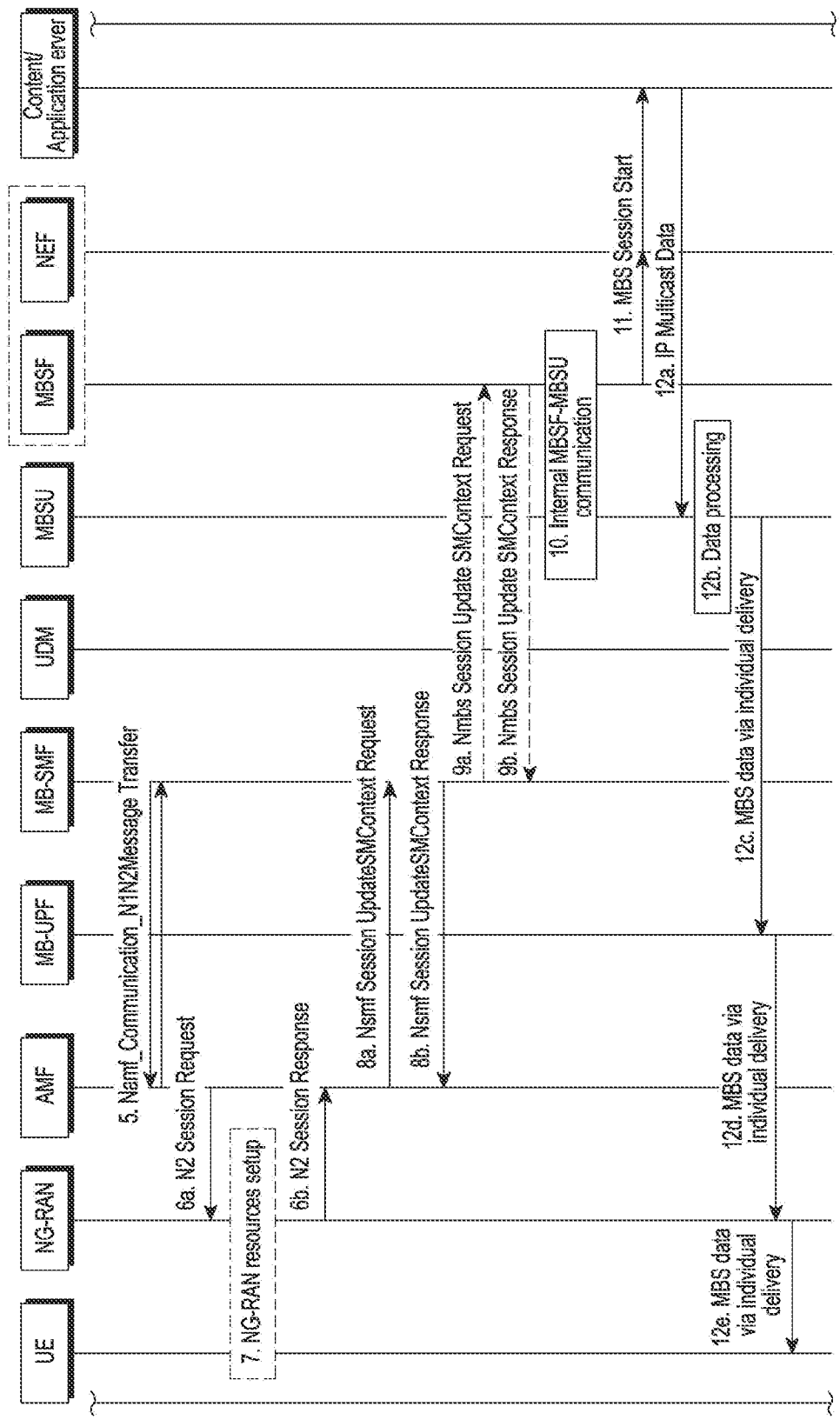
Figure 16C:
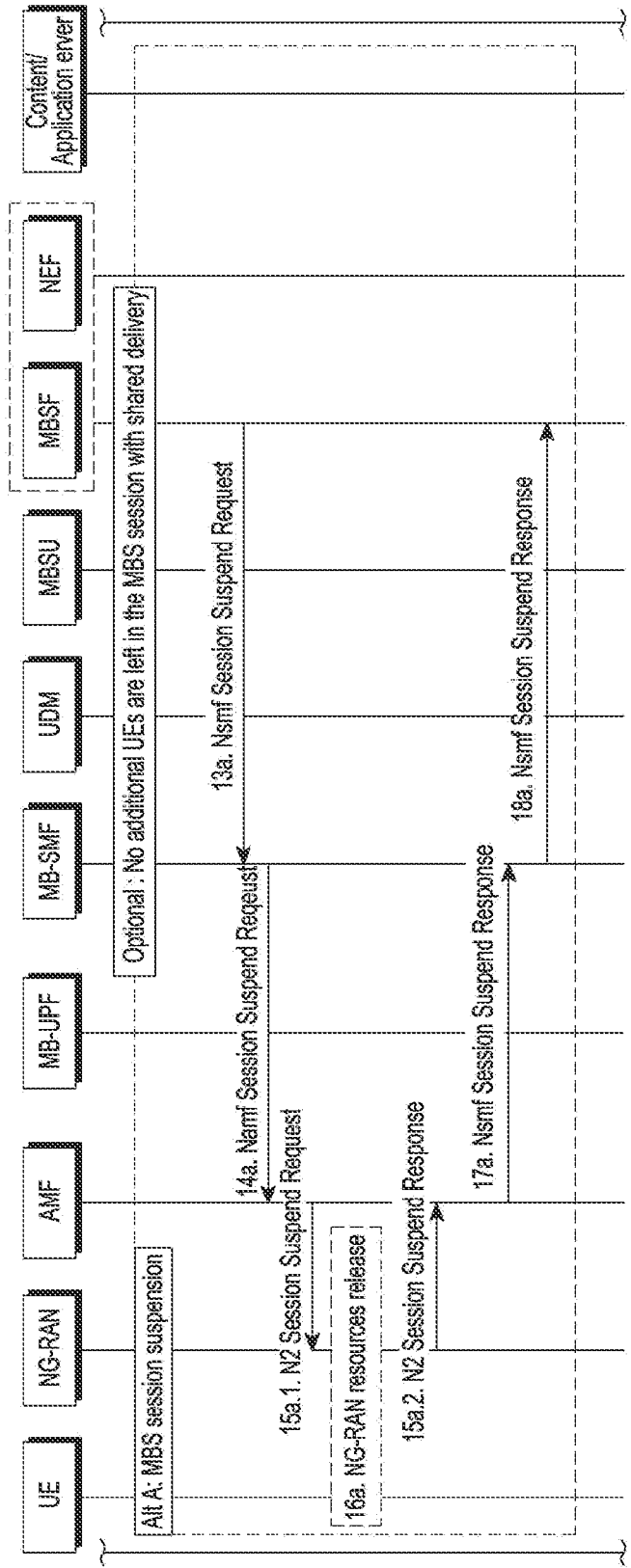
Figure 16D:
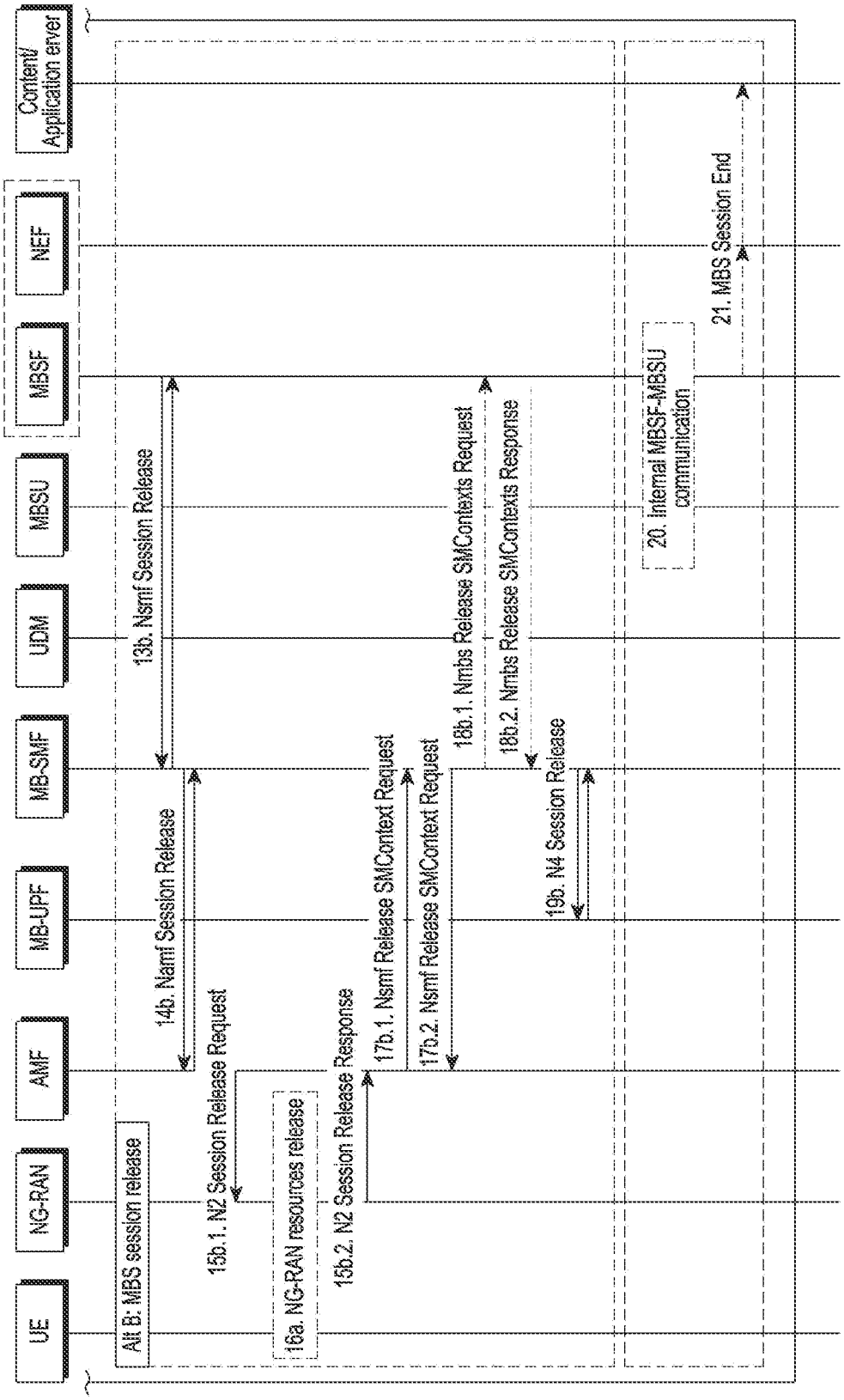

Example 3.2 Flexible Unicast to Multicast Delivery Method Switching with Pre-Existing MBS Unicast Session FIGS. 15A and 15B schematically depict a process according to an exemplary embodiment. Particularly, FIGS. 15A and 15B show a Unicast to Multicast delivery method switch with pre-existing MBS unicast session for the first architecture reference model. Dashed arrows are generally used to indicate optional steps.

In this example, MBSF and NEF may be separate physical entities or may be co-located.

The process described with respect to FIG. 15 is generally as described with respect to FIG. 13, revised to inter alia update terminology.

The switching process is as follows:
0. The availability of the multicast service is announced by the content server e.g. via application layer signaling. The announcement may provide information such as multicast IP address and port number of the multicast group the UE can join. The UE and the 5GC establish an MBS session with 5GC individual traffic delivery method according to [3].
1. The MBS data transmission may start, and data may be exchanged between content/application server and the UE. Optionally, the UE may periodically transmit consumption reports to the network regarding their MBS individual sessions. These reports might be used to trigger the switch between unicast and multicast deliveries.
2. Step 2 shows three potential alternatives to trigger the switch from unicast to multicast in 5GS. Only one of them may trigger each switch, and the subsequent steps of the solution are shared. Step 2 of Example 3.1 corresponds generally with Step 5 of Example 1.2, as shown in FIGS. 8A and 8B.

Alternative 1: RAN Triggered Switch

This alternative assumes the trigger for the switch is in the NG-RAN. This means the individual MBS session was delivered via PTP and the NG-RAN decides to switch to PTM. This may optionally also include a trigger originated at the UE sent to the NG-RAN.
  2.1.a. to 2.1.c. show the set of request messages originated by NG-RAN that need to be forwarded by the network to modify the MBS session via individual delivery already established. Since the NG-RAN triggers the switch, it may have done so e.g. due to mobility reasons like handover, due to consumption reports sent by the UE in step 1, etc.
  2.1.a. N2_Session_Modification Request is sent from NG-RAN to AMF.
  2.1.b. Nsmf Session_Modification Request is sent from AMF to MB-SMF, in response to the AMF receiving the N2_Session_Modification Request.
  2.1.c. N6mb-C Session Modification Request is sent from the MB-SMF to the MBSF, in response to the MB-SMF receiving the Nsmf_Session_Modification Request.
  2.1.d. MBS Session Notification is optionally sent from the MBSF to the content/application server-only needs to take place in case the content server is required to be aware of the switch from unicast to multicast.

Alternative 2: MBSF Triggered Switch
  2.2 This alternative assumes MBSF is the entity deciding to perform a switch from unicast to multicast once the MBS service has been initiated. The decision may be based on different optimization criteria (e.g. consumption reports, etc.).

Alternative 3: Content/Application Server Triggered Switch
  2.3 This alternative accounts for the possibility of the content/application server deciding to switch from unicast to multicast.
3 MBSF update comprising:
  3.a. The MBSF requests the update of the UE's session from the MB-SMF, using a Nsmf_PDUSession_Update Request. The MBSF may provide several parameters, e.g. SUPI, S-NSSAI, MBS ID/TMGI, DNN, etc.
  3.b. The MB-SMF responds, using an Nsmf_PDUSession_Update Response, to acknowledge the update of the session and may provide its multicast IP address and port number for NG-RAN, among other parameters.
4. Optionally, the MB-SMF may register the multicast session with the UDM, using a Nudm_UECM_Update message, which may acknowledge.
5. UPF Session modification comprising:
  5.a. The MB-SMF sends a N4 session modification request to the MB-UPF.
  5.b. The MB-UPF then acknowledges the session update.
6. The MB-SMF transmits an Namf_Communication_N1N2MessageTransfer message to the AMF to request the transfer of the message to the NG-RAN nodes(s). The message may contain parameters such as the multicast IP address, the port number, the APN, the NSAPI, etc. of the multicast MBS session. The AMF may acknowledge this transmission.

7: Session creation comprising:
7.a. The AMF sends the MBS session creation request to the NG-RAN via an N2 Session request message.
7.b. The MBS session creation is later acknowledged (after step 8) by the NG-RAN to the AMF with an N2 Session response message that may include downlink tunnel information.
8. The NG-RAN establishes the required resources for the UE by e.g. setting up the relevant bearers.
9. The NG-RAN node may join the relevant multicast group.
10: Multicast session management context update comprising:
10.a. The AMF transmits an Nsmf_PDUSession_UpdateSMContext request to the MB-SMF to update the multicast session management context with the information from the NG-RAN (e.g. tunnel information)
10.b. The MB-SMF confirms the reception with an Nsmf_PDUSession_UpdateSMContext response message.
11: Multicast session context update comprising:
11.a. [OPTIONAL] The MB-SMF may request the MBSF to update the multicast session context (e.g. the downlink tunnel information) with the information from the NG-RAN.
11.b [OPTIONAL] The MBSF may acknowledge the context update.
12. Optionally, the MBSF may need to internally communicate with the MBSU regarding the modification of the session parameters.
13. MBS Session start message is sent by MBSF to AF.
14. Data transmission takes place comprising:
14.a. Initially, the content is transmitted from the content provider to the MBSU.
14.b. The MBSU processes the received data (e.g. applies FEC, raptor codes, etc.).
14.c. The MBSU forwards the multicast data (i.e. the processed data) to the MB-UPF.
14.d. The MB-UPF sends the forwarded data using the associated tunnel to the NG-RAN nodes.
14.e. Finally, the NG-RAN nodes transmit the data over the air and may use PTM bearers, which are received by the UE.

Example 3.3 Multicast to Unicast Delivery Method Switching for the First Architectural Reference Model In this example, there exist a multicast session and a session management context for the service. This may have been originally initiated as a multicast session or may have been switched to one from a previous unicast session.

In this example, MBSF and NEF may be separate physical entities or may be co-located.

FIGS. 16A, 16B, 16C and 16D schematically depict a process according to an exemplary embodiment. Particularly, FIGS. 16A, 16B, 16C and 16D show a shared MBS to individual MBS traffic delivery method switch for the first architecture reference model, assuming a pre-existing shared MBS traffic delivery method. Such pre-existing MBS session may have been established directly as an MBS session with 5GC shared MBS traffic delivery or it may have been previously switched from 5GC individual MBS traffic delivery to shared delivery.

The method in FIGS. 16A, 16B, 16C and 16D exemplify the switch for one UE, but multiple UEs may be simultaneously switched from shared to individual deliveries by applying the same principle and set of services to a set of UEs.

The switching process is as follows:

We assume the existence of a shared MBS traffic delivery method.

Step 2 shows three potential alternatives to trigger the switch from unicast to multicast in 5GS. Only one of them may trigger each switch, and the subsequent steps of the solution are shared. Step 2 of Example 3.1 corresponds generally with Step 5 of Example 1.2, as shown in FIGS. 8A and 8B.

Alternative 1: RAN Triggered Switch

This alternative assumes the trigger for the switch is in the NG-RAN, hence the NG-RAN effectively may make the switch decision based on UE consumption reports, handover requirements, resource availability, etc. In addition, the NG-RAN may need to be involved in the switching procedure itself when the RAN delivery method needs to be changed from PTM to PTP.

1.1.a. to 1.1.d. show the set of request messages originated by NG-RAN that need to be forwarded by the network to modify the MBS session via shared delivery already established. The forwarded messages may include the SUPI, TMGI, MBS session ID, etc.

1.1.a. N2_Session_Modification Request is sent from NG-RAN to AMF.

1.1.b. Nsmf_Session_Modification Request is sent from AMF to MB-SMF, in response to the AMF receiving the N2_Session_Modification Request.

1.1.c. Nmbs Session Modification Request is sent from the MB-SMF to the MBSF, in response to the MB-SMF receiving the Nsmf_Session_Modification Request.

1.1.d. MBS Session Notification is optionally sent from the MBSF to the NEF which then forwards it to the content/application server-only needs to take place in case the content server is required to be aware of the switch from shared to individual MBS session.

Alternative 2: MBSF Triggered Switch 1.2 This alternative assumes MBSF is the entity deciding to perform a switch from shared to individual MBS traffic delivery. The decision may be based on different optimization criteria (e.g. consumption reports, UE population in certain area, etc.).

Alternative 3: Content/Application Server Triggered Switch 1.3 alternative accounts for the possibility of the content/application server deciding to switch from shared to individual MBS traffic delivery.

2.a. The MBSF sends an Nsmf Session Update Request message to the MB-SMF to request the switch for the UE from shared to individual delivery. The MBSF may provide several parameters, e.g. SUPI, S-NSSAI, MBS ID/TMGI, DNN, etc. to update the MB-SMF.

2.b. Once updated, the MB-SMF responds with an Nsmf Session Update Response.

[OPTIONAL] The MB-SMF may update the UE context registration in the UDM, using a Nudm_UECM_Update message, which may be acknowledged by the UDM.

Session Modification Comprising:
- 4.a. The MB-SMF sends a N4 session modification request to the MB-UPF including new tunneling information.
- 4.b. The MB-UPF then acknowledges the session update. The MB-SMF transmits an Namf_Communication_N1N2MessageTransfer message to the AMF to update AMF on the transfer of the messages to the NG-RAN nodes(s).
  - (6a) The AMF sends an N2 Session request message to NG-RAN to inform RAN of the delivery method switch. The switch may also require NG-RAN to adjust its resources by e.g. switching the PTM delivery to PTP. (6b) The message is later acknowledged by NG-RAN with an N2 Session response message after the NG-RAN resources may be set up.
  - [OPTIONAL] The NG-RAN may require to set up the required resources when the delivery switch involves a switch in the RAN from PTM to PTP.
  - (8a) The AMF transmits an Nsmf Session Update SMContext request to the MB-SMF to update the MBS session context with the information from the NG-RAN, updating the tunnel information for individual delivery; (8b) the MB-SMF confirms the reception with an Nsmf Session Update SMContext response message.
  - [OPTIONAL] The MB-SMF requests the MBSF to update the individual MBS session context with the information from the NG-RAN with an Nmbs Session Update SM Context request message, and the MBSF acknowledges the context update with an Nmbs Session Update SM Context response.
  - [OPTIONAL] MBSF and MBSU may exchange internal messages.

MBS Session start message is sent by MBSF to AF.

Data transmission takes place comprising:
- 12.a. The IP multicast data is transmitted from the content provider to the MBSU.
- 12.b. The MBSU processes the received data (e.g. applies FEC, raptor codes, etc.).
- 12.c. The MBSU forwards the MBS data (i.e. the processed data) to the MB-UPF via 5GC individual traffic delivery.
- 12.d. The MB-UPF sends the forwarded data to the NG-RAN nodes via individual delivery.
- 12.e. Finally, the NG-RAN nodes transmit the MBS data over the air using PTP bearers, which is received by the UE.

If no additional UEs are left in the MBS session with shared delivery, the 5GC may decide to either suspend or release the MBS session. Suspending the MBS session does not involve deleting the MBS session context in 5GC NFs to facilitate UEs to join the MBS session or switch to shared delivery in the future with reduced signaling; releasing an MBS session does delete the MBS session context from all entities in 5GC. Outstanding NG-RAN resources for PTM delivery of the shared MBS session are released in both cases.

Alternative A: Suspension of Shared MBS Session
- 13.a. The MBSF transmits an Nsmf Session Suspend request to the MB-SMF to request the suspension of the MBS session for shared delivery.
- 14.a. The MB-SMF transmits an Namf Session Suspend request to the AMF to forward the suspension request of the MBS session for shared delivery.
- 15.a.1. The AMF transmits an N2 Session Suspend request to NG-RAN to release any outstanding PTM resources.
- 15.a.2. The NG-RAN node transmits an N2 Session suspend response message to the AMF to acknowledge the suspension of the shared MBS session.
- 16.a. [OPTIONAL] The NG-RAN node(s) may release any outstanding allocated resources to the shared MBS session for PTM delivery.
- 17.a. The AMF transmits an Namf Session suspend response message to the MB-SMF to acknowledge the suspension of the shared MBS session.
- 18.a. The MB-SMF transmits an Nsmf Session suspend response message to the MBSF to acknowledge the suspension of the shared MBS session.

Alternative B: Release of Shared MBS Session
- 13.b. The MBSF transmits an Nsmf Session Release request to the MB-SMF to request the release of the shared MBS session and deletion of associated resources, which is then acknowledged by the MB-SMF.
- 14.b. The MB-SMF transmits an Namf Session Release request to the AMF to request the release of the shared MBS session and deletion of associated resources, which is then acknowledged by the AMF.
- 15.b.1. The AMF transmits an N2 Session Release request to the NG-RAN to request the release of the resources allocated to the shared MBS session.
- 15.b.2. The NG-RAN node transmits an N2 Session release response message to the AMF to acknowledge the resources release associated to the shared MBS session.
- 16.b. [OPTIONAL] The NG-RAN may release the outstanding allocated resources to the shared MBS session for PTM delivery.
- 17.b.1. The AMF transmits an Nsmf Release SMContext request message to the MB-SMF to request the release of the MBS session management context for the shared MBS session.
- 17.b.2. The MB-SMF transmits an Nsmf Release SMContext response message to the AMF to acknowledge the release of the MBS session management context for the shared MBS session.
- 18.b.1. [OPTIONAL] The MB-SMF transmits an Nmbs Release SMContext request to the MBSF. to request the release of the MBS session management context for the shared MBS session.
- 18.b.2. The MBSF may transmit an Nsmf Release SMContext response message to the MB-SMF to acknowledge the release of the MBS session management context for the shared MBS session.
- 19.b. The MB-SMF transmits an N4 Session release request tp the MB-UPF to request the release of the shared MBS session, which is the acknowledged by the MB-UPF.
- 20. [OPTIONAL] MBSF and MBSU may exchange internal messages.
- 21. [OPTIONAL] MBSF may transmit an MBS session end message the Content/Application Server, which may be first forwarded by the NEF before reaching the Content/Application Server.

Figure 17:
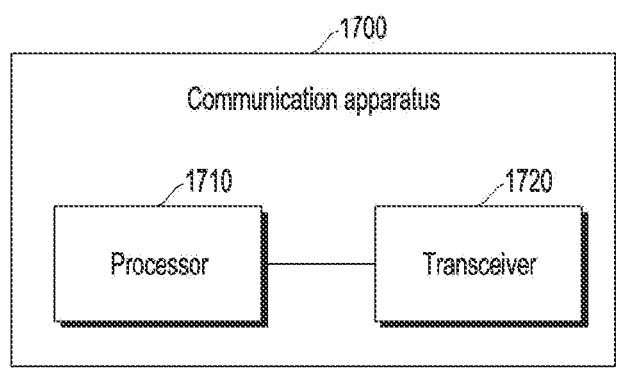
FIG. 17 depicts an example communication apparatus according to exemplary embodiments of the present disclosure.

FIG. 17 depicts an example communication apparatus according to exemplary embodiments of the present disclosure.

A communication apparatus (1700) may be at least one of an apparatus for switching from a first data transmission mode to a second data transmission mode in a communication network, a NG-RAN node, a core node (or 5G Core), a content provider or 5G network apparatus.

As shown in the non-limiting example of FIG. 17, the communication apparatus (1700) may include at least one processor (1710) and a transceiver (1720). The transceiver (1720) may be configured to be controlled to operate the methods (or process) of the embodiments of the present disclosure by the at least one processor (1710). The at least one processor (1710) may be configured to operate the methods (process) of the embodiments of the present disclosure. The at least one processor (1710) may be configured to control the transceiver (1720) to operate the methods (or process) of the embodiments of the present disclosure.

Acronyms

3GPP $3^{rd}$ Generation Partnership Project
5GC 5G Core
5GS 5G System
5MBS 5G Multicast Broadcast Service
AF Application Function
AMF Access and Mobility Function (also known as M-AMF)
AN Access Network
AUSF Authentication Server Function
BM-SC Broadcast Multicast Service Center
BMF Broadcast Multicast Function
BM-SC-C/U BM-SC Control/User Plane
CN Core Network
DN Data Network
eMBMS enhanced MBMS
eNB enhanced Node B
FEC Forward Error Correction
gNB new generation Node B
IIoT Industrial Internet of Things
IP Internet Protocol
MBMS Multimedia Broadcast Multicast Service
MBMS-GW MBMS Gateway
MBS Multicast/Broadcast Service
MBSF Multicast/Broadcast Service Function
MBSU Multicast/Broadcast Service User plane
M-AMF Multicast Access and Mobility Function (also known as AMF)
MB-UPF Multicast/Broadcast User Plane Function
MB-SMF Multicast/Broadcast Session Management Function
MCE Multi-Cell/Multicast Coordination Entity
MME Mobility Management Entity
MNO Mobile Network Operator
MooD Multicast operation on Demand
NEF Network Exposure Function
NG-RAN New Generation RAN
NF Network Function
NFV Network Function Virtualization
NRF NF Repository Function
NSI Network Slice Instance
NSSF Network Slice Selection Function
PCF Policy Control Function
PDU Packet Data Unit
RAN Radio Access Network
S-NSSAI Single Network Slice Selection Assistance Information
SBA Service Based Architecture
SD Slice Differentiator
SMF Session Management Function
SST Slice/Service Type
UDM Unified Data Management UE User Equipment
UPF User Plane Function
V2X Vehicle to Everything

REFERENCES

[1] 3GPP TS 26.346, Multimedia Broadcast/Multicast Service (MBMS); Protocols and codecs; Release 12.
[2] 3GPP TS 23.501, 5G; System Architecture for the 5G System; Release 16.
[3] 3GPP TS 23.502, 5G; Procedures for the 5G System; Release 16.
[4] 3GPP TS 29.531, 5G; 5G System; Network Slice Selection Services; Release 15.

The subject matter of [1]-[4] is incorporated herein by reference.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method performed by a new generation radio access network (NG-RAN) in a wireless communication network, the method comprising:
    receiving information on availability of multicast service from a content server;
    transmitting first data from the content server to a user equipment (UE), according to a first data transmission mode in a first session, wherein the first data transmission mode is a unicast transmission mode associated with individual delivery;
    transmitting, to an access and mobility management function (AMF), a session modification request message indicating switching from the first data transmission mode to a second data transmission mode, wherein the second data transmission mode is a multicast transmission mode associated with shared delivery;
    receiving, from the AMF, a session request message for creating a second session for the second data transmission mode;

establishing resources associated with the second session for the second data transmission mode for the UE; and transmitting, to the UE, multicast data in the second session.

2. The method of claim 1, wherein the information on availability of multicast service includes at least one of multicast internet protocol (IP) address and a port number of a multicast group.

3. The method of claim 1, further comprising:

after establishing the resources associated with the second session, transmitting, to the AMF, a session response message including information on a downlink tunnel.

4. The method of claim 3, further comprising:

receiving, from a multicast broadcast user plane function (MB-UPF), the multicast data based on the information on the downlink tunnel.

5. A method performed by an access and mobility management function (AMF) in a wireless communication network, the method comprising:

receiving information on availability of multicast service from a content server;

receiving, from a new generation radio access network (NG-RAN), a first session modification request message indicating switching from a first data transmission mode to a second data transmission mode in a first session, wherein the first data transmission mode is a unicast transmission mode associated with individual delivery, and wherein the second data transmission mode is a multicast transmission mode associated with shared delivery;

transmitting, to a multicast broadcast session management function (MB-SMF), a second session modification request message indicating switching from the first data transmission mode to the second data transmission mode in response to receiving the first session modification request message; and transmitting, to the NG-RAN, a session request message for creating a second session for the second data transmission mode.

6. The method of claim 5, wherein the information on availability of multicast service includes at least one of multicast IP address and a port number of a multicast group.

7. The method of claim 5, further comprising:

receiving, from the MB-SMF, a communication message transfer message including at least one of a multicast IP address, a port number, an access point name (APN), and a network service access point identifier (NSAPI) of a second session.

8. The method of claim 5, further comprising:

receiving, from the NG-RAN, a session response message including information on a downlink tunnel.

9. The method of claim 8, further comprising:

transmitting, to the MB-SMF, a session update request message including the information on the downlink tunnel.

10. A new generation radio access network (NG-RAN) in a wireless communication network, the NG-RAN comprising:

a transceiver; and at least one processor coupled to the transceiver, wherein the at least one processor is configured to:

receive information on availability of multicast service from a content server, transmit first data from the content server to a user equipment (UE), according to a first data transmission mode in a first session, wherein the first data transmission mode is a unicast transmission mode associated with individual delivery, transmit, to an access and mobility management function (AMF), a session modification request message indicating switching from the first data transmission mode to a second data transmission mode, wherein the second data transmission mode is a multicast transmission mode associated with shared delivery, receive, from the AMF, a session request message for creating a second session for the second data transmission mode, establish resources associated with the second session for the second data transmission mode for the UE, and transmit, to the UE, multicast data in the second session.

11. The NG-RAN of claim 10, wherein the information on availability of multicast service includes at least one of multicast internet protocol (IP) address and a port number of a multicast group.

12. The NG-RAN of claim 10, wherein the at least one processor is further configured to, after establishing the resources associated with the second session:

transmit, to the AMF, a session response message including information on a downlink tunnel, and receive, from a multicast broadcast user plane function (MB-UPF), the multicast data based on the information on the downlink tunnel.

13. An access and mobility management function (AMF) in a wireless communication network, the AMF comprising:

a transceiver; and at least one processor coupled to the transceiver, wherein the at least one processor is configured to:

receive information on availability of multicast service from a content server, receive, from a new generation radio access network (NG-RAN), a first session modification request message indicating switching from a first data transmission mode to a second data transmission mode in a first session, wherein the first data transmission mode is a unicast transmission mode associated with individual delivery, and wherein the second data transmission mode is a multicast transmission mode associated with shared delivery, transmit, to a multicast broadcast session management function (MB-SMF), a second session modification request message indicating switching from the first data transmission mode to the second data transmission mode in response to receiving the first session modification request message, and transmit, to the NG-RAN, a session request message for creating a second session for the second data transmission mode.

14. The AMF of claim 13, wherein the information on availability of multicast service includes at least one of multicast IP address and a port number of a multicast group.

15. The AMF of claim 13, wherein the at least one processor is further configured to:

receive, from the MB-SMF, a communication message transfer message including at least one of a multicast IP address, a port number, an access point name (APN), and a network service access point identifier (NSAPI) of a second session.

* * * * *